United States Patent [19]
Osaka et al.

[11] Patent Number: 6,023,277
[45] Date of Patent: Feb. 8, 2000

[54] DISPLAY CONTROL APPARATUS AND METHOD

[75] Inventors: Tsutomu Osaka; Kazutaka Inoguchi, both of Kawasaki, Japan

[73] Assignee: Canon Kabushiki Kaisha, Tokyo, Japan

[21] Appl. No.: 08/886,738

[22] Filed: Jul. 1, 1997

[30] Foreign Application Priority Data

| Jul. 3, 1996 | [JP] | Japan | 8-173796 |
| Feb. 20, 1997 | [JP] | Japan | 9-036331 |
| Feb. 20, 1997 | [JP] | Japan | 9-036332 |

[51] Int. Cl.[7] .................................................. G06T 15/00
[52] U.S. Cl. ........................................ 345/419; 345/426
[58] Field of Search ................... 345/418, 419, 345/420, 421, 422, 426

[56] References Cited

U.S. PATENT DOCUMENTS

| 5,850,226 | 12/1998 | Nagasawa et al. | 345/419 |
| 5,900,878 | 5/1999 | Goto et al. | 345/419 |
| 5,905,500 | 5/1999 | Kamen et al. | 345/419 |
| 5,905,501 | 5/1999 | Kato | 345/419 |

FOREIGN PATENT DOCUMENTS

| 3-119889 | 5/1991 | Japan . |
| 5-122733 | 5/1993 | Japan . |

OTHER PUBLICATIONS

S.H. Kaplan, "Theory of Parallax Barriers", Journal of the SMPTE, vol. 59, pp. 11–21 (Jul. 1952).

*Primary Examiner*—Phu K. Nguyen
*Assistant Examiner*—Cliff N. Vo
*Attorney, Agent, or Firm*—Fitzpatrick, Cella, Harper & Scinto

[57] ABSTRACT

A display driver instructed by a host computer to perform a display operation uses an object analyzer to determine whether the file of an object to be displayed possesses three-dimensional image data. If the file possesses three-dimensional image data, then the display drive instructs a screen controller to present a three-dimensional display. In response, the screen controller uses an image painting unit and a checkered mask-pattern painting unit to present a three-dimensional display in a display area of the file on a stereoscopic display screen.

46 Claims, 53 Drawing Sheets

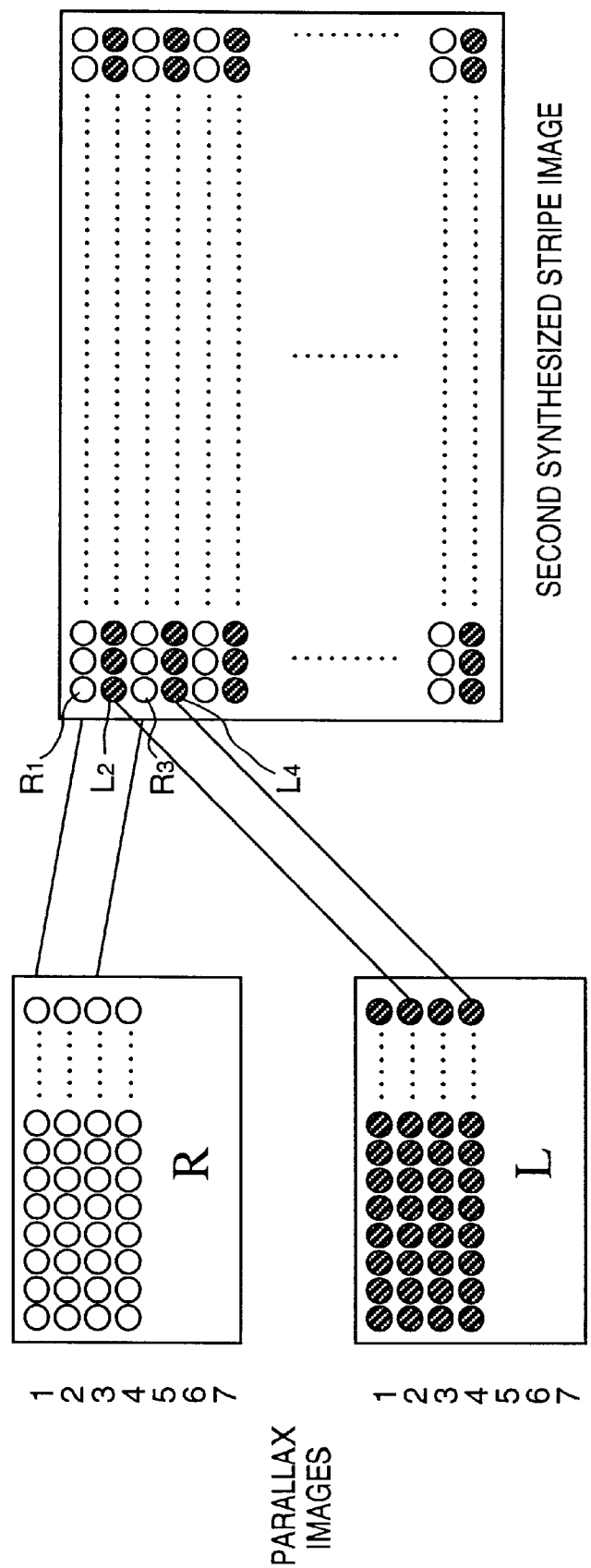

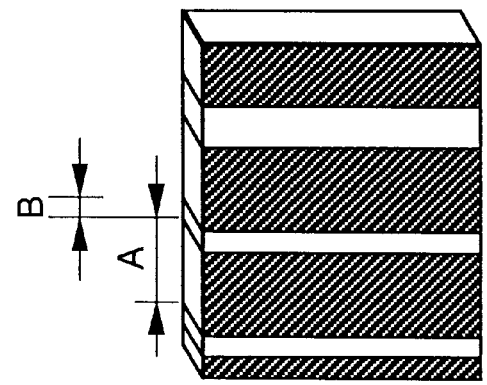
FIG. 51C  FOR SIX VIEWPOINTS
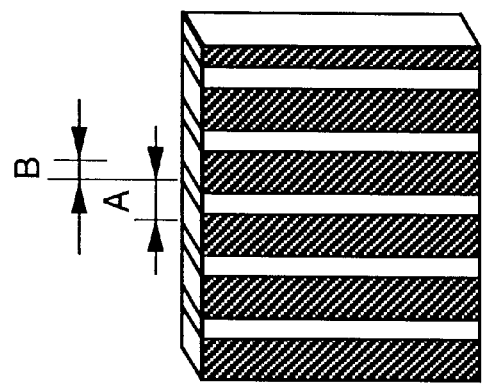
FIG. 51B  FOR THREE VIEWPOINTS
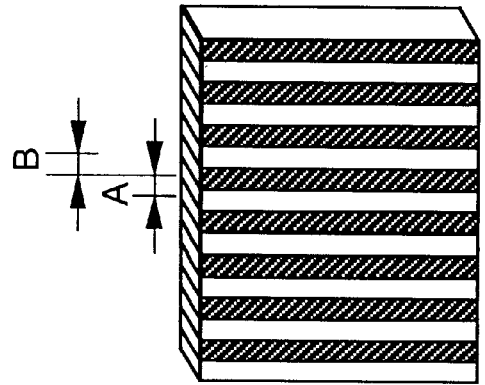
FIG. 51A  FOR TWO VIEWPOINTS

DISPLAY CONTROL APPARATUS AND METHOD

BACKGROUND OF THE INVENTION

This invention relates to a display control apparatus and method for controlling a stereoscopic display device which allows a user to observe a stereoscopic image utilizing parallax between the right and left eyes. Further, the invention relates to a display control apparatus and method for controlling a stereoscopic display device which allows a user to observe a stereoscopic image by reproducing image points in space.

A display system available in the prior art makes it possible to present a display that switches between or mixes a two-dimensional display and a three-dimensional display. Typical means for displaying a stereoscopic image are binocular parallax and volume-scanning. The method using binocular parallax allows the observer to observe a stereoscopic image by utilizing a slight difference in the images perceived by the right and left eyes, namely binocular parallax. Volume-scanning involves presenting a time-division display of a number of cross-sectional images of an object while changing the display plane in the depth direction in observed space by moving the image forming system, and causing the image cross sections to emerge in superimposed form in observed space by utilizing the visual persistence of the human eye.

Further, known computer systems come equipped with a graphical user interface as a user interface intended to improve operability. A graphical user interface and a stereoscopic display mechanism will now be described in greater detail.

(1) Graphical user interface

In order to operate a computer and enter data, use is made of input devices such as a keyboard, tablet mouse or trackball, etc. In particular, for objects that are easy to recognize visually, such as windows, icons and pull-down menus, a tablet and mouse often are used together with a graphical user interface (hereinafter a "GUI") to enter coordinate information and path information into a computer while the monitor is being viewed. These input devices and the monitor display make it possible to perform operations intuitively and facilitate the operation of the computer.

FIG. 48 is a hierarchical diagram of a typical computer system in which a GUI is used in the operating system. Shown in FIG. 48 is application software (referred to simply as an "application" below) 500 utilized by a user, and a visual shell 501, which is the environment that allows the user to actually operate the computer interactively and visually. The application 500 constructs the visual shell of the GUI environment and controls external peripherals by utilizing a GUI component application interface (API) 502, a GUI component library/server 503, a paint API 504 for painting images on a display 506, a paint library/server 505, another API 507 for using other peripherals 509, another library/server 508, and a device driver 510 for controlling each of the devices.

The progress that has been made in computer software and hardware has been remarkable and developments in the area of display devices has been no exception, with progress having been made in providing high-quality colonization, larger display surfaces and higher definition. A concurrent tendency is to provide displays that allow stereoscopic viewing, as well as the pursuit of greater quantities of information and realism in displays. Several of such schemes have been proposed and put into practice.

(2) Stereoscopic display mechanism using binocular parallax

A stereoscopic image display system having a parallax barrier (referred to as a "parallax barrier system") is well known as a system for presenting a stereoscopic display on a display device.

A parallax barrier system has been disclosed in "Theory of Parallax Barriers" by S. H. Kaplan, J.SMPTE, Vol. 59, No. 7, pp. 11~21 (1952). In the parallax barrier system, a striped image having left and right images in an alternating array is displayed from among a plurality of parallax images obtained from a plurality of viewpoints. Parallax images corresponding to the eyes are observed by respective ones of the eyes via a slit (referred to as a "parallax barrier") having a prescribed aperture provided at a position spaced a prescribed distance away from the striped image. The corresponding parallax images can thus be observed by the respective eyes, thereby making stereoscopic viewing possible.

A stereoscopic display apparatus disclosed in the specifications of Japanese Patent Application Laid-Open Nos. 3-119889 and 5-122733 is designed to improve the compatibility with a two-dimensional (single-viewpoint image) image display device. Specifically, a parallax barrier is generated electronically by a transmissive-type liquid crystal display element, and control is performed electronically to change the shape and position of the barrier stripes.

FIG. 49 is a basic structural view of the stereoscopic image display device disclosed in Japanese Patent Application Laid-Open No. 3-119889. As shown in FIG. 49, a transmissive-type liquid crystal display device 101 which presents an image display and an electronic parallax barrier 103 comprising a transmissive-type liquid crystal display element are disposed on either side of a spacer 102 having a thickness d. Parallax images captured from two or a number of directions are displayed as vertical stripe images on the transmissive-type liquid crystal display device 101. By designating XY addresses using a controller such as a microcomputer 104, a parallax barrier pattern can be formed at any position on the barrier surface of the electronic parallax barrier 103, thus making possible stereoscopic vision in accordance with the principle of the parallax barrier scheme described above.

FIG. 50 is a structural view showing the display section of a stereoscopic image display device comprising the liquid crystal panel display 101 and electronic parallax barrier 103 disclosed in Japanese Patent Application Laid-Open No. 3-119889. As shown in FIG. 50, each of two liquid crystal layers 115, 125 is embraced by two polarizers 111, 118 and 121, 128, respectively. When a two-dimensional display is presented in this device, the display using the electronic parallax barrier is turned off to produce a colorless, transparent state over the entire image display area. By performing control in this manner, compatibility with a two-dimensional display is realized, unlike the case with the stereoscopic image display device using the conventional parallax barrier.

FIGS. 51A~51C are diagrams illustrating differences in parallax barrier patterns formed on an electronic parallax barrier owing to a difference in number of viewpoints. When stripe images formed from parallax images for two viewpoints are observed, the width A of opaque portions which block light and the width B of light transmitting portions of the parallax barrier are advantageously the same, as shown in FIG. 51A. On the other hand, as the number of viewpoints increases to three viewpoints and six viewpoints, the aperture efficiency of the electronic parallax barrier declines, as illustrated in FIGS. 51B and 51C.

Further, as shown in FIGS. 52A and 52B, Japanese Patent Application Laid-Open No. 5-122733 discloses an example in which a pattern of barrier stripes is generated only in part of the area of an electronic parallax barrier 103 comprising a transmissive-type liquid crystal display element, wherein a three-dimensional image and a two-dimensional image are capable of being displayed in mixed form on the same screen.

In addition to the parallax barrier scheme, a lenticular scheme is well known as means for displaying a stereoscopic image using the binocular parallax of the right and left eyes. In a lenticular system, a lenticular sheet comprising a number of semicylindrical lenses is provided in front of the display to spatially separate the image that enters the right and left eyes so that the observer is allowed to see a stereoscopic image.

(3) Three-dimensionally visible image display mechanism using volume-scanning

An example of an apparatus which uses volume-scanning to present a stereoscopic display will be described with reference to FIG. 53. As illustrated in FIG. 53, a laser beam of reduced diameter is caused to scan in two dimensions using a light deflecting scanner 301, whereby an image is displayed on an oscillating screen 302. The screen 302 is moved back and forth in the depth direction at high speed and the image of the cross section of an object at the position of the screen 301 is painted by the laser beam in sync with the back-and-forth movement of the screen. Repeating this operation at high speed causes a three-dimensional image to appear owing to the effect of persistence of vision.

In accordance with this method, a three-dimensionally visible image having a shape the same as that of the object is formed in observation space. Even if the observer moves to the left or right, therefore, the observer will always see an object the same as that of the original object that would be seen from that position. This makes possible natural viewing at all times.

However, a system which implements a GUI through use of the conventional display that relies solely upon a display in two dimensions does not have means for allowing the system itself to judge whether an object such as a window or icon manipulated by the user is an object capable of being displayed three-dimensionally or an object displayed two-dimensionally. Consequently, the following problems arise when use is made of a system capable of presenting a three-dimensional display:

(1) Consider a situation in which a plurality of windows or icons or the like are being displayed by an apparatus which presents a three-dimensional display and a two-dimensional display. When any object is activated to shift the current of the application, whether there is to be a changeover from the two-dimensional display to the three-dimensional display, a changeover from the three-dimensional display to the two-dimensional display or no changeover whatsoever cannot be determined on the side of the host computer. This means that the user must make the designation or effect the changeover each time. Similarly, with an apparatus configured to mix a two-dimensional display and a three-dimensional display, it is required that the user specify, object by object, whether the object is a two-dimensional display object or a three-dimensional display object. The result is poor operability.

(2) An object handled by a conventional computer system has only planar coordinates and no depth coordinates to define the location at which the object is displayed on the display. Consequently, disposition in the depth direction in accordance with user preference and operating environment in the depth direction cannot be selected.

The following problems arise with the binocular parallax arrangement owing to the fact that the stereoscopic image is displayed using the binocular parallax of the left and right eyes:

(3) In a stereoscopic display using binocular parallax, convergence and focal length differ, unlike a situation in which the user observes events in real space. This type of display does not lend itself to observation over an extended period of time for physiological reasons, and long-term viewing can cause the user discomfort.

(4) With a stereoscopic display of the parallax barrier or lenticular type using binocular parallax, the area capable of being observed stereoscopically is small and it is necessary for the user to hold his or head steady in the stereoscopic viewing area or for the viewpoint of the user to be sensed so that the stereoscopic viewing area can be made to follow the user.

(5) In an apparatus configured to switch between a two-dimensional display and a three-dimensional display, the two-dimensional display portion of the display does not have an image array suited to the three-dimensional display when the three-dimensional display is being presented. The result is a display that is difficult for the user to perceive.

The arrangement which presents a three-dimensionally visible image display using volume-scanning has the following drawbacks:

(6) Image forming means capable of movement at high speed (the oscillation screen) and having a size the same as that of the three-dimensional image to be reproduced is required. This results in an apparatus of large size. In addition, achieving high-speed drive is difficult.

(7) Since an object (the image forming means for high-speed movement) having a large mass moves at high speed in image reproduction space, the apparatus can be hazardous at the time of observation.

SUMMARY OF THE INVENTION

Accordingly, an object of the present invention is to provide a display control apparatus and a display control method that make it possible to recognize whether a three-dimensional display is possible on a per-object basis in a display device capable of a two-dimensional display and a three-dimensional display, wherein the display of the object is performed in suitable fashion.

Another object of the present invention is to provide a display control apparatus and a display control method so adapted that an object such as a window or the operating environment can be disposed freely in the depth direction, thereby improving the user interface.

Still another object of the present invention is to provide a display control apparatus and a display control method that allow an observer to see a natural three-dimensionally visible image by reproducing luminance points sequentially and at high speed in a time series, and that make it possible to recognize whether a three-dimensional display is possible on a per-object basis, wherein the display of the object is performed in suitable fashion.

Still another object of the present invention is to provide a display control apparatus and a display control method that make three-dimensional viewing possible without using an oscillating screen in a system which presents a three-dimensionally visible image display using volume-scanning, thereby making it possible to provide a safe, small-size display device.

Still another object of the present invention is to provide a display control apparatus and a display control method in which paint information indicating whether a three-dimensional display is possible or not is provided in the header of a file, and this information is used to decide execution of a three-dimensional display, thereby making it possible to readily decide whether a three-dimensional display is to be executed or not.

A further object of the present invention is to provide a display control apparatus and method in which stereoscopic viewing is achieved by allowing an observer to observe a collection of luminance points by means of persistence of vision. Since this makes it possible to vary, in the depth direction, a position painted by a luminance point, an oscillating screen is not required. This enhances the safety of the apparatus and results in an apparatus of smaller size.

A further object of the present invention is to provide an easy-to-use user interface in which the user is capable of manipulating any display object or operating environment in the depth direction of stereoscopic display space and of increasing the number of manipulated objects in the depth direction.

In accordance with the present invention, there is provided a display control apparatus, and the associated method, equipped with two-dimensional display means for displaying a planar image, which is based upon two-dimensional image data, on at least one plane in stereoscopic display space, wherein a user interface component in two-dimensional display space is made displayable in a two-dimensional plane by including a user interface component such as a pull-down menu or icon in the planar image, thereby improving operability.

Further, in accordance with the present invention, there is provided a display control apparatus and method in which a three-dimensional display is inhibited while the position at which an object is displayed is moved, thereby reducing the processing load on the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 24B is a diagram for describing horizontal stripe images displayed on a liquid crystal display device;

FIGS. 51A–51C are diagrams illustrating differences in parallax barrier patterns formed on an electronic parallax barrier owing to a difference in number of viewpoints;

DESCRIPTION OF THE PREFERRED EMBODIMENTS

Preferred embodiments of the present invention will now be described in detail in accordance with the accompanying drawings.

In the embodiments described below, a "two-dimensional display" refers to a display presented planarly (two-dimensionally) in three-dimensional space and having no depth as seen from the observer. The image presented is referred to simply as a two-dimensional image. A "three-dimensional display" refers to a display presented stereoscopically (three-dimensionally) in three-dimensional space and has depth as seen from the observer. The image presented is referred to simply as a three-dimensional image.

First Embodiment

The first embodiment will be described with regard to a computer system which operates in the above-described GUI environment and has a stereoscopic display. The stereoscopic display means of the first embodiment comprises a first display element for displaying left and right parallax images or an ordinary two-dimensional image, a horizontal lenticular sheet in which the direction of the generating lines is horizontal, a vertical lenticular sheet in which the direction of the generating lines is vertical, and a second display element for presenting a display of a checkered mask. The stereoscopic display scheme implemented by this optical arrangement shall be referred to as a "crossed-lenticular scheme".

Before discussing the characterizing features of this embodiment, there will be described a stereoscopic display capable of presenting mixed two- and three-dimensional displays using the above-mentioned crossed-lenticular scheme. Further, though a mixed two- and three-dimensional display will be described in the first embodiment, the mixed display is one in which a partial changeover can be made between the two-dimensional display and the three-dimensional display and therefore it will be obvious that if the changeover area is made the full screen, it is possible to present a switched display in which a changeover is made between a full-screen two-dimensional display and a full-screen three-dimensional display.

(1) Principle of Stereoscopic Display Based Upon Crossed-Lenticular Scheme

Figure 1:
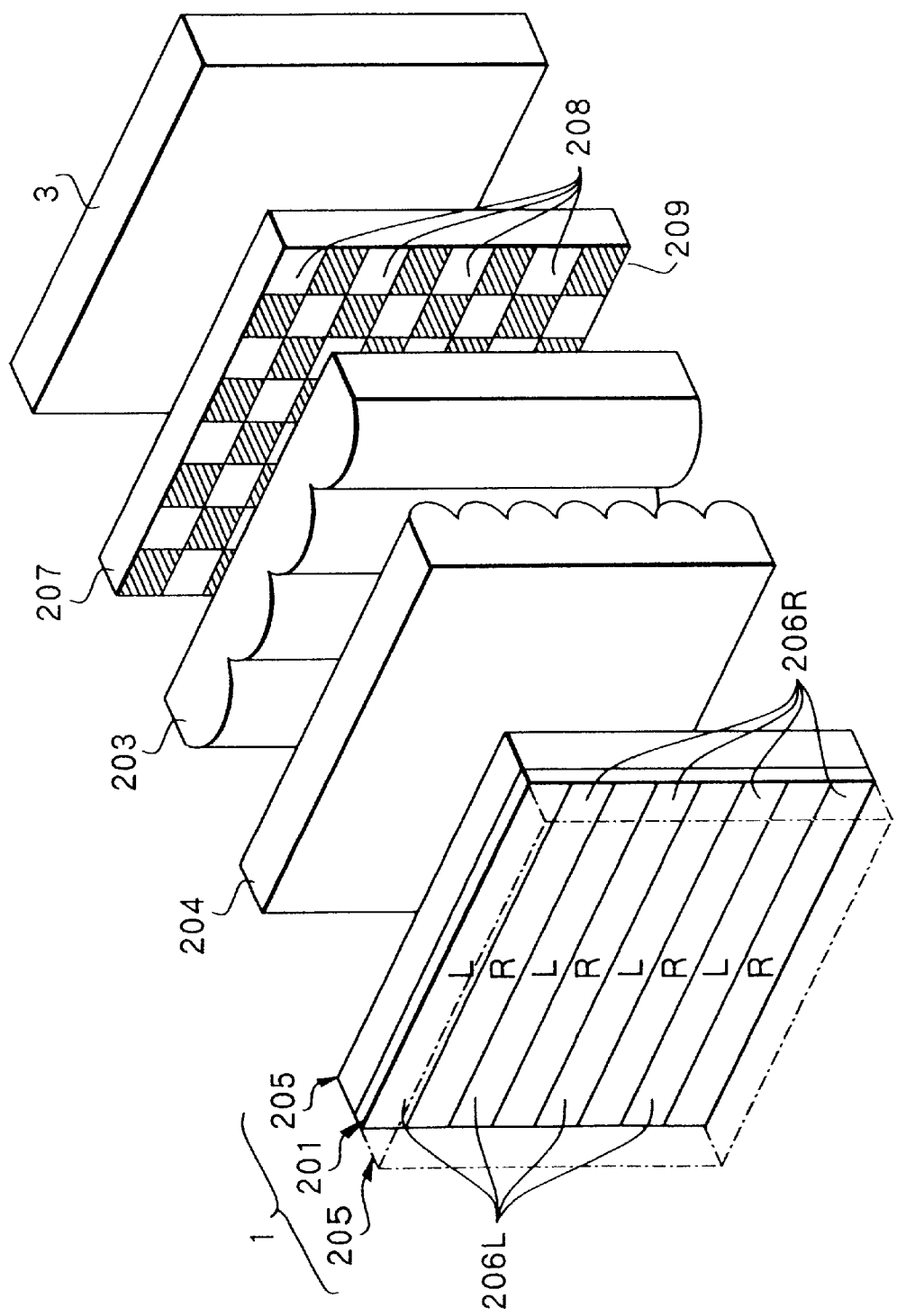
FIG. 1 is a perspective view for describing the principle of a crossed-lenticular scheme used in a first embodiment of the present invention.

The principle of a stereoscopic display based upon the crossed-lenticular scheme will now be described with reference to the drawings. FIG. 1 is a perspective view for describing the principle of a crossed-lenticular scheme used in this embodiment of the present invention. It should be noted that this description relates strictly to the theoretical arrangement of an optical system for a stereoscopic display and that the construction of the first embodiment per se differs in part as will be set forth below.

As shown in FIG. 1, a liquid crystal display device 1 for displaying images is obtained by forming a pixel display portion comprising a liquid crystal layer 201 or the like between glass substrates 205. Components such as polarizers, a color filter, electrodes, a black matrix and a reflection preventing film are deleted from the drawing. A backlight 3 provides a source of illumination. Placed in front of the backlight 3 is a mask substrate 207 on which a mask pattern 209 has been formed, the mask pattern having checkered apertures 208 through which the light is transmitted. The mask pattern 209 comprises a film of vapor-deposited metal such as chrome or a light absorbing material and is fabricated by performing patterning on the mask substrate 207, which consists of glass or plastic. Two lenticular sheets 203, 204 made of transparent plastic or glass are disposed as microlenses between the mask substrate 207 and the liquid crystal display device 1 in such a manner that their generating lines are mutually perpendicular. Left and right parallax images are displayed on the liquid crystal display device 1 in a vertically alternating array of horizontal stripes, in which 206R indicates the images for the right eye and 206L the images for the left eye. Light from the backlight 3 passes through each of the apertures 208 of the mask substrate 207 and illuminates the liquid crystal display device 1 via the lenticular sheets 203, 204, whereby the left and right parallax images are observed upon being separated for viewing by both eyes of the user.

Figure 2:
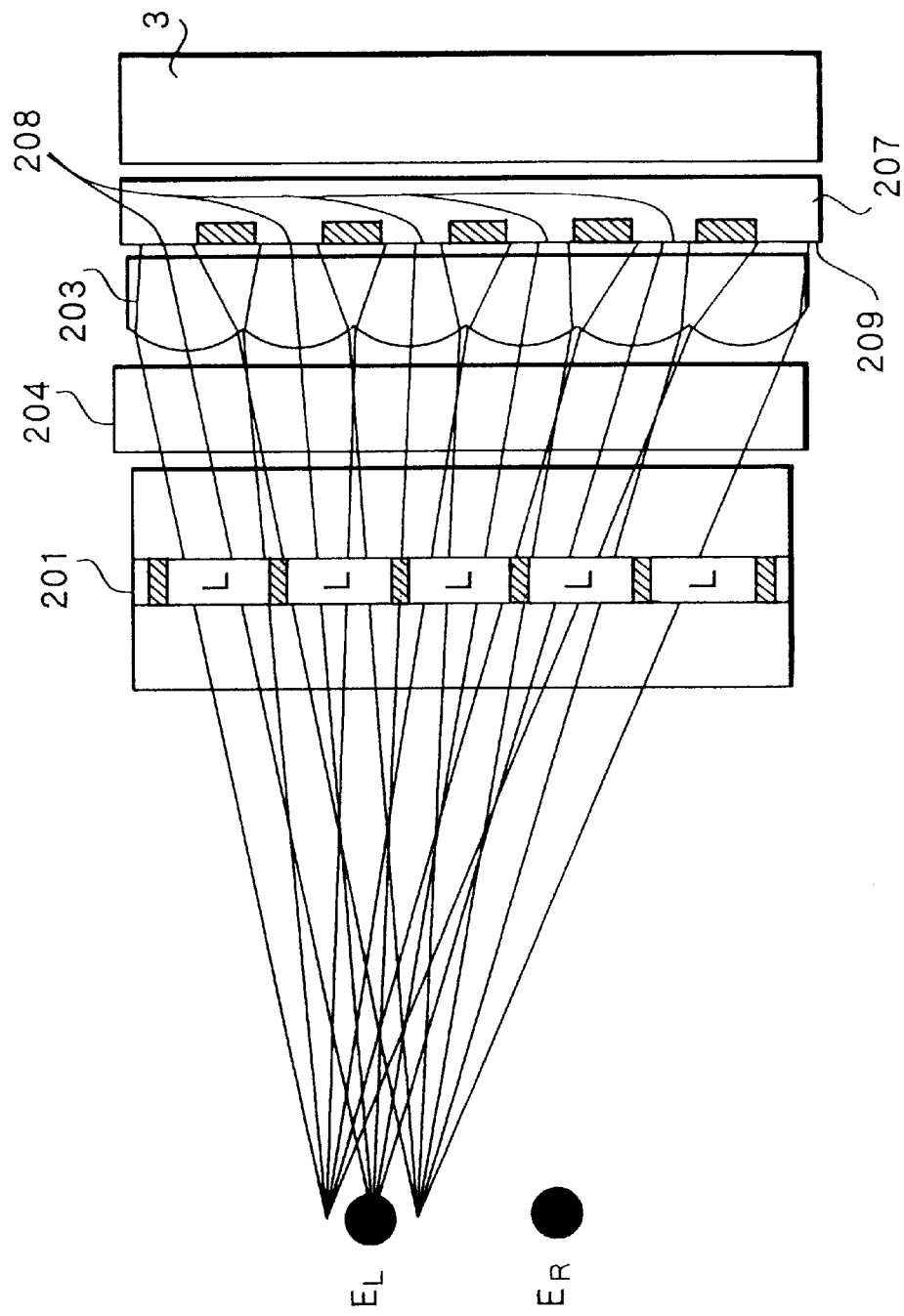
FIG. 2 is a diagram useful in describing the principle of an operation in which left and right parallax images are separated in the horizontal direction and observed by both eyes of a user.

FIG. 2 is a diagram useful in describing the principle of the operation in which the left and right parallax images are separated in the horizontal direction and observed by both eyes of a user. FIG. 2 illustrates a cross section of the stereoscopic image display device of FIG. 1 as it appears when viewed from above. When the mask substrate 207 is illuminated by the backlight 3, the light is emitted through the apertures 208. The lenticular sheet 203 is placed on the mask substrate 207 and the lens curvature is designed in such a manner that the mask pattern will be situated substantially at the focal point of each cylindrical lens.

The pattern of apertures and light blocking portions shown in FIG. 2 is such that correspondence is achieved for the left images among the horizontal stripe-shaped left and right images displayed in vertically alternating form on the liquid crystal display device 1. As a result, the light that has exited from the apertures 208 illuminates the left images of the liquid crystal display device 1 through the lenticular sheet 203 with a directivity in the range indicated by the solid lines in FIG. 2. Here $E_L$ and $E_R$ represent the left and right eyes, respectively, of the user. The pitch of the lenticular sheet 203 is made slightly smaller than the pitch between each pair constituted by an aperture and light blocking portion of the mask pattern 209 so that the light from the apertures 208 will collect uniformly at the left eye over the entire width of the image. More specifically, the pitch of the lenticular sheet 203 is made slightly less than the pitch of the apertures of the mask pattern 209. As a result, the left images on the horizontal stripes displayed on the liquid crystal display device 1 are observed only in the area in the vicinity of the left eye $E_L$. With regard to the right eye $E_R$, the pattern of apertures and light blocking portions of the mask pattern 209 is the reverse of that shown in FIG. 2. That is, correspondence is achieved for the stripes of the right images among the horizontal stripe-shaped left and right images displayed in vertically alternating form on the liquid crystal display device 1, and the right images are illuminated through the lenticular sheet 203 with a directivity in the area in the vicinity of right eye $E_R$. As a result, the horizontal stripe-shaped right images displayed on the liquid crystal display device 1 are observed only in the area in the vicinity of the right eye $E_R$. Thus, these left and right images on the liquid crystal display device 1 are observed by the left and right eyes upon being separated in the horizontal direction.

Figure 3:
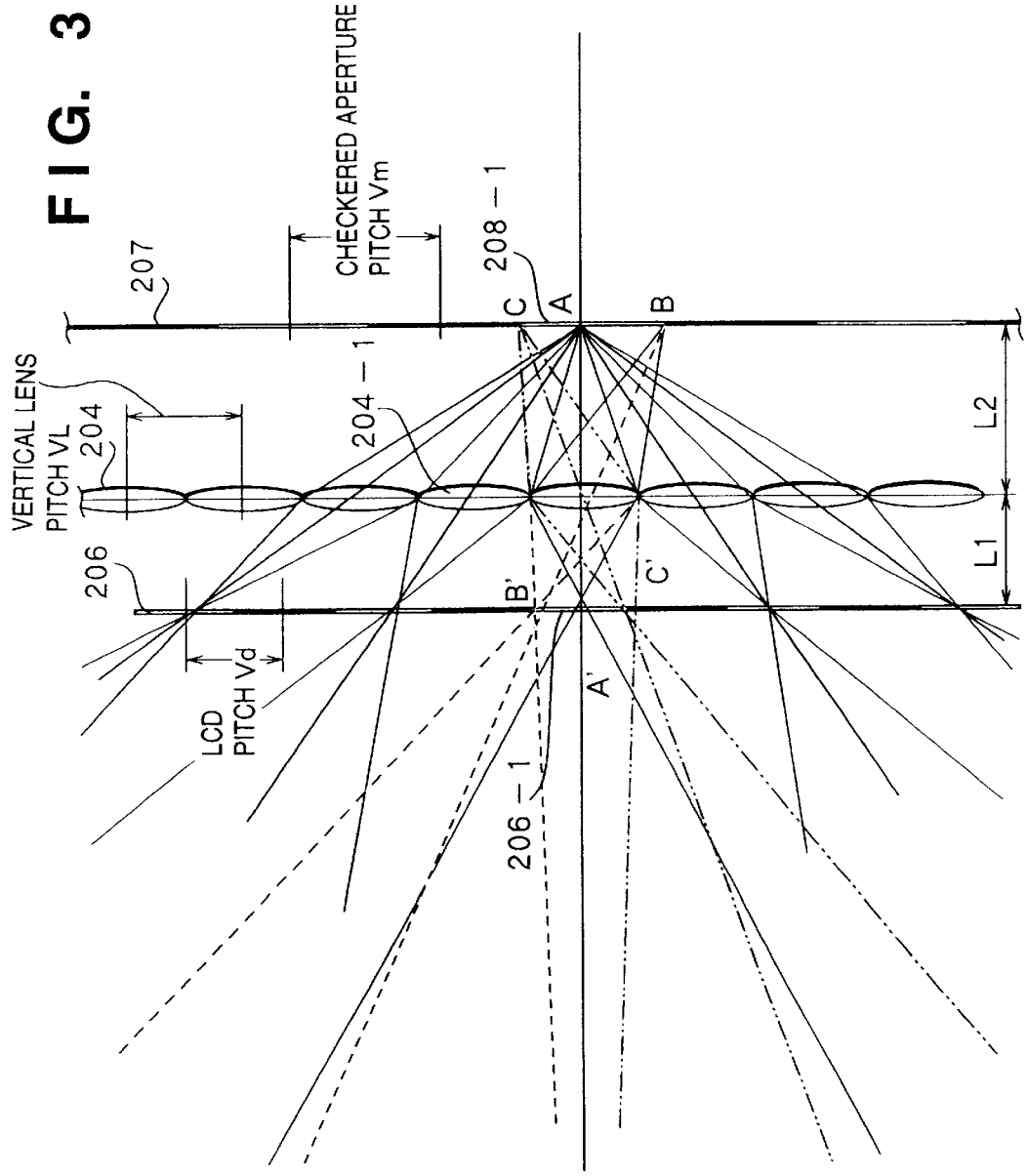
FIG. 3 is a simplified side view of the vertical cross section of a stereoscopic image display device based upon the crossed-lenticular scheme shown in FIG. 1.

The observation region in the vertical direction will now be described. FIG. 3 is a simplified side view of the vertical cross section of the stereoscopic image display device based upon the crossed-lenticular scheme shown in FIG. 1. In FIG. 3, the lenticular sheet 203, which does not have optical effects in this cross section, and the substrate of planar glass, which is not directly related to optical effects, are deleted from the drawings. The lenticular sheet 204 also is represented in conceptual form. The apertures of the mask pattern on the mask substrate 207 have the checkered configuration shown in FIG. 1 and correspond to the horizontal stripe-shaped left and right images displayed in vertically alternating form on the liquid crystal display device 1.

In FIG. 3, the aperture pattern of the checkered apertures 208 is for illuminating the image line corresponding to either the left or right eye of the user. For example, the aperture pattern illuminates the image lines for the left eye of the user, and the blackened portions of the checkered apertures 208 are the light blocking portions which do not transmit light. Further, in FIG. 3, the lines of the liquid crystal display device 1 corresponding to the left eye are shown in white and the lines corresponding to the right eye are shown in black.

The display device according to this embodiment is designed so as to satisfy the following relations:

$$Vd:Vm=L1:L2 \quad (1)$$

$$Vd:VL=(L1+L2)/2:L2 \quad (2)$$

$$1/fv=1/L1+1/L2 \quad (3)$$

where Vm represents the pitch of the mask pattern in the vertical direction, VL the pitch of the lenticular sheet 204, fv the focal length, in the direction of the plane of the drawing of FIG. 3, of the individual cylindrical lenses constructing the lenticular sheet 204, Vd the pixel pitch in the vertical direction of the liquid crystal display device for the image display, L1 the distance from the display surface of the liquid crystal display device to the lenticular sheet 204, and L2 the distance from the lenticular sheet 204 to the mask pattern.

The apertures of the mask pattern under these conditions cause the light to converge on the respective corresponding pixel lines as caustic curves that are perpendicular to the plane of the drawing. For example, take one of the apertures of the checkered apertures. The luminous flux emitted from a point A at the center of a central aperture 208-1 and incident upon a corresponding cylindrical lens 204-1 of the lenticular sheet 204 is converged as a caustic curve at a central point A' of a corresponding pixel row 206-1 of the liquid crystal display device. Luminous flux emitted from the point A at the center of the central aperture 208-1 and incident upon a cylindrical lens of the lenticular sheet 204 other than the cylindrical lens 204-1 is converged as a caustic curve on the center of a pixel line other than the pixel row 206-1 displaying the left-eye image of the liquid crystal display device.

Further, luminous flux emitted from points B, C at the extremities of the aperture 208-1 and incident upon the corresponding cylindrical lens 204-1 of the lenticular sheet 204 is converged as caustic curves on points B', C' at the extremities of the pixel row 206-1. Similarly, luminous flux emitted from other points of the aperture 208-1 and incident upon the cylindrical lens 204-1 is converged as caustic curves on the pixel row 206-1 of the liquid crystal display device. All luminous flux emitted from the aperture 208-1 and incident upon cylindrical lenses other than the cylindrical lens 204-1 also is converged on other pixel lines which display the left-eye image of the liquid crystal display device 1.

All luminous flux emitted from apertures other than the aperture 208-1 of the checkered pattern shown in FIG. 3 also is similarly converged on pixel lines that display the left-eye image of the liquid crystal display device 1, thereby illuminating and passing through the left-eye pixel lines of the liquid crystal display device 1. As a result, an observation region is obtained in which the luminous flux is diverged only along the vertical direction in conformity with the number of apertures involved in convergence, and the left and right images can be seen upon being uniformly separated over the full vertical width of the screen from a prescribed height of the eyes of the user. Though the image viewed by the left eye of the user has been described above, operation is the same with regard to the image viewed by the right eye of the user.

Figure 4:
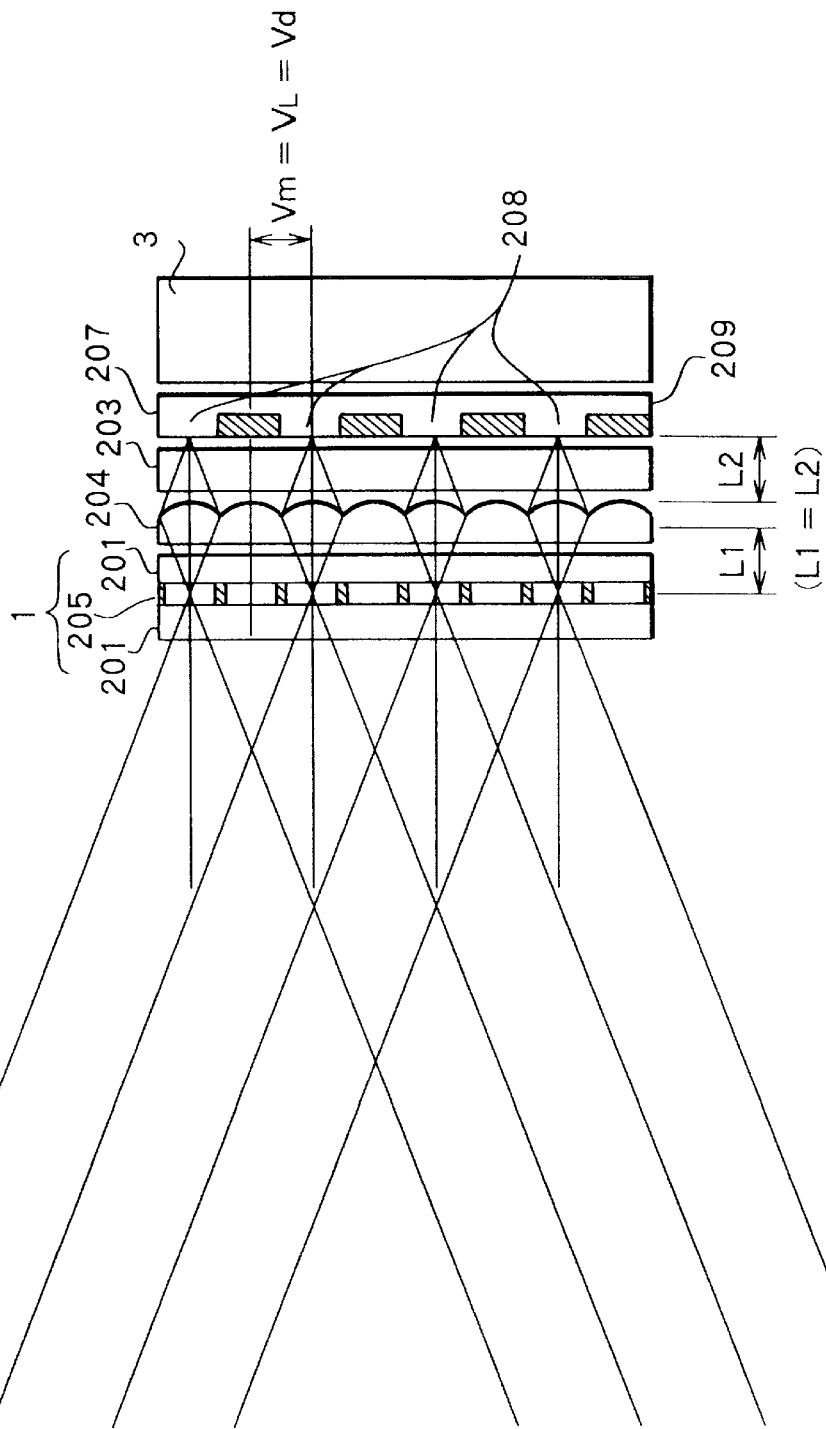
FIG. 4 is a side view of the vertical cross section of the stereoscopic image display device shown in FIG. 1.

FIG. 4 is a side view of the vertical cross section of the stereoscopic image display device shown in FIG. 1. Members not shown in FIG. 3 are included in the representation of FIG. 4. Here it is so arranged that Vd=Vm=VL, L1=L2 and fv=L1/2 will hold so as to satisfy the relations of Equations (1), (2) and (3) cited above, where Vm represents the aperture pitch of the mask pattern in the vertical direction, VL the pitch of the lenticular sheet 204, Vd the pixel pitch in the vertical direction of the liquid crystal display device for the image display, L1 the distance from the display surface of the liquid crystal display device to the principal plane of the lenticular sheet 204 on the user side, L2 the distance from the principal plane lenticular sheet 204 on the side of the mask substrate to the mask pattern and fv the focal length, in the direction of the plane of the drawing of FIG. 4, of the individual cylindrical lenses constructing the lenticular sheet 204. More specifically, as already described in connection with FIG. 3, the left and right images an be observed upon being uniformly separated over the full vertical width of the screen from a prescribed height of the eyes of the user.

In the description rendered above, the stereoscopic image display device is constructed by disposing the liquid crystal display device 1, the lenticular sheet 204, the lenticular sheet 203 and the checkered apertures 208 in the order mentioned starting from the user side. However, the order of the lenticular sheet 203 and lenticular sheet 204 may be interchanged. In such case a stereoscopic liquid crystal display device can be constructed in a manner similar to that described above by redesigning the pitches and focal lengths of the lenticular sheets 203, 204 as well as the horizontal and vertical pitch of the checkered apertures so as to satisfy all of the above-mentioned conditions.

In this description of the optical principles of this embodiment, a light source patterned using a light source panel and a checkered mask is formed. However, it is obvious that the stereoscopic liquid crystal display device of this embodiment can be constructed using a light source patterned by self-light-emitting element such as a CRT.

(2) Principle of Display Capable of Switching Between and Mixing Two- and Three-Dimensional Displays In the case described above, a stereoscopic image is displayed at all times over the entire surface of the display screen. However, by using a spatial light modulating element such as a liquid crystal display in place of the checkered mask, it is possible to display a stereoscopic image only in a prescribed area of the image display surface and display an ordinary two-dimensional image in the remaining portion. Further, if the same means are used, it is possible to switch between a two-dimensional display and a three-dimensional display over the entirety of the screen rather than present a stereoscopic display only in a prescribed area that is part of the screen.

Figure 5:
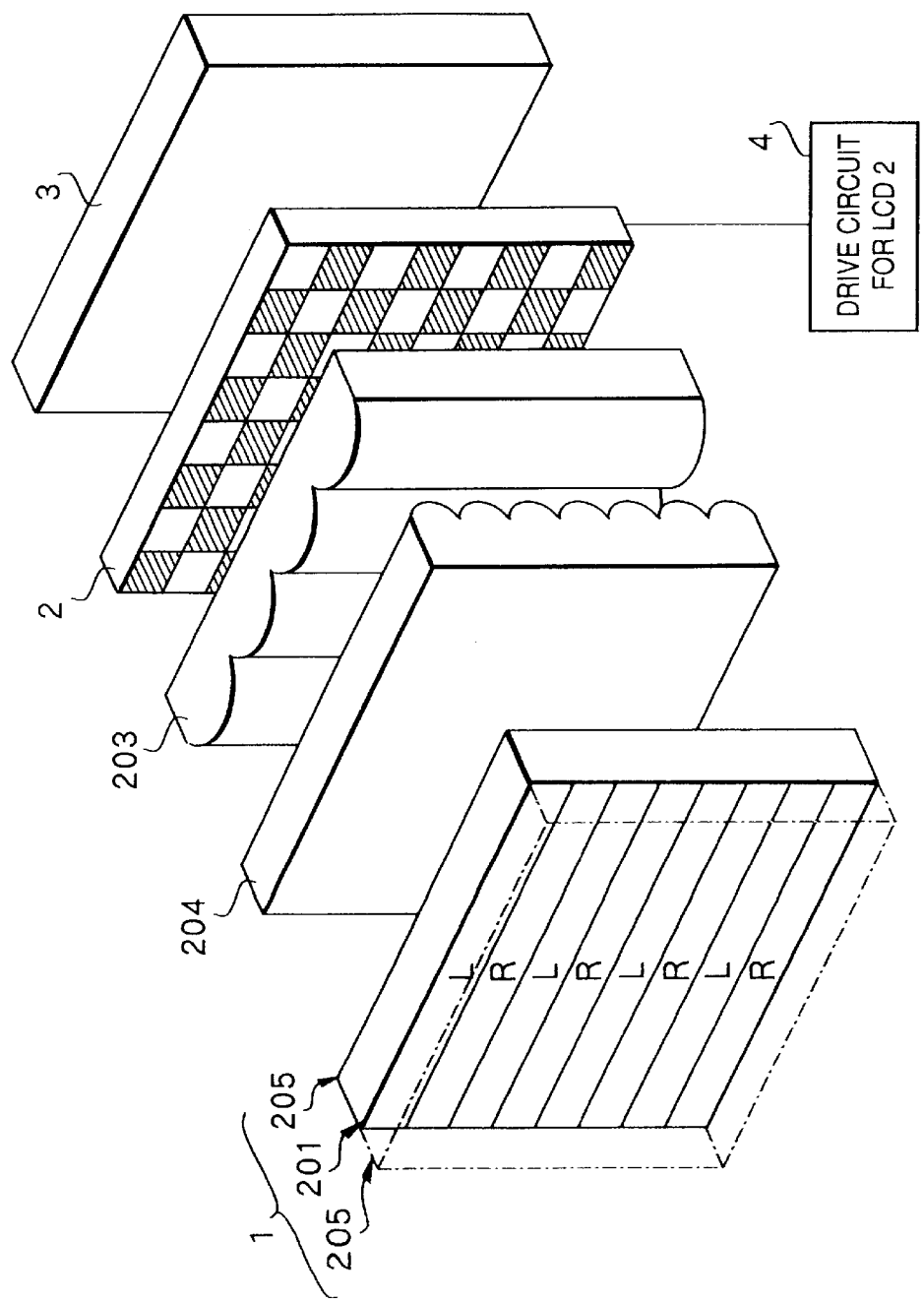
FIG. 5 is a perspective view for describing a stereoscopic image display device that makes it possible to switch between and mix a two-dimensional display and a three-dimensional display.

FIG. 5 is a perspective view for describing a stereoscopic image display device that makes it possible to switch between and mix a two-dimensional display and a three-dimensional display. In the description of principles given above, the mask substrate 207 on which the mask pattern having the checkered apertures is formed is such that the apertures are fixed. According to the first embodiment, however, a transmissive-type spatial light modulating element 2 (LCD 2) such as a transmissive-type liquid crystal element is used instead of the mask substrate 207. The other optical components are the same and similarly disposed. A circuit 4 for driving the LCD 2 presents a three-dimensional display in part of the display device by painting a partial checkered mask pattern on the spatial light modulating element 2 based upon data that has been subjected to prescribed processing.

Figure 6A:
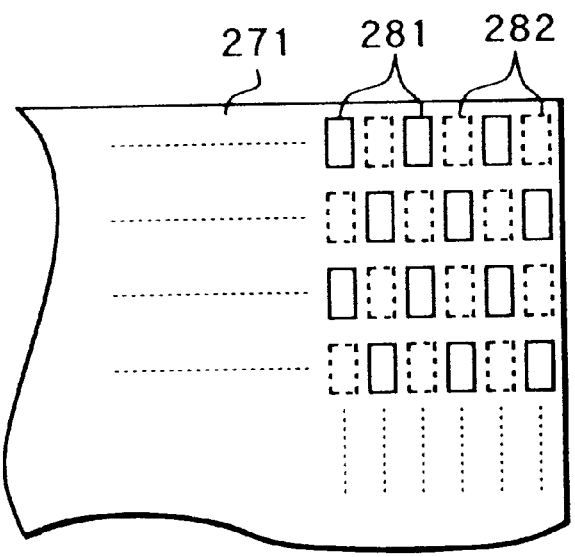
FIGS. 6A–6C are diagrams useful in describing a stereoscopic image display method based upon the stereoscopic display device shown in FIG. 5.
Figure 6B:
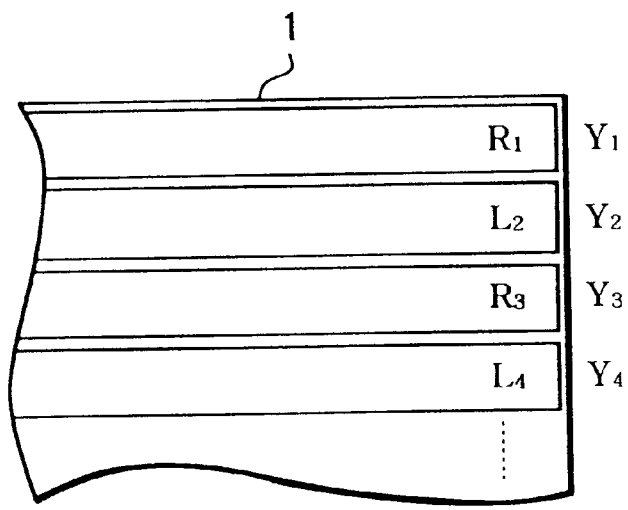
Figure 6C:
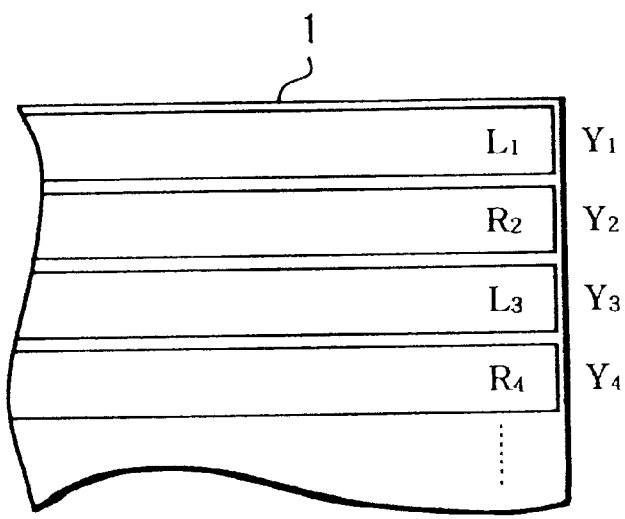

A method of displaying a stereoscopic image in such case where the spatial light modulating element 2 is used in the manner shown in FIG. 5 will be described next. FIGS. 6A–6C are diagrams useful in describing a stereoscopic image display method based upon the stereoscopic display device shown in FIG. 5. FIG. 6A illustrates a pattern of light transmitting and light blocking portions on the spatial light modulating element 2, and FIGS. 6B, 6C illustrate display pixel portions of the liquid crystal display device 1 for an image display. Left and right parallax images are displayed on the liquid crystal display device 1 upon being combined as alternating horizontal stripes in a manner similar to that of the stereoscopic display described above.

In a case where the light transmitting portions of the spatial light modulating element 2 are formed in rectangular portions 281 indicated by the solid lines and rectangular portions 282 are formed as the light blocking portions, as shown in FIG. 6A, first synthesized stripe images come into correspondence, where these images are synthesized in such a manner that a right parallax image R1 occupies a first scanning line, a left parallax image L2 occupies a second scanning line, a right parallax image R3 occupies a third scanning line and so on, as illustrated in FIG. 6B, so that left and right parallax images are observed in separated form by the left and right eyes of the user. On the other hand, in a case where the light transmitting portions of the spatial light modulating element 2 are formed in the rectangular portions 282 indicated by the dotted lines and the rectangular portions 281 are formed as the light blocking portions, as shown in FIG. 6A, first synthesized stripe images come into correspondence, where these images are synthesized in such a manner that a left parallax image L1 occupies a first scanning line, a right parallax image R2 occupies a second scanning line, a left parallax image L3 occupies a third scanning line and so on, as illustrated in FIG. 6C, so that left and right parallax images are observed in separated form by the left and right eyes of the user. By displaying this state alternately in time-division fashion, the resolution of the left and right parallax images that is halved by stripe synthesis is preserved. In other words, a high-resolution display can be presented since there will be no decline in resolution.

In a case where the rewrite speed of the display pixel portion of the liquid crystal display device land the rewrite speed of the spatial light modulating element differ, it is possible to synchronize the operation of the display driver circuitry and the operation of the circuitry that drives the spatial light modulating element by making the rewrite timing of the image and the rewrite timing of the aperture pattern agree so that the user will not see the boundary. At this time the rewriting of the aperture pattern and parallax images may be performed by achieving synchronization pixel by pixel on the corresponding scanning lines of the display pixel portion of the liquid crystal display device and the liquid crystal device, or the aperture pattern and parallax images may be rewritten by achieving synchronization every corresponding scanning line.

In an ordinary stereoscopic display scheme in which the two parallax images composed of the right- and left-eye images are displayed in time-division fashion screen by screen, it is required that the frame frequency be made higher than 120 Hz in order to prevent flicker. However, with the scheme of this embodiment, the screen image is such that the left and right parallax images are displayed by being combined in the form of horizontal stripes. This means that a high-resolution image can be observed without flicker at a frame frequency of 60 Hz.

As mentioned above, it is so arranged that the relations Vd=Vm=VL, L1=L2 and fv=L1/2 will be satisfied, where Vm represents the aperture pitch of the mask pattern in the vertical direction, VL the pitch of the lenticular sheet 204, Vd the pixel pitch in the vertical direction of the liquid crystal display device for the image display, L1 the distance from the display surface of the liquid crystal display device to the lenticular sheet 204, L2 the distance from the lenticular sheet 204 to the mask pattern and fv the focal length, in the direction of the plane of the drawing of FIG. 3, of the individual cylindrical lenses constructing the lenticular sheet 204. Since Vd=Vm holds, a liquid crystal display device having a pixel pitch the same as that of the liquid crystal display device for the image display can be used as the spatial light modulating element.

Figure 7A:
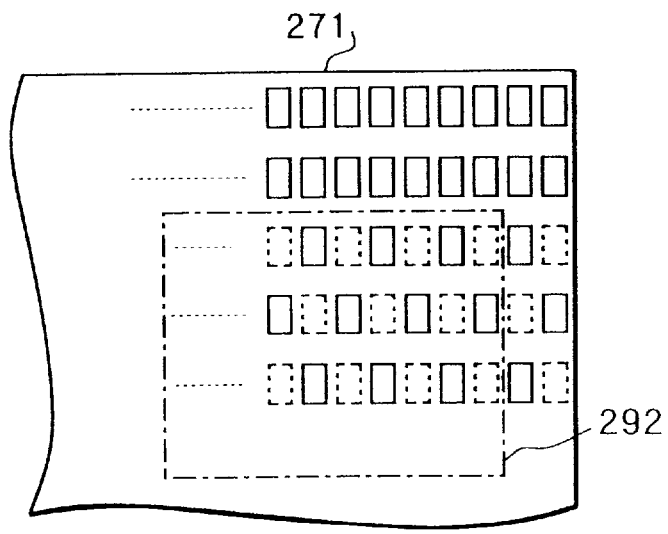
FIGS. 7A, 7B are diagrams useful in describing a method of presenting a mixed display of a three-dimensional image and a two-dimensional image by the stereoscopic display device shown in FIG. 5.
Figure 7B:
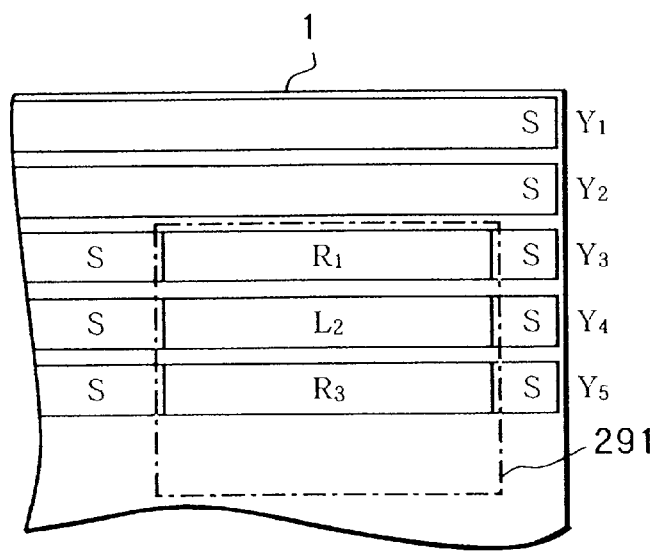

The means for switching between and mixing two- and three-dimensional displays in this arrangement will now be described. In the above-described arrangement in which the transmissive-type spatial light modulating element 2 such as the transmissive-type liquid crystal element is used, a prescribed area is adopted for the stereoscopic image display and the remaining portion is made to display the two-dimensional image by controlling the aperture pattern. This will be described with reference to FIGS. 7A and 7B, which are diagrams useful in describing a method of presenting a mixed display of a three-dimensional image and a two-dimensional image by the stereoscopic display device shown in FIG. 5. FIG. 7A illustrates a pattern of light transmitting and light blocking portions on the spatial light modulating element 2, and FIG. 7B illustrates an image pattern on the display pixel portion of the liquid crystal display device 1. As shown in FIG. 7B, horizontal stripe images in which left and right parallax images R, L, R, . . . are alternately combined are displayed in a stereoscopic-image display area 291 of the liquid crystal display device 1, and an ordinary two-dimensional image S is displayed in the other area.

The pattern of light transmitting portions and light blocking portions of the spatial light modulating element 2 corresponding to FIG. 7B is as shown in FIG. 7A. The checkered aperture pattern is adopted in an area 292 of the spatial light modulating element 2 that corresponds to the area 291 of the liquid crystal display device 1 that displays the stereoscopic image. As a result, in the portions corresponding to the areas 291, 292, left and right parallax images in which transmitted light is provided with directivity reach the left and right eyes of the user upon being separated. In other areas all of the apertures are placed in the light transmitting state so that the two-dimensional image S arrives at the left and right eyes of the user. This makes it possible to display a stereoscopic image only in the area 291. Furthermore, if it is arranged to use the method in which the first synthesized stripe images and the second synthesized stripe images are displayed in alternating fashion and the aperture pattern is changed in synchronization with this display, as mentioned above, then the resolution of the stereoscopic image can be raised.

(3) Computer System According to This Embodiment

Figure 8:
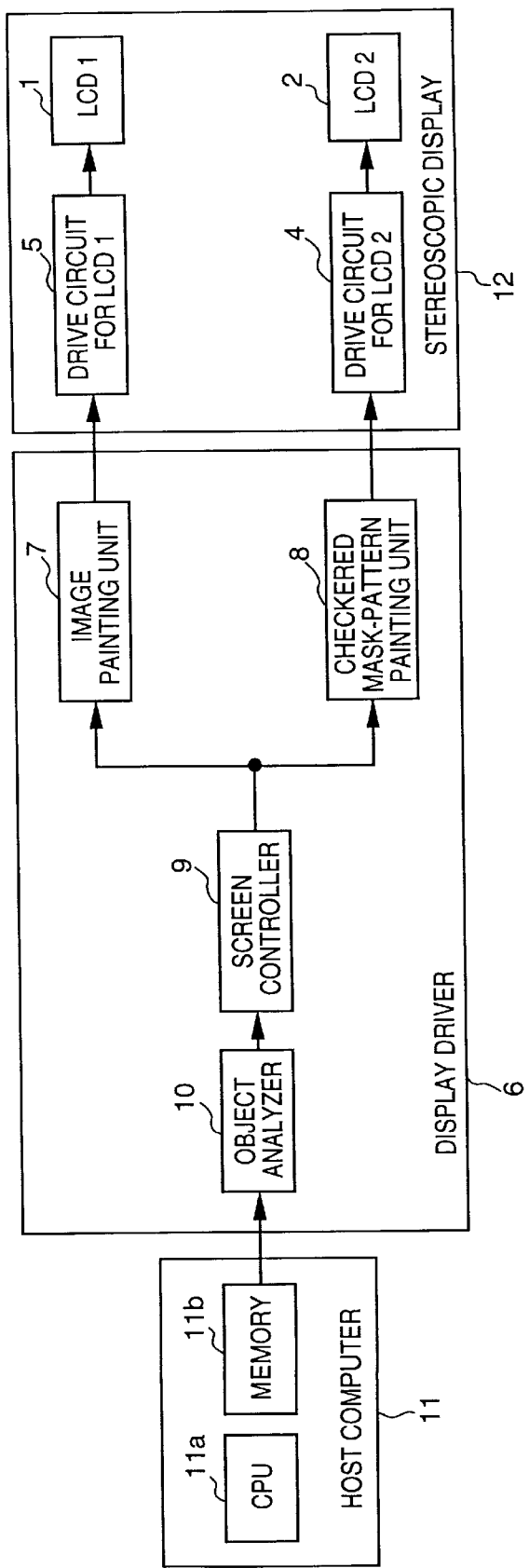
FIG. 8 is a block diagram showing the configuration of a computer system according to the first embodiment.

FIG. 8 is a block diagram showing the configuration of a computer system according to the first embodiment. In this embodiment, a two-dimensional image and a three-dimensional (stereoscopic) image are switched between in all or part of a display screen when an image display is presented or, alternatively, the display screen is provided with several windows and two- and three-dimensional images are displayed in mixed form per each area defined by one of the windows. Shown in FIG. 8 are the liquid crystal display device (LCD) 1 for displaying a two-dimensional image (two-dimensional image information) or a three-dimensional image (three-dimensional image information) on its display surface or both of these images on its surface in mixed form. The spatial light modulating element 2 is constituted by a liquid crystal display device (LCD) 2. As set forth above, the LCD 2 displays the checkered mask pattern on the area corresponding to the stripe images on the LCD 1 in conformity with the display of the stripe images. The checkered mask pattern referred to here is a pattern obtained by alternately arraying checkered light transmitting and light blocking portions which introduce the luminous flux from the stripe pixels of the left and right parallax images, which construct the stripe images displayed on the LCD 1, to the respective prescribed observation positions. Further, the LCD 2 which displays this checkered mask pattern has a matrix structure and is capable of forming the checkered mask pattern to any size at any location on the display screen.

A stereoscopic display 12 has a driver circuit 4 for driving the LCD 2 and a driver circuit 5 for driving the LCD 1. A display driver 6 controls the overall painting operation of the stereoscopic display 12 according to this embodiment. The display driver 6 comprises elements 7, 8, 9 and 10, described below.

An image painting unit 7 controls the painting of data actually painted on the stereoscopic display, namely a two-dimensional image handled heretofore and a three-dimensional image of combined stripes. A checkered mask-pattern painting unit 8 controls the painting of the checkered mask pattern in order that a three-dimensional image will be produced at the designated position and in the designated size, as described in connection with FIG. 7A. A screen controller 9 generates paint signals and distributes these signals to the image paint unit 7 and checkered mask pattern paint unit 8. An object analyzer 10 discriminates and analyzes the type of paint data. A host computer 11 is capable of handling two-dimensional images and three-dimensional images. The host computer 11 updates the signal to the display driver 6 whenever the paint data is updated. It should be noted that the device driver is an electronic circuit that may be provided externally of the host computer or loaded in a slot. Alternatively, the device driver may be implemented by one item of software for the host computer or may be installed as a mixture of software and electronic circuitry. More specifically, the host computer 11 has a CPU 11a and a memory 11b which stores a control program for implementing a processing procedure, which will be described later with reference to the accompanying flowcharts. It may be so arranged that the CPU 11a of the host computer 11 implements the functions of the display driver 6. Here the memory 11b includes a ROM, RAM or magnetic disk drive. Accordingly, it may be so arranged that the control program for implementing the processing procedure (described later) by way of the CPU 11 is supplied from a storage medium such as a floppy disk and stored in a RAM.

(4) Operating Environment, or GUI, of This Embodiment

Figure 9:
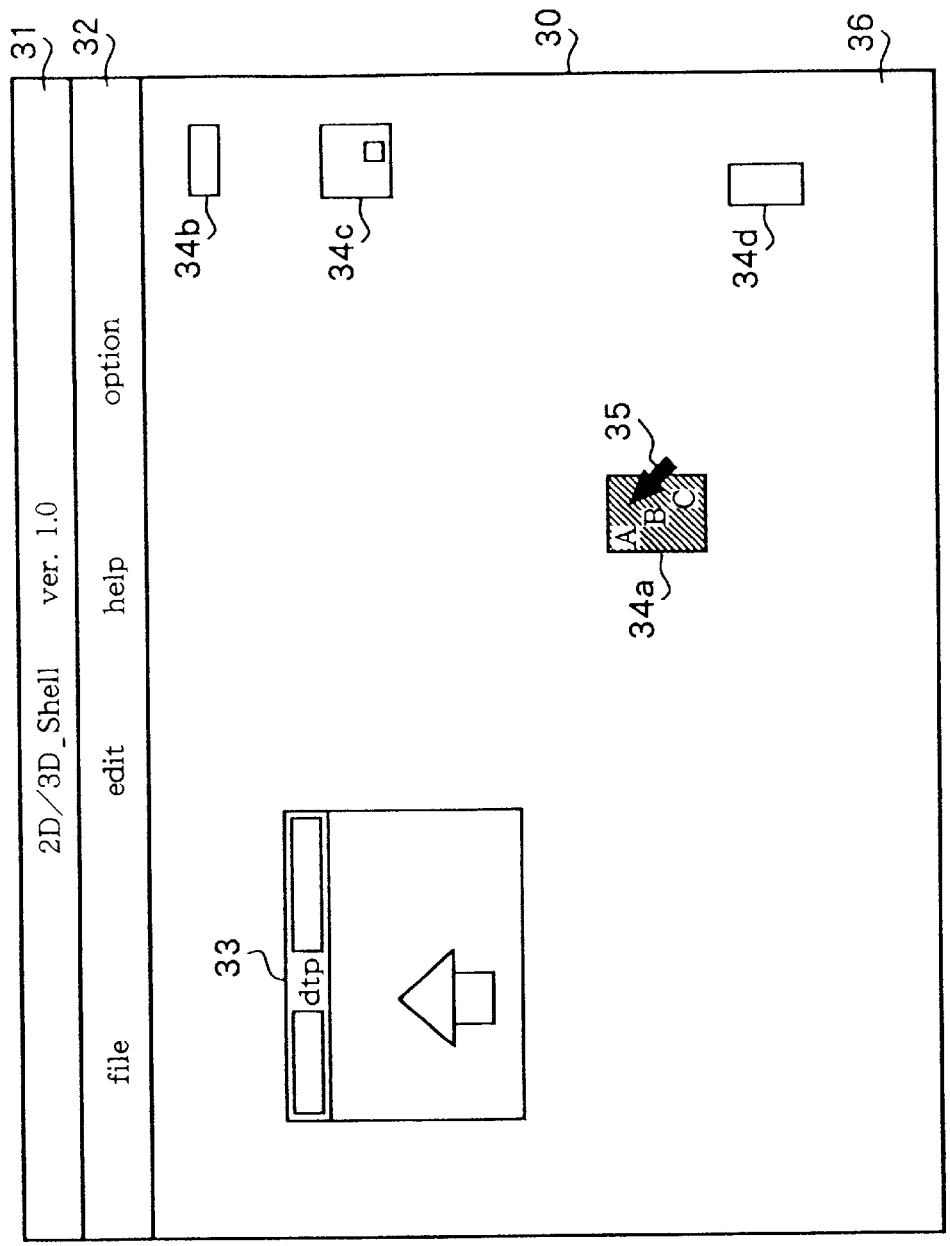
FIG. 9 is a diagram showing an example of the display on a GUI operating according to the first embodiment.

FIG. 9 is a diagram showing an example of the display on a GUI operating according to the first embodiment. FIG. 9 shows the state of the display on the screen of the stereoscopic display 12 connected to the host computer. Shown in FIG. 9 are an outer frame 30 serving as the outermost boundary of the screen, a title bar 31 of the screen, a menu bar 32 used in pull-down menus, a window 33 for displaying an image, icons 34a, 34b, 34c and 34d, which are objects for displaying disk files and input devices for the user to see, a pointer 35 capable of being moved by a mouse (not shown) for selecting objects and entering planar coordinates, and background 36 of the objects. Thus, with the GUI using the icons 34a~34d, window 33 and menu 32, etc., objects such as icons, windows and menus related to file system directories and applications may be moved in order to move, copy and delete files and make inputs and outputs with regard to peripherals, and for the purpose of acquiring, in the desktop window area, locations for performing such operations on the display.

Figure 10:
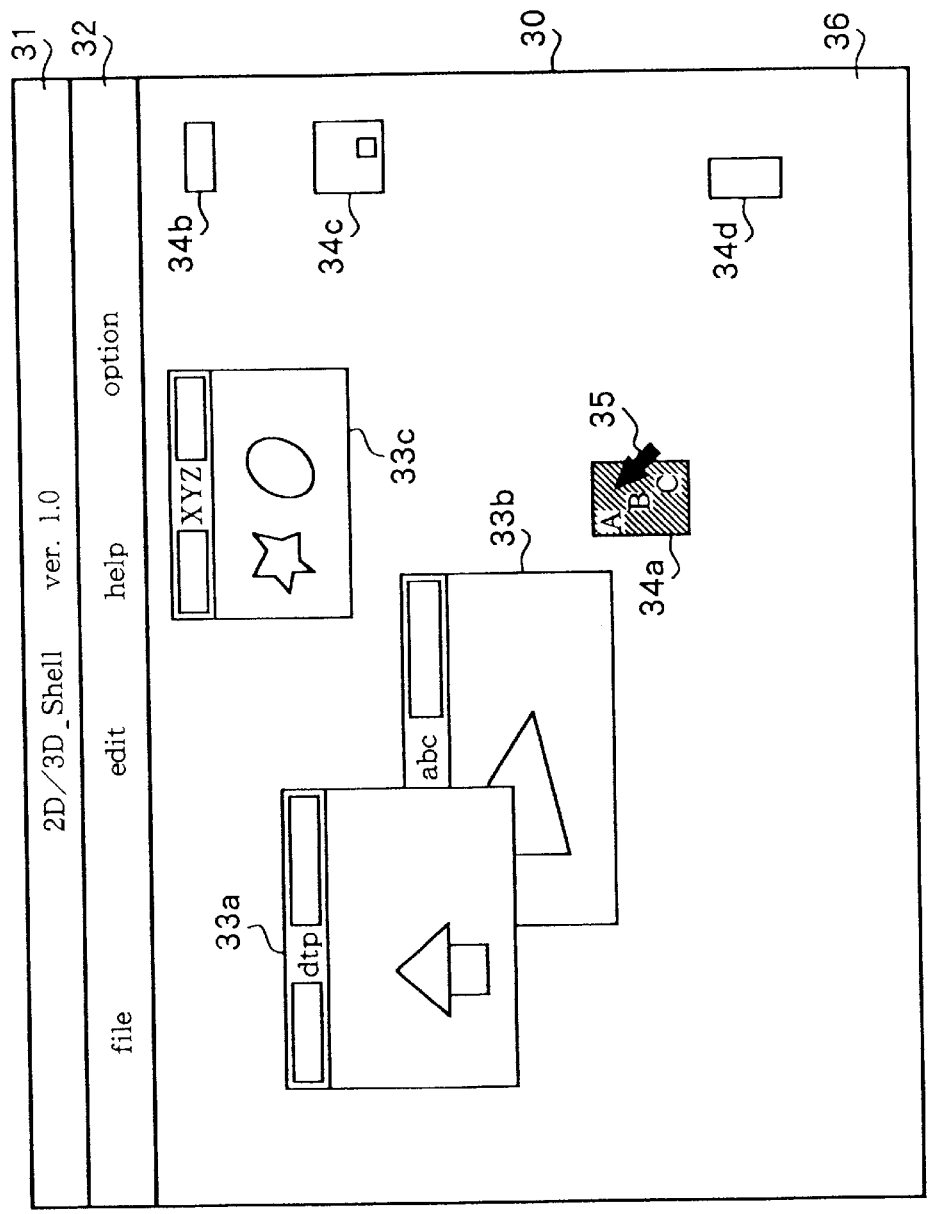
FIG. 10 is a diagram showing an example of a display on a GUI displaying a plurality of windows in the first embodiment.

FIG. 10 is a diagram showing an example of a display on a GUI displaying a plurality of windows in this embodiment. Depicted in FIG. 10 are windows 33a, 33b and 33c opened by the user to display images. Some objects may be concealed by overlapping of the windows. When windows are overlapping, the window displayed on top will be that activated or that in which the latest event has occurred.

(5) Operation of Applications, Especially Event Processing

Figure 11:
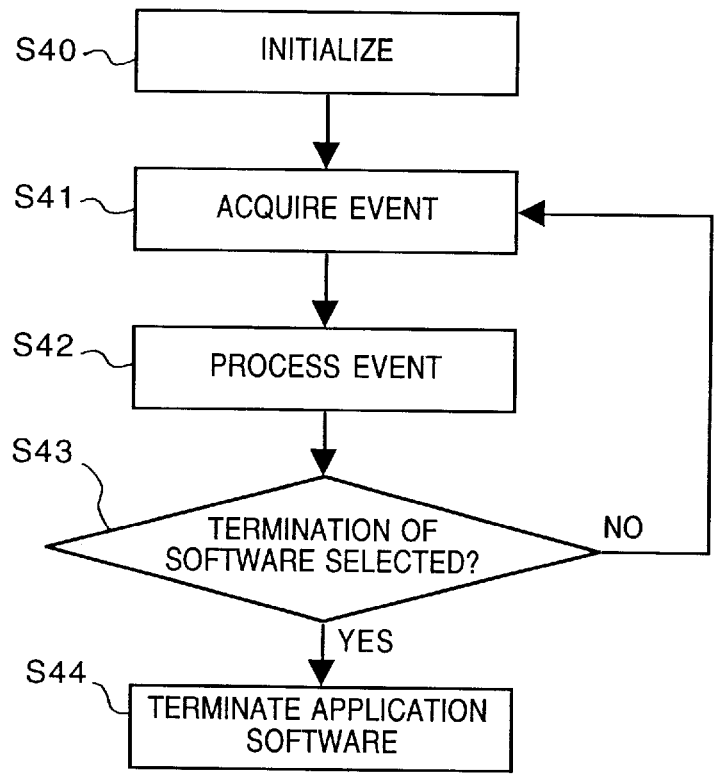
FIG. 11 is a flowchart illustrating the flow of processing of an application which operates in a GUI environment.

An overview of application operation processing will be described next. FIG. 11 is a flowchart illustrating the flow of processing of an application which operates in a GUI environment. The processing illustrated in this example is also referred to as event-driven processing.

Initialization is performed at step S40 in FIG. 11. Initialization processing includes memory acquisition in the computer system in order to actually run applications, protection of register content used or generation of objects such as necessary windows and icons. This is followed by step S41, which is processing for acquiring an event that the user initiates in the computer. The term "event" refers to movement of the mouse, pressing or release of a mouse button, pressing or release of various keys, insertion of a disk, etc.

Next, processing corresponding to the event acquired at step S41 is executed at step S42. For example, if a menu item "OPEN FILE" has been selected from the pull-down menu using the mouse, then the corresponding processing is executed. Next, at step S43, it is determined whether this event is an event (an end event) brought about by the user acting upon the computer for the purpose of ending a currently running application. If the event is not an end event, then processing returns to step S41 so that a new event is acquired. If it is determined at step S43 that the event is an end event, then the program proceeds to step S44, at which prescribed processing such as processing for releasing acquired memory or closing a window is executed, whereupon the running of the application is terminated.

(6) Structure of Three-Dimensional Image File Used in This Embodiment

Figure 12:
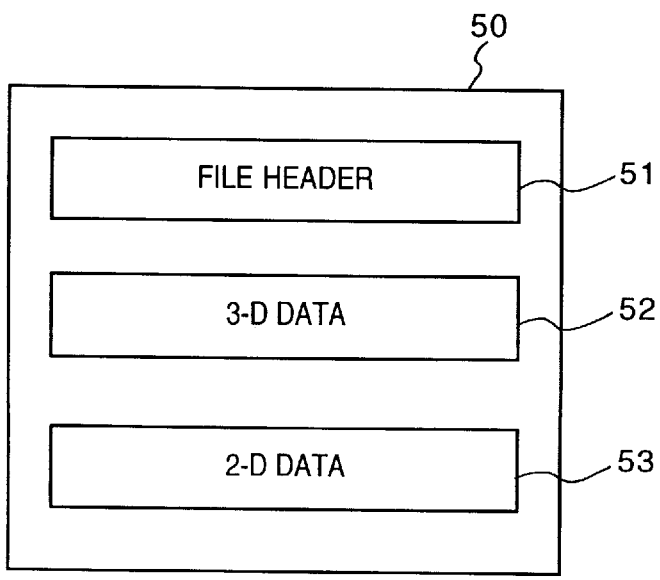
FIG. 12 is an explanatory view showing the structure of three-dimensional image data in the first embodiment.

The data structure of an image file painted in a window, which is an object used in this embodiment, capable of displaying a three-dimensional image will be described as an illustrative example. FIG. 12 is an explanatory view showing the structure of three-dimensional image data according to this embodiment. A three-dimensional image file 50 according to this embodiment includes a file header 51 representing the attributes of the above-mentioned image file, three-dimensional image data 52 composed of combined stripes, and two-dimensional image data 53 representing the distinctive two-dimensional state in a parallax image used in stripe synthesis. In general, file name, file creation date, file capacity, image format and image compression means are described in the file header. The application analyzes the header, reads in the image data and causes the computer to paint the image. By contrast, in the case of this embodiment, the information in the header is supplemented by data peculiar to a three-dimensional image, such as whether of not a three-dimensional image is to be displayed, the number of viewpoint images of the three-dimensional image, the amount of parallax of the three-dimensional image and whether or not a two-dimensional image is present.

Though three-dimensional image data obtained by combining stripes is stored as the three-dimensional image data in the three-dimensional image file 50 according to this embodiment, this does not impose a limitation upon the form of the three-dimensional image data. For example, the form adopted may be one in which the three-dimensional image is composed of a plurality of parallax images and the stripes are combined by the application.

Further, in order to clarify the file of the image having three-dimensional image data, the file name may be provided with an extension. Further, data relating to the frame of the window may be added to the file header, in which case it is permissible to store data for displaying a window frame which indicates that it is for a three-dimensional display, namely a display different from the two-dimensional display.

(7) Operation When Changeover is Made to Three-Dimensional Window

Figure 13:
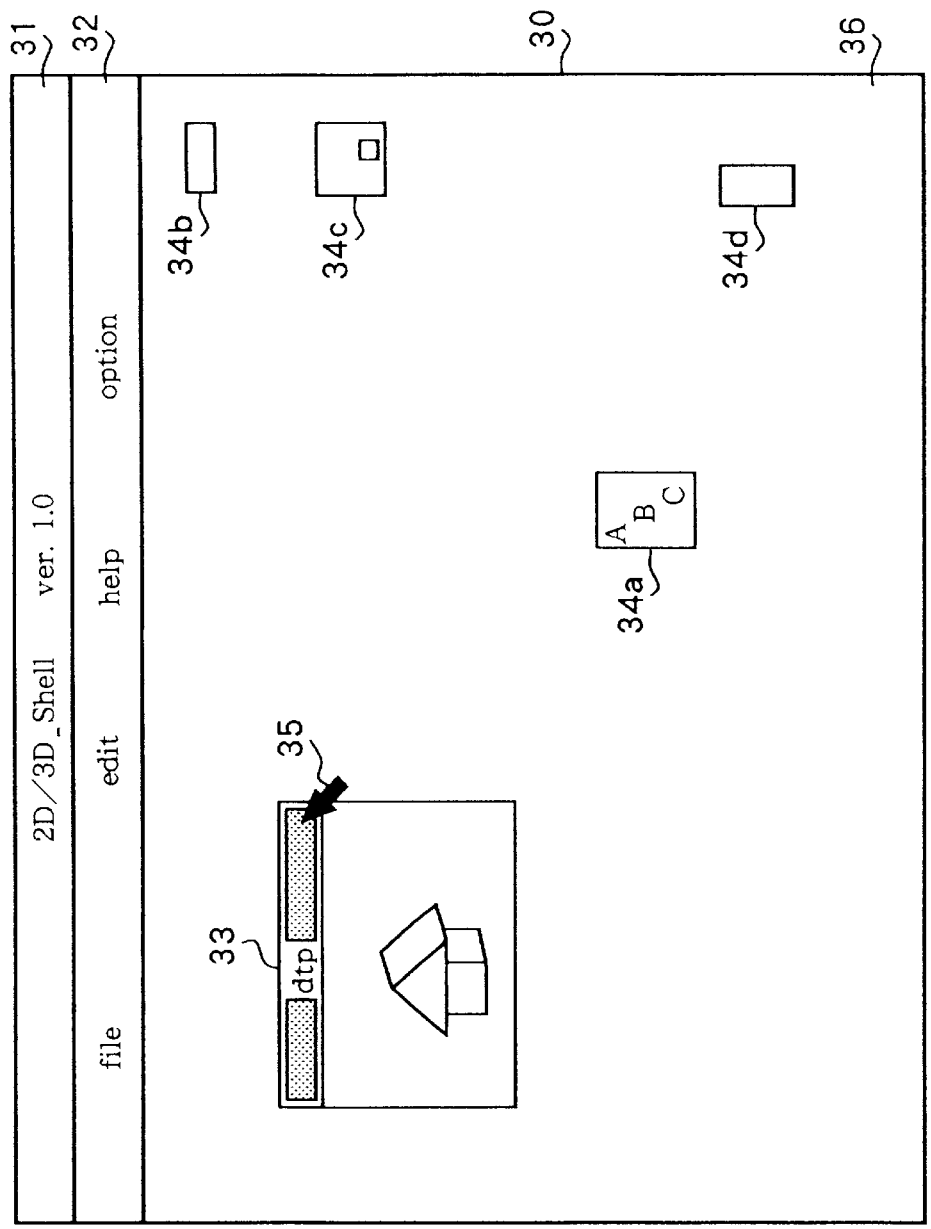
FIG. 13 is a diagram showing a state in which a partial changeover to a three-dimensional display is executed in a GUI environment of the first embodiment.

The GUI environment has been described with reference to FIGS. 9 and 11. The handling of a three-dimensional image file, which is a characterizing feature of this embodiment, will now be described with reference to FIGS. 13 and 14. FIG. 13 is a diagram showing a state in which a partial changeover to a three-dimensional display is executed in a GUI environment according to this embodiment.

The window 33 which is an object if FIGS. 9 and 13 is a three-dimensional image file described above with reference to FIG. 12. In the state shown in FIG. 9, the pointer 35 is pointed at the icon 34a, at which time the color or brightness of the icon 34a changes to indicate that it has been activated. In other words, this indicates that the current of processing has shifted to this icon. The icon 34a can now be dragged by the mouse to move it to another location or the file corresponding to the icon 34a can be opened by double clicking on it using the mouse.

Figure 15:
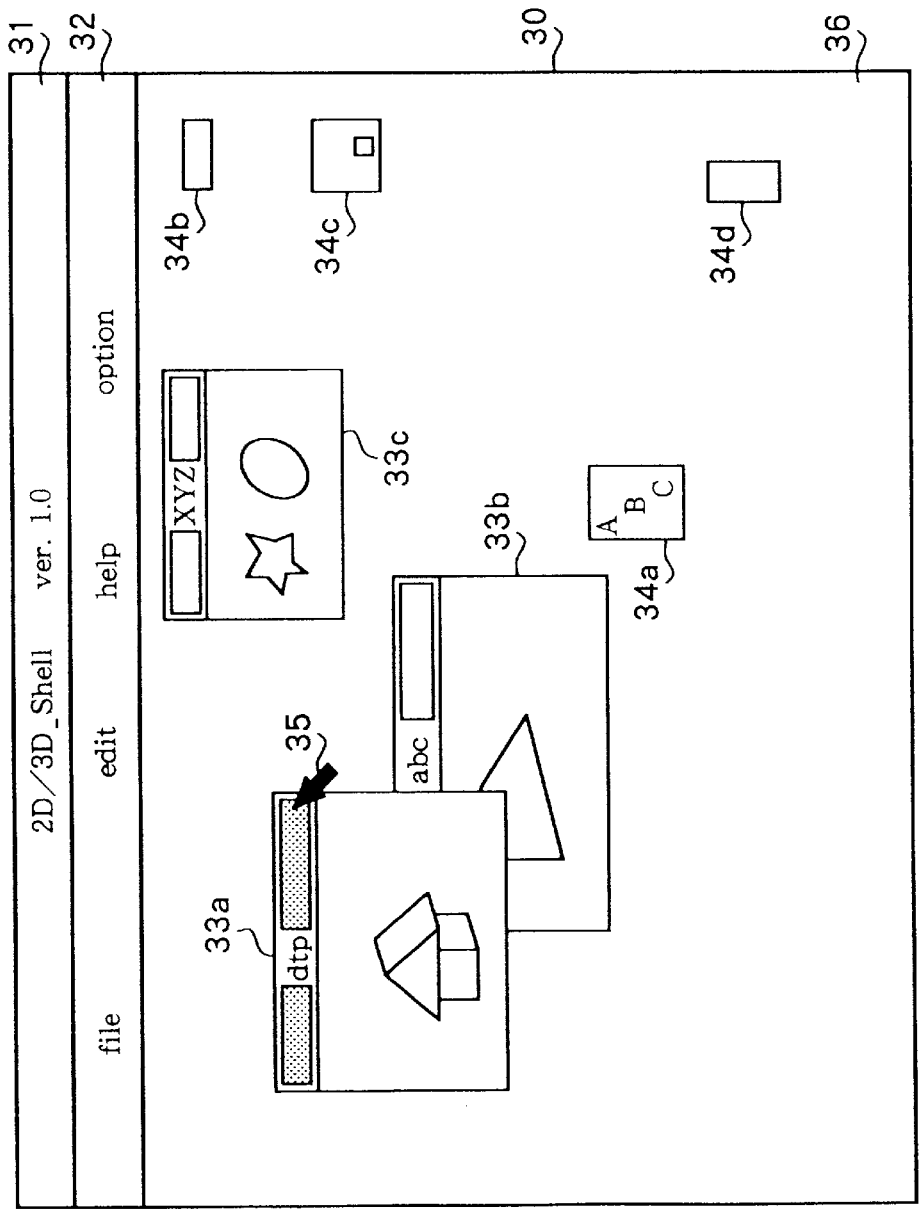
FIG. 15 is an explanatory view for describing circumstances when a window 33a in FIG. 10 is activated and a three-dimensional display is presented.

Next, assume that, starting from the state shown in FIG. 9, the user employs the mouse to move the pointer 35 to the window 33, which is the three-dimensional image file, and to select the window 33. When this is done, the current of processing shifts to the window 33 and this window is activated, as shown in FIG. 15. Since the window 33 corresponds to the three-dimensional image file, a three-dimensional image is painted within the window 33. (Since the limitations of a planar drawing do not allow an actual stereoscopic representation by binocular parallax, hereinafter a three-dimensional image display will be expressed by a perspective view and described using this view.)

Figure 14:
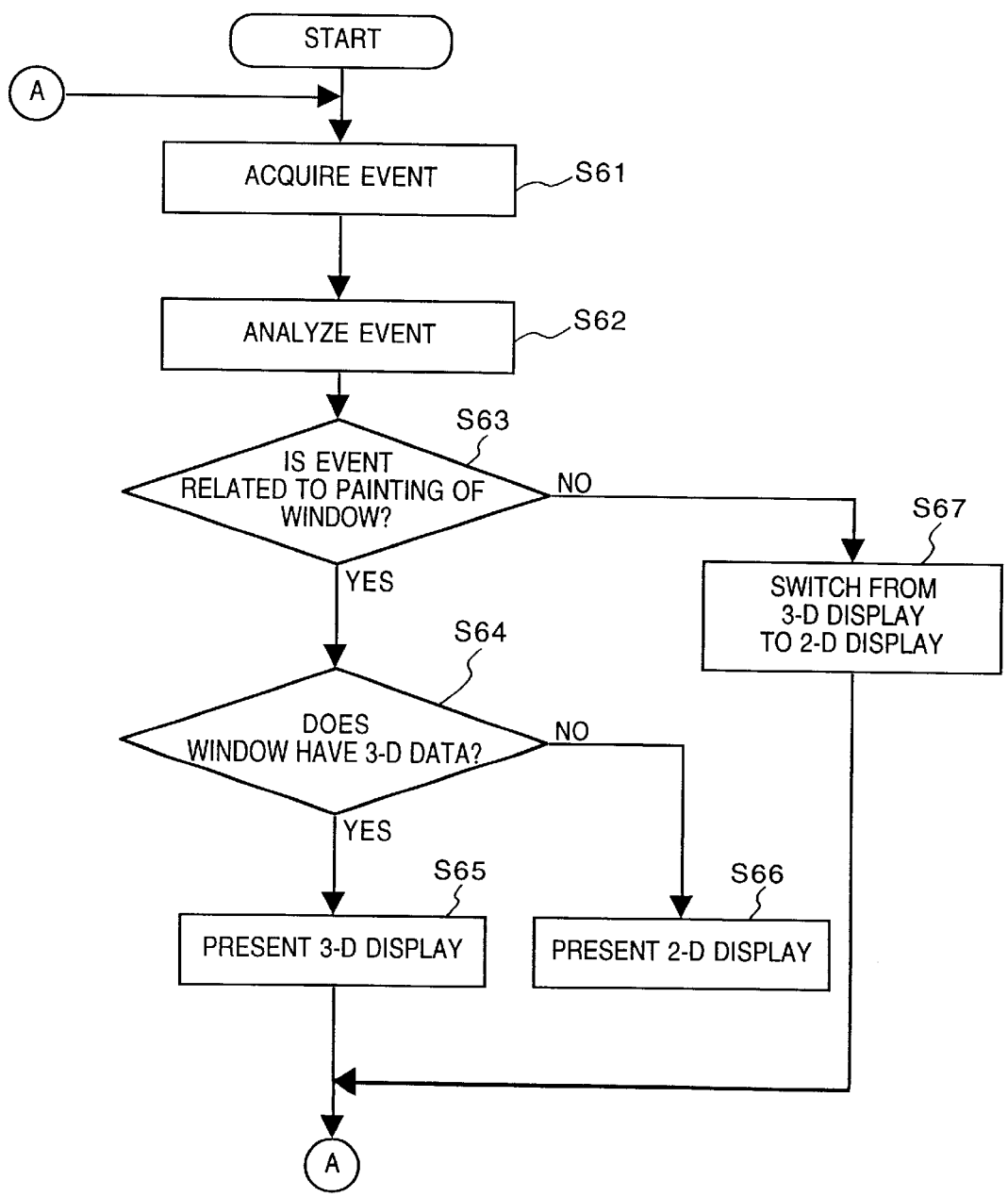
FIG. 14 is a flowchart for describing the procedure of image display processing in the first embodiment.

Processing in this case will be described with reference to FIG. 14, which is a flowchart for describing the procedure of image display processing according to this embodiment.

A mousing event is acquired at step S61 by sensing whether or not the mouse has been moved and whether or not the mouse button has been pressed. This is followed by step S62, at which the content of the mousing event acquired at step S61 is analyzed. Next, at step S63, it is determined, based upon the result of event analysis performed at step S62, whether the mousing event is an event related to painting of a window. An event related to painting of a window refers to a case in which a given window is activated. If it is judged that the event is related to painting of a window, then the program proceeds to step S64. Here it is determined, based upon the information in the file header 51, whether this window has three-dimensional image data. In this example, whether or not a three-dimensional image is to be displayed has been recorded as information in the header 51 and therefore the decision of step S64 is rendered promptly by making reference to this information. Further, these processing operations may be executed by a file extension.

If it is determined at step S64 that this window has a three-dimensional image file, then the program proceeds to step S65. Here the display driver 6 is controlled to present the three-dimensional display. More specifically, on the basis of the three-dimensional image data obtained from the three-dimensional image data 52, the screen controller 9 controls the image painting unit 7 and the checkered mask-pattern painting unit 8 and causes a three-dimensional display to be presented at the position of the window of the stereoscopic display 12. That is, the screen controller 9 notifies the image painting unit 7 of the stereoscopic image data to be displayed, its display position and size, and notifies the checkered mask-pattern painting unit 8 of the display, position and size, thereby causing a stereoscopic image display to be presented in the above-mentioned window.

On the other hand, if it is determined at step S64 that the image file of this window does not possess three-dimensional image data, then the program proceeds to step S66, at which a two-dimensional image is displayed by the conventional technique.

If it is determined at step S63 that the generated mousing event is not related to painting of a window, then the program proceeds to step S67. Here a two-dimensional display is presented, using the two-dimensional data of the three-dimensional image, in relating to the window presenting the three-dimensional display.

In connection with steps S65 and S66, it may be so arranged that in a case where a window placed in the deactivated state was presenting a three-dimensional display, the display in this window is changed over to a two-dimensional display.

A plurality of windows may also be displayed, as shown in FIG. 10. FIG. 15 is an explanatory view for describing circumstances when a window 33a in FIG. 10 is activated and a three-dimensional display is presented. Here the window 33a has been activated, i.e. the three-dimensional display window has been selected by the user, and therefore is displayed preferentially with regard to the other windows.

In accordance with the processing described above, it is determined whether a selected object possesses three-dimensional data. If this is found to be the case, a changeover is made to the three-dimensional display automatically to display the three-dimensional image. This improves the operability of a display device capable of presenting a mixed display of two- and three-dimensional images.

When a three-dimensional image is painted at step S65, naturally the result of the analysis performed at step S62 is reflected. For example, if, when a window is opened anew, the display of the two-dimensional image is smaller than the window image, the blank space is filled by suited background.

Second Embodiment (1) Difference Between This Embodiment and First Embodiment

In the first embodiment described above, the checkered mask pattern can be formed to any size at any position on the screen and mixing of two- and three-dimensional displays is possible, thereby providing a user-friendly environment. However, with the arrangement of the apparatus according to the first embodiment, the liquid crystal element serving as the light modulating element that generates the checkered mask pattern is a matrix structure, the electrode patterns, electronic circuitry for drive and driver software of which are complicated. This tends to raise cost. In addition, the light transmittance of the liquid crystal display itself is poor. Consequently, in order to present a display for the user in which light passes through two liquid crystal devices, an extremely high-output backlight is required.

In contrast to the above, the second embodiment is described with regard to a computer system having a stereoscopic display in which two- and three-dimensional displays are switched between over the entire screen by means of a control element having optical directivity that is capable of controlling diffuse transmission and transparent transmission by voltage in an optical system that produces directivity. More specifically, the stereoscopic display method of the second embodiment is so arranged that two- and three-dimensional displays are switched between over the entire screen by means of a control element having optical directivity.

Figure 16:
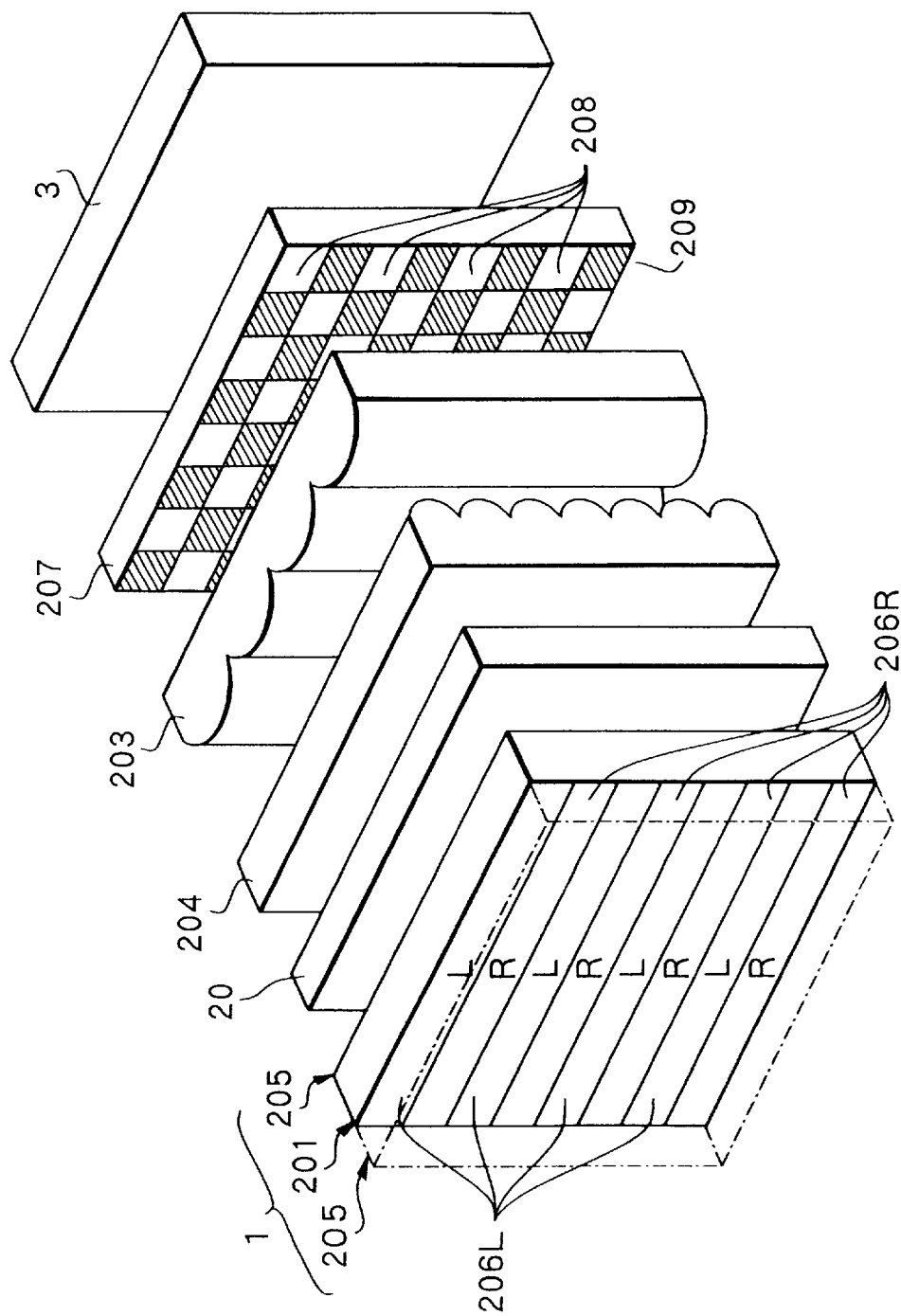
FIG. 16 is a perspective view showing the principal components of a second embodiment of the present invention.

(2) Changeover Between and Mixing Two- and Three-Dimensional Displays According to Second Embodiment FIG. 16 is a perspective view showing the principal components of the second embodiment. The principle of the stereoscopic display method in the second embodiment is similar to that of the crossed-lenticular scheme described in the first embodiment and need not be described in detail again.

As shown in FIG. 16, the device according to this embodiment includes an optically directive control element 20 which comprises a polymer dispersed liquid crystal (PDLC). The element 20 is capable of being controlled, by applied voltage, to transmit incident light transparently as is or to transmit the incident light diffusely, as will be described later in connection with FIGS. 17A and 17B. More specifically, when a three-dimensional display is presented, the optically directive control element 20 is controlled for transparent transmission, the illuminating light is provided with directivity by the crossed-lenticular scheme and the left and right parallax images are observed respectively by the left and right eyes of the user, whereby a stereoscopic display is presented. Conversely, when a two-dimensional display is presented, the optically directive control element 20 is controlled for diffuse transmission and the luminous flux directivity produced by the crossed-lenticular scheme is canceled to present a two-dimensional display. By thus controlling the voltage applied to the optically directive control element 20, it is possible to switch between two- and three-dimensional displays.

(3) Switching Principle Using PDLC

Figure 17A:
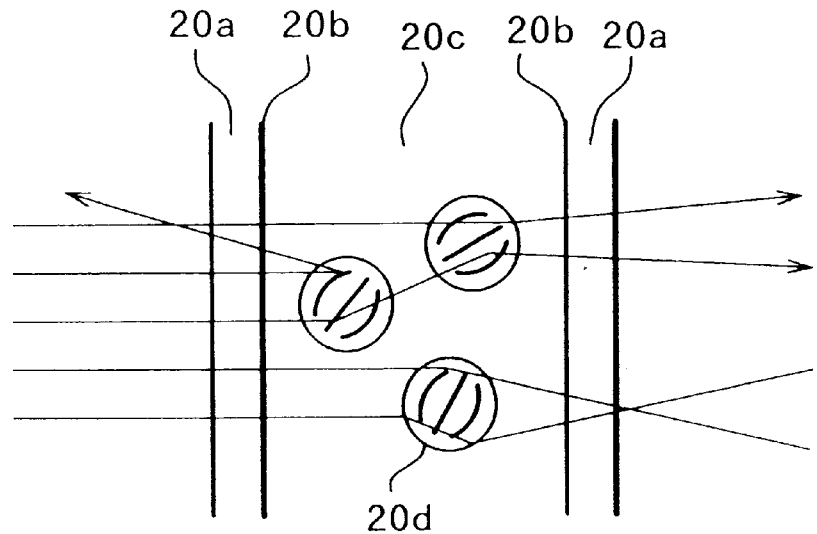
FIGS. 17A, 17B are diagrams showing the principles of an optically directive control element comprising a polymer dispersed liquid crystal used in the second embodiment.
Figure 17B:
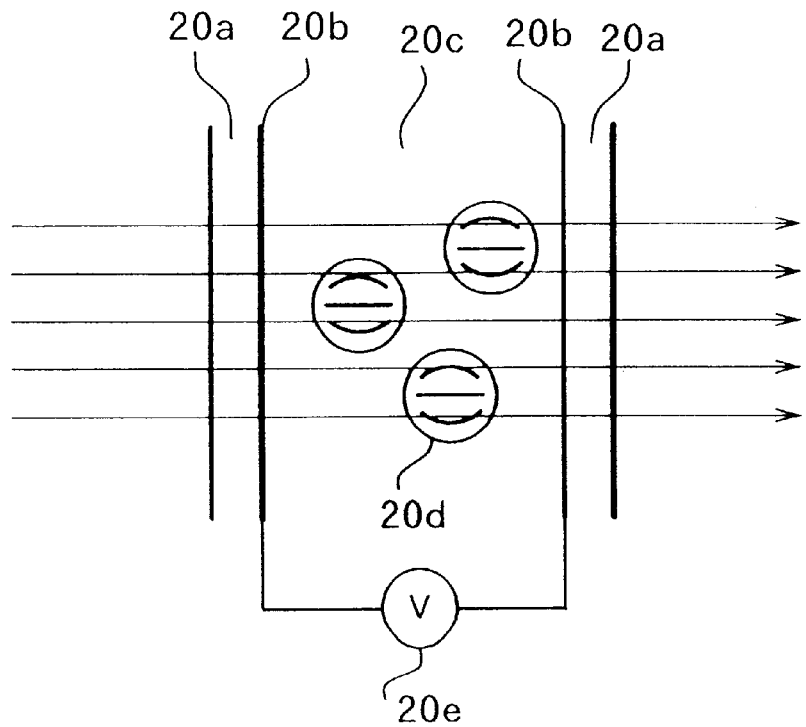

FIGS. 17A, 17B are diagrams showing the principles of the optically directive control element 20 comprising the polymer dispersed liquid crystal used in this embodiment. Transparent electrodes 20b are provided on the inner side of transparent substrates 20a such as glass or plastic film so as to sandwich a polymer 20c in which liquid crystal molecules 20d have been dispersed.

In the OFF state (FIG. 17A) in which voltage is not being applied, the optic axes of the liquid crystal molecules are randomly arrayed and the extraordinary refractive index does not agree with the refractive index of the polymer 20c. As a result, light is scattered at the boundary where the refractive indices differ. In the ON state (FIG. 17B) in which voltage is being applied, the optic axes of the liquid crystal molecules become aligned in the direction of the electric field, as shown in FIG. 17B, and the ordinary refractive index substantially agrees with the refractive index of the polymer 20c. As a result, the incident light is transmitted without being scattered.

When a stereoscopic image is to be displayed over the full screen of the stereoscopic display device shown in FIG. 16, a voltage is applied to the entire surface of the optically directive control element 20 to establish the non-scattering state illustrated in FIG. 17B. As a result, the illuminating light obtained using the lenticular sheets 204, 203 and mask pattern 209 impinges upon the eyes of the user without the directivity thereof being disturbed. This makes possible stereoscopic vision.

On the other hand, when a two-dimensional image is displayed over the full screen of the display device, a voltage is not applied to the optically directive control element 20, the light-scattering state shown in FIG. 17A is achieved and the two-dimensional image to be displayed is displayed on the liquid crystal display device 1. In this case the illuminating light from the backlight 3 has directivity until the light impinges upon the optically directive control element 20. However, since the illuminating light is diffused by the optically directive control element 20, as shown in FIG. 17A, the directivity of the luminous flux is disturbed and the image can be observed in the same manner as presented by an ordinary two-dimensional display.

By controlling the directivity of the incident light using the optically directive control element 2C in the manner described above, a display switched between a two-dimensional display and a stereoscopic image display becomes possible with the simple arrangement of a spatial light modulating element. Further, as long as the optically directive control element 20 is placed between the liquid crystal display device 1 and the mask pattern 209, there is no limitation upon the position of the optically directive control element.

(4) Apparatus Configuration According to Second Embodiment

Figure 18:
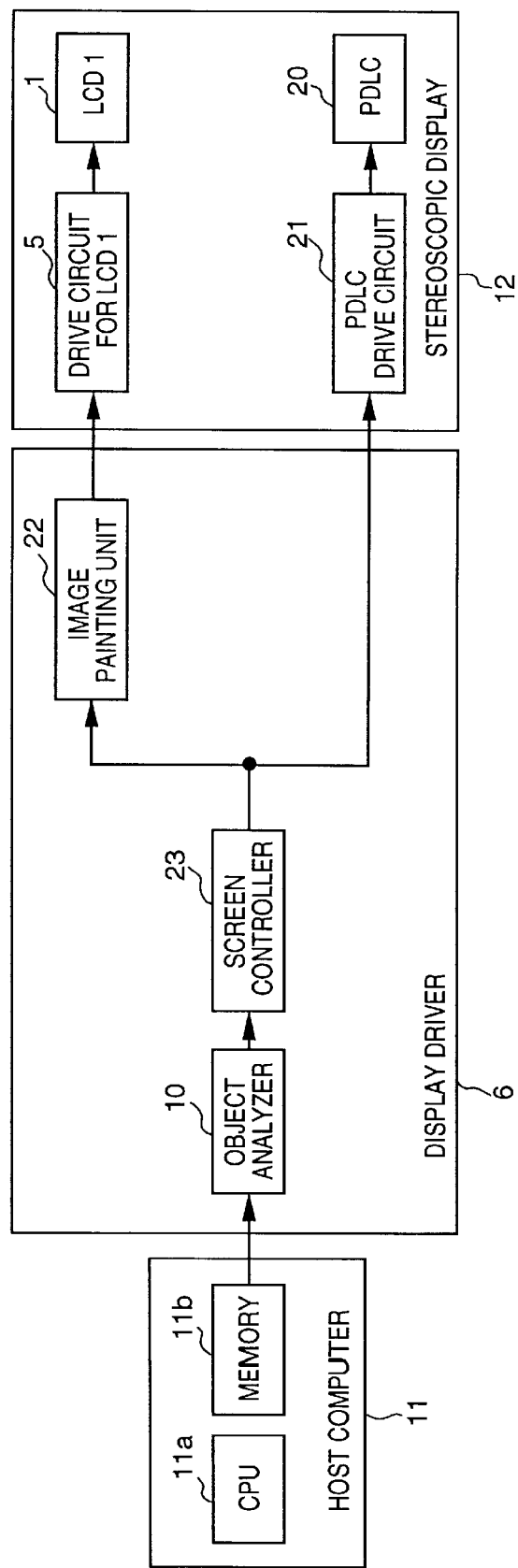
FIG. 18 is a block diagram showing the configuration of a computer system according to the second embodiment.

FIG. 18 is a block diagram showing the configuration of a computer system according to the second embodiment. When an image is displayed according to this embodiment, the optically directive control element (PDLC) 20 is controlled to changeover between a two-dimensional image displayed on the entire screen and a two-dimensional (stereoscopic) image displayed on the entire screen. The optically directive control element 20 consists of a polymer dispersed liquid crystal in which the changeover of the display by turning the applied voltage on and off in response to a command from the host computer for presenting a two-dimensional display or a three-dimensional display. The stereoscopic display in this embodiment is provided with a PDLC driver circuit 21 which controls the diffusion of the illuminating light by turning voltage supplied to the PDLC on and off. The display driver 6 controls the overall painting operation of the stereoscopic display 12 according to the second embodiment and comprises elements 22, 23 and 10, described below.

A two- and three-dimensional image painting unit 22 controls the painting of data actually painted on the stereoscopic display, namely a two-dimensional image handled heretofore and a three-dimensional image of combined stripes. However, as will be described later, the painting content differs somewhat from that of the first embodiment. A screen controller 23 controls and distributes signals sent to the two- and three-dimensional image painting unit 22 and PDLC driver circuit 21. The object analyzer 10 discriminates and analyzes the type of paint data and sends its output signal to the screen controller 23.

The host computer 11 operates in the same manner as set forth in the first embodiment. In the second embodiment, however, in order to switch between the two-dimensional display and three-dimensional display present over the full screen, the changeover control and method of painting images differ from those of the first embodiment.

(5) Two- and Three-Dimensional Display Changeover Operation

An easy-to-use computer system in which a mixed display of two- and three-dimensional displays is made possible by using a device which switches between two- and three-dimensional displays over the full screen will now be described.

The second embodiment will be described with reference to FIGS. 13 and 19. Unlike the first embodiment, the resolution of the two-dimensional display zone in the vertical direction of the screen in FIG. 13 according to the second embodiment is half that of the first embodiment. The fact that resolution is halved is difficult to illustrate and hence such a representation is omitted. A three-dimensional image file can be handled in the same manner as in the first embodiment by an operating method in the computer environment, i.e. GUI environment, of the second embodiment. Here only the aspects of the signal processing method that differ from those of the first embodiment will be discussed.

Figure 19:
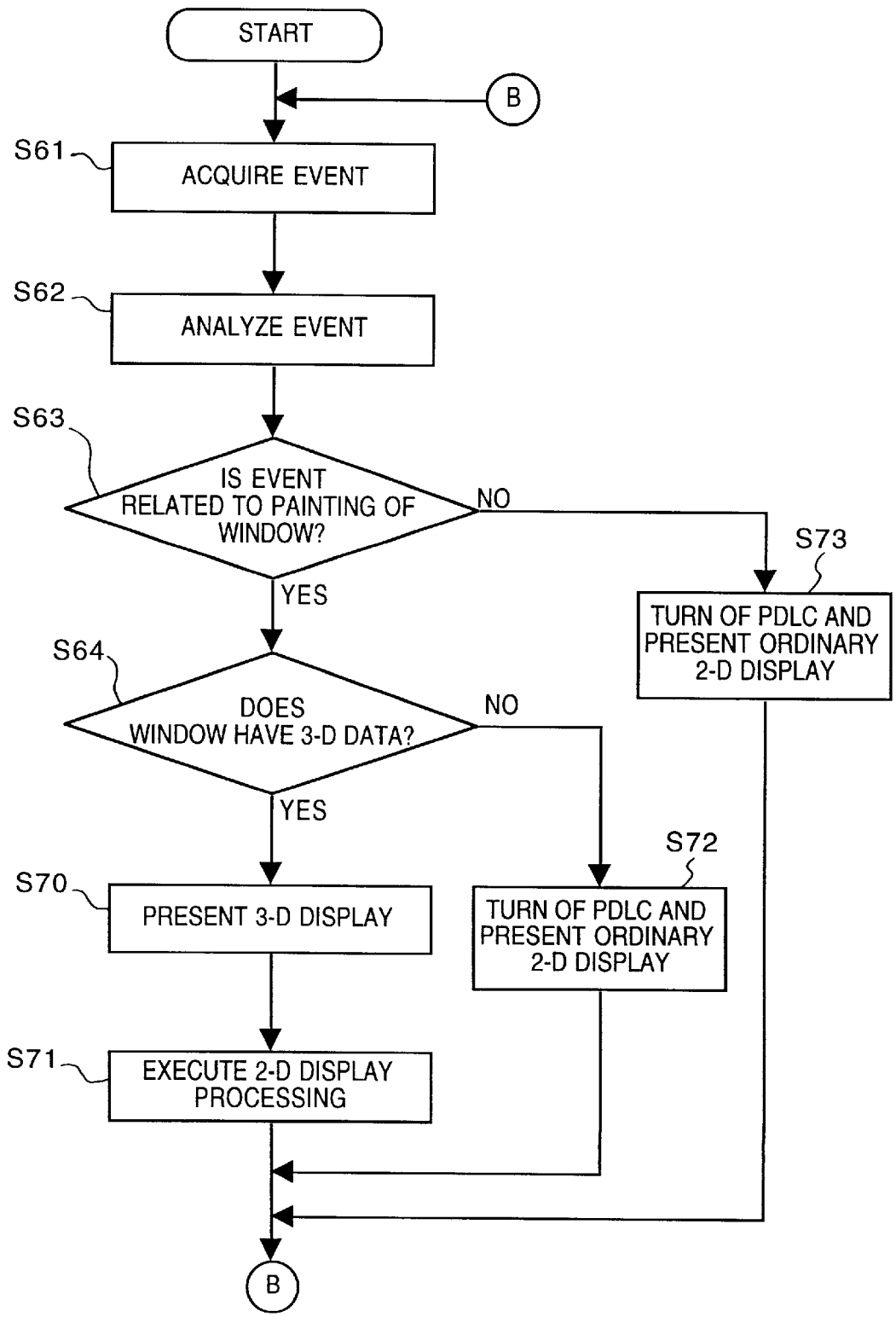
FIG. 19 is a flowchart illustrating the procedure of paint processing according to the second embodiment.

FIG. 19 is a flowchart illustrating the procedure of paint processing according to the second embodiment. A mousing event, which part of event processing, will be described with reference to the flowchart of FIG. 19. It should be noted that processing steps in FIG. 19 identical with those shown in FIG. 14 are designated by like step numbers and need not be described in detail again.

If it is determined at step S64 that the window to be controlled has three-dimensional data, then the program proceeds to step S70. Here the three-dimensional image data is read out of the three-dimensional image file 50 corresponding to this window, this image data is displayed in the window and the applied voltage is turned on so that the luminous flux having directivity and passing through the PDLC is allow to pass through intact, thereby making stereoscopic viewing possible. The program then proceeds to step S71, which deals with the image of the two-dimensional display. Specifically, identical stripe images are displayed continuously several viewpoints at a time in such a manner that the images separated for the right and left eyes by the crossed-lenticular scheme will become identical images. As a result, in case of two viewpoints, the resolution of the two-dimensional image will be halved in the vertical direction but the two-dimensional image can be observed substantially in the usual fashion.

On the other hand, if it is determined at step S64 that the file of this window does not possess three-dimensional data, then the program proceeds to step S72. Here the PDLC is controlled (the voltage applied to the PDLC is turned off) to cause the PDLC to diffuse light and disturb the directivity of the luminous flux of the illuminating light from the crossed-lenticular scheme. At this time the display in the full window appearing on the screen is changed over to the ordinary two-dimensional display.

If it is determined at step S63 that the mousing event is not related to painting of a window, then the program proceeds to step S73. Here the PDLC is controlled to perform diffusion (the applied voltage is turned off) and the display of the full window is changed over to the ordinary two-dimensional display in the same manner as described in connection with step S72.

Thus, in a case where the current window becomes the object of a two-dimensional display, the PDLC is controlled to perform diffusion, whereby the computer can be used in the same manner as a computer which presents only a two-dimensional display and not a three-dimensional (stereoscopic) display. Further, if the current window is shifted to an object capable of presenting a three-dimensional display, the PDLC is controlled to transmit light and the three-dimensional display is presented. Though vertical resolution declines in portions of the display not occupied by three-dimensional objects, it is possible to present an essentially normal two-dimensional display.

Further, the two-dimensional display zone at this time becomes a display having ordinary resolution owing to the user acting upon the computer as an event. Thus, even if the two-dimensional display has somewhat poorer resolution in a mixture with a three-dimensional display, it is possible to identify the position, type and name of the object. If the current of processing shifts to this object, a changeover is made to a normal two-dimensional display and, hence, to practical problems arise.

Thus, in accordance with the second embodiment, as described above, control is simplified because it is possible to dispense with the partial display of the checkered pattern.

Further, effects similar to those of the second embodiment are obtained even if an arrangement is adopted in which the entirety of the checkered mask pattern constituting the stereoscopic display of the first embodiment is turned on and off.

Third Embodiment

The second embodiment has been described with regard to an arrangement in which a changeover is made between two- and three-dimensional displays over the entirety of the display screen. However, processing similar to that of the first embodiment can be executed by forming the optically directive control element 20 as a matrix, placing a prescribed area of the element in the non-scattering state by partial application of voltage, and placing the remaining area of the element in the scattering state, thereby presenting a stereoscopic image in part of the display.

Figure 20A:
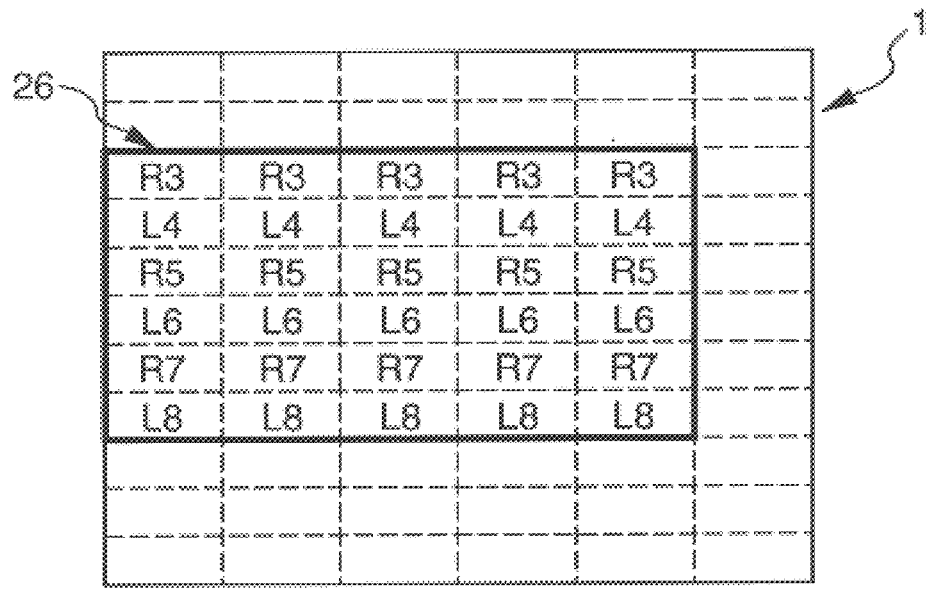
FIG. 20A is a diagram showing the displayed state of a display image presented on a liquid crystal display device when a stereoscopic image is displayed in part of the device in a third embodiment of the invention.
Figure 20B:
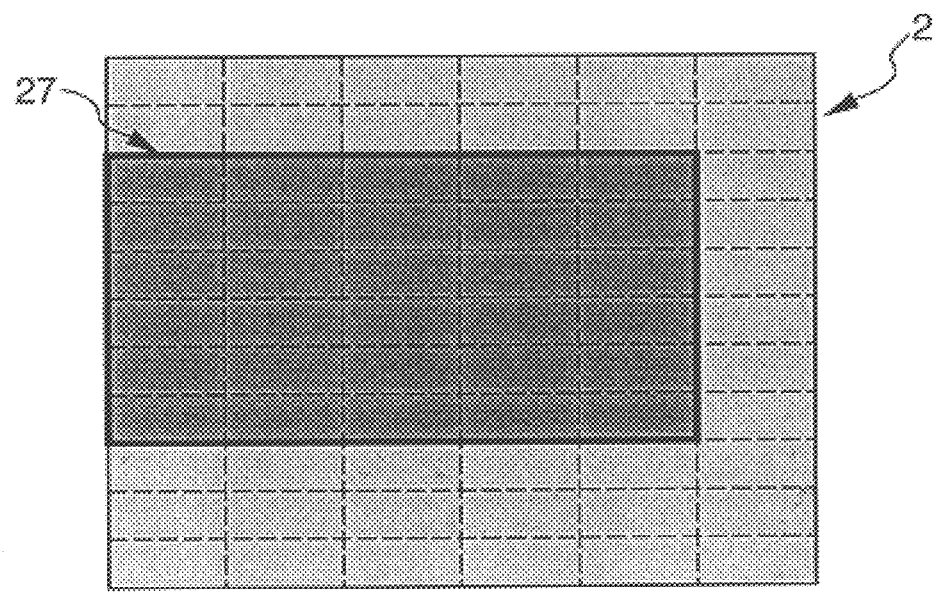
FIG. 20B is a diagram showing the display state of an optically directive control element when a stereoscopic image is displayed in part of the device in the third embodiment.

FIG. 20A shows the displayed state of a display image presented on the liquid crystal display device 1 when a stereoscopic image is displayed in part of the display device, and FIG. 20B shows the display state of an optically directive control element 2. When a stereoscopic image is displayed in an area 26, as shown in FIG. 20A, horizontal stripe images R3, L4, R5, ..., L8 are displayed in this area on the liquid crystal display device 1 and an ordinary two-dimensional image is displayed in the remaining area, as described above in connection with the first embodiment. At this time voltage is applied solely to an area 27 (the hatched portion in FIG. 20B) that corresponds to the area 26 of the liquid crystal display device 1, thereby establishing the non-scattering transmission state in this area and the scattering state elsewhere. This makes possible a display of a stereoscopic image in part of the display device. A mixed display of two- and three-dimensional images can be controlled by a control procedure similar to that of the first embodiment.

Figure 21A:
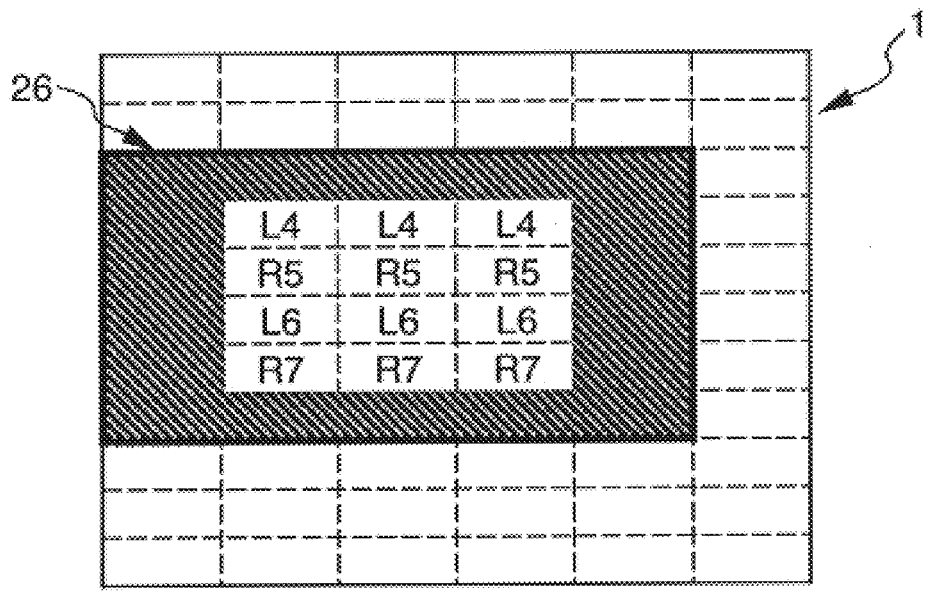
FIGS. 21A, 21B are diagrams for describing another example of a method of displaying a stereoscopic image in part of the display device according to the third embodiment.
Figure 21B:
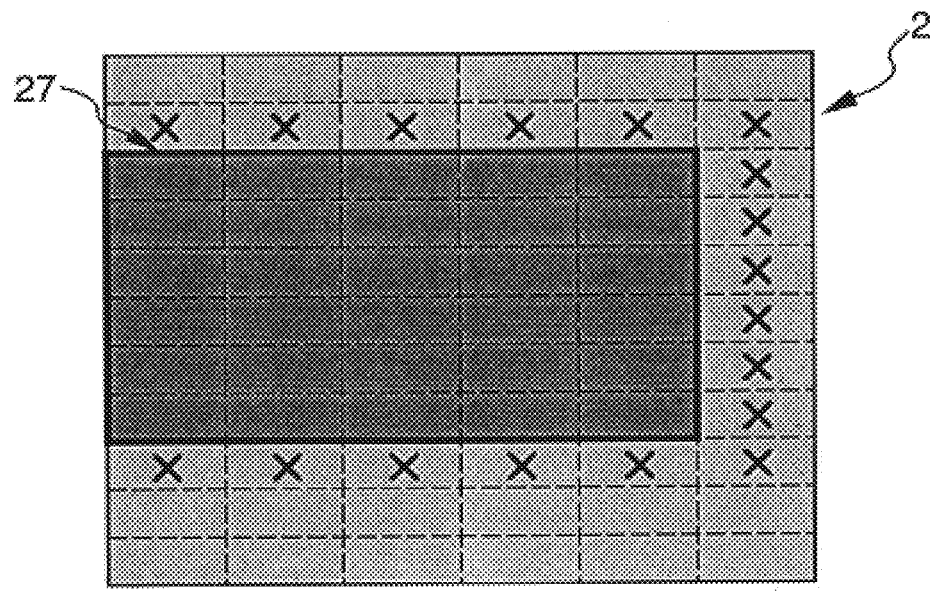

FIGS. 21A, 21B are diagrams for describing another example of a method of displaying a stereoscopic image in part of the display device according to this embodiment. This display method reduces crosstalk between the stereoscopic and two-dimensional images to make possible the observation of an excellent stereoscopic image. Here the optically directive control element 2 scatters incident light in random directions in the absence of applied voltage, as shown in FIG. 17A. Accordingly, luminous flux scattered cowing to the optical scattering in the vicinity of the boundary (the portion indicated by the x marks in FIG. 21B) of the scattering and non-scattering areas impinges also upon the inner side of the area 26 of the liquid crystal display device 1 and illuminates the horizontal stripe images. As a consequence, the illuminating light reaches even the eye not corresponding to the horizontal stripe images and causes crosstalk. To prevent this crosstalk, a black display is produced as an image frame on the inner side of the area that displays the stereoscopic image. Though an example in which a frame is displayed to have a thickness corresponding to one pixel on the inner side of the area 26 is illustrated, this does not impose any limitation as a width of several pixels may be used if desired. Further, it is possible to display the type of image displayed in this area or the file name, along with an indication reading "3D DISPLAY IN PROGRESS", for example, inside the frame that prevents crosstalk.

This display method is particularly effective in reducing crosstalk when the optically directive control element is disposed at a position remote from the liquid crystal display device.

Fourth Embodiment (1) Difference Between This Embodiment and Second Embodiment

In the second embodiment described above, an optically directive control element (PDLC) is provided between the liquid crystal display section and the mask pattern and the directivity of this optically directive control element is controlled to achieve diffusion or transparency, whereby two- and three-dimensional displays can be switching between or mixed. Two- and three-dimensional displays can be presented easily by using the optically directive control element 2. However, when the optically directive control element is in the ON state (the non-scattering state, namely the three-dimensional display state), some scattering, though little, does occur and is a cause of crosstalk in the three-dimensional image.

In contrast to the above, the fourth embodiment is described with regard to a computer system having a stereoscopic display in which two- and three-dimensional displays are switched between over the entire screen by mechanically controlling the movement of an optical element that produces directivity.

Figure 22A:
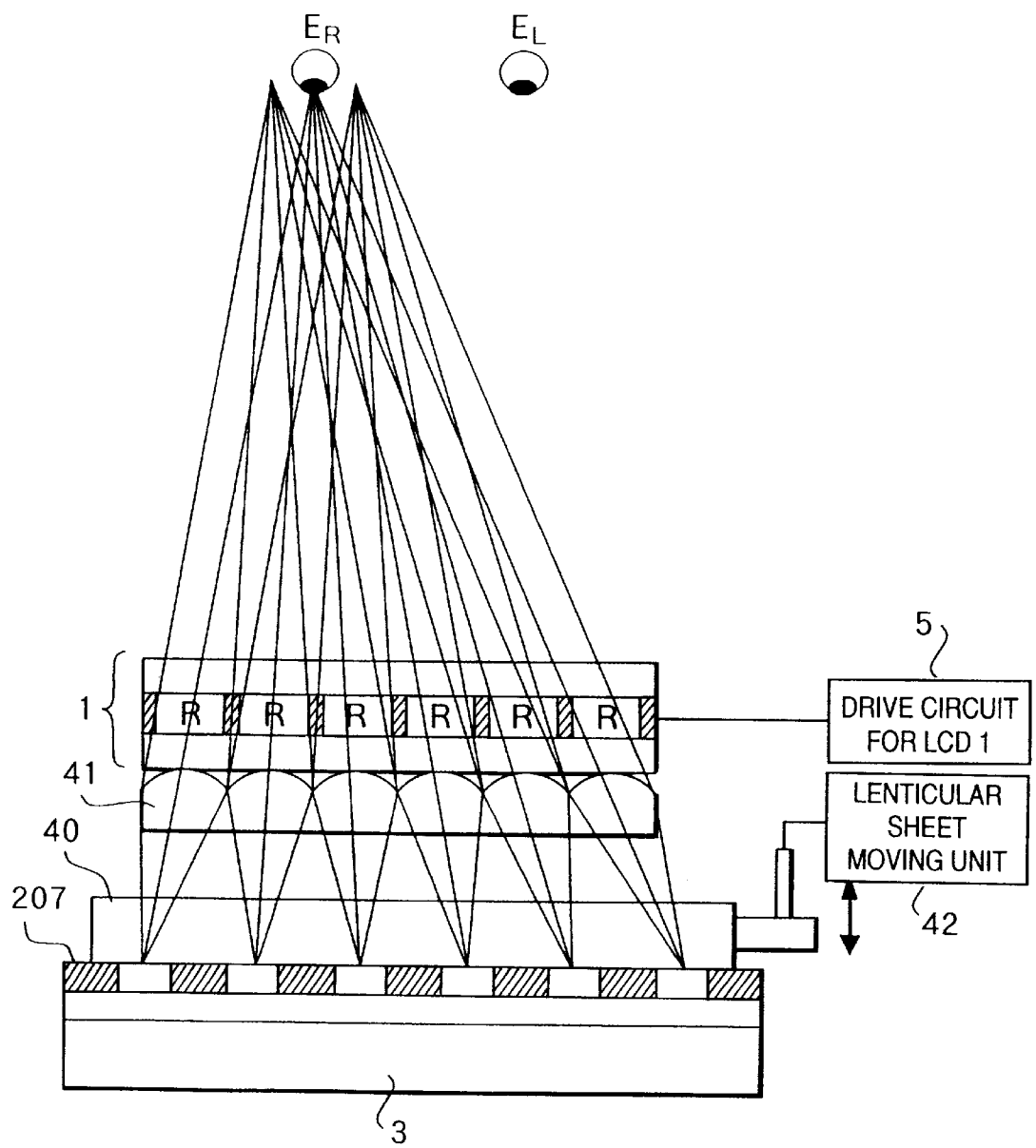
FIG. 22A is a schematic view showing the principal components of a fourth embodiment of the present invention.
Figure 22B:
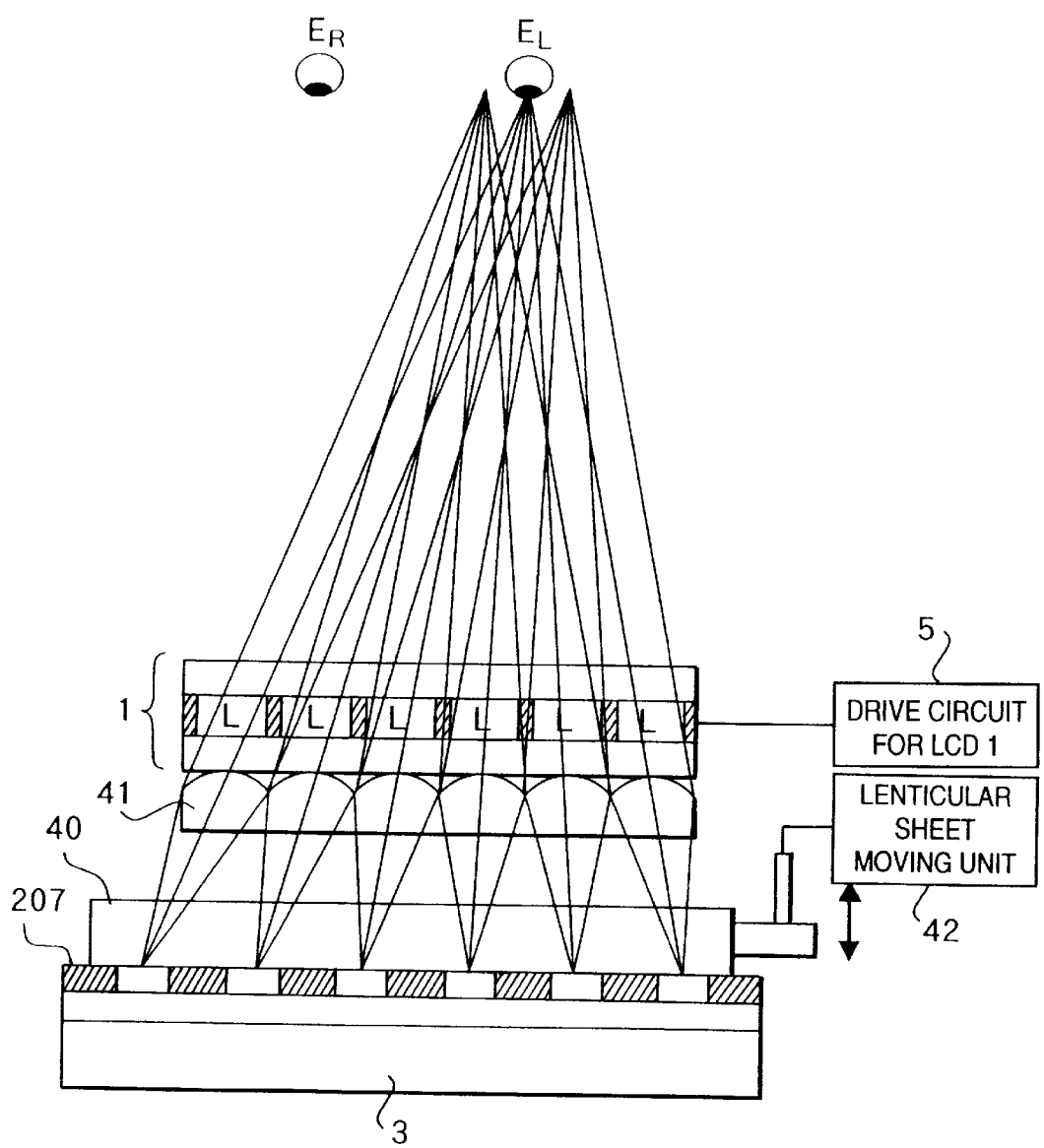
FIG. 22B is a schematic view showing the principal components of the fourth embodiment of the present invention.
Figure 23:
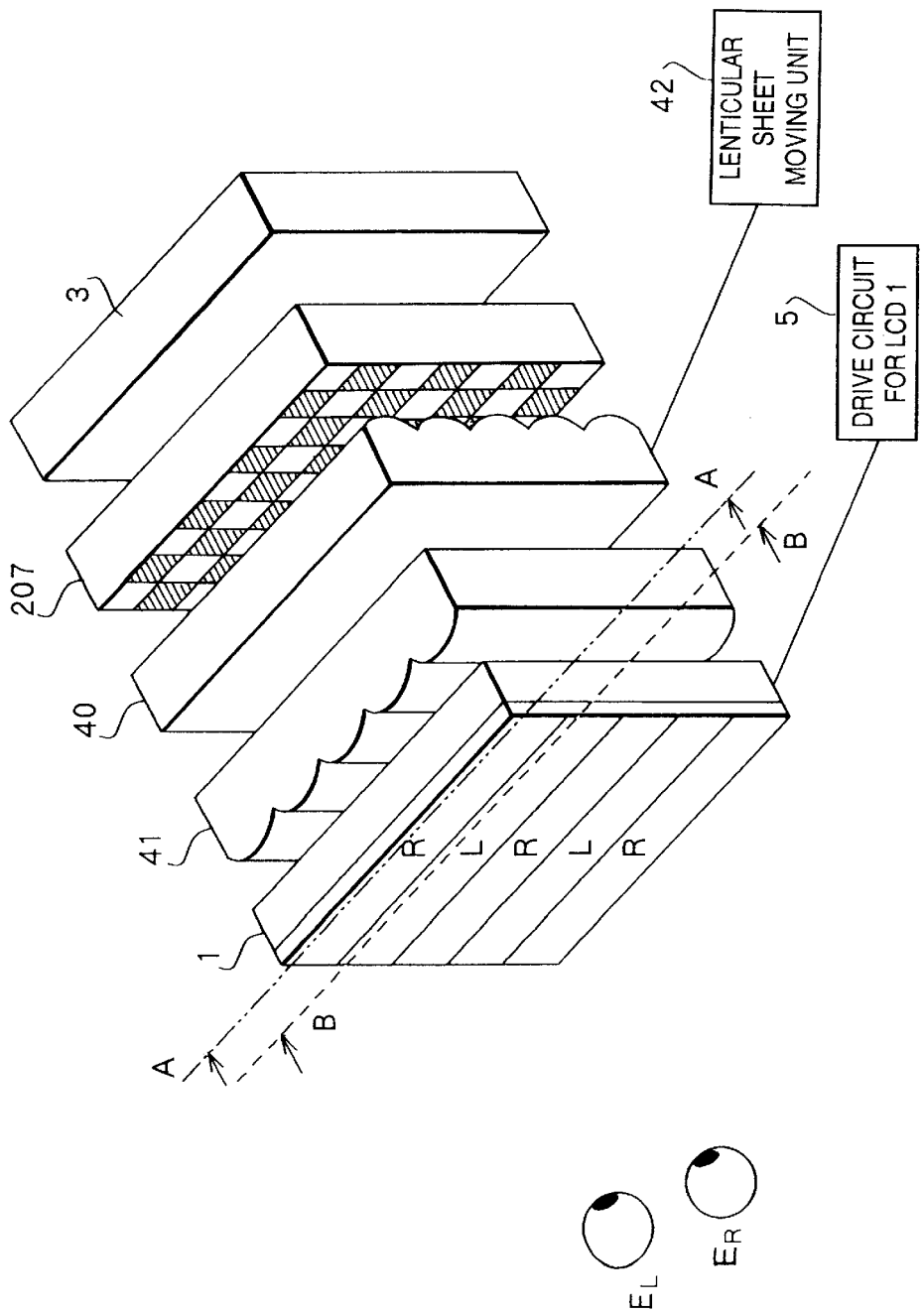
FIG. 23 is a perspective view showing a stereoscopic image display device according to the fourth embodiment.

(2) Optical System For Switching Between Two- and Three-Dimensional Displays in Fourth Embodiment FIGS. 22A and 22B are schematic views showing the principal components of the fourth embodiment. Further, FIG. 23 is a perspective view showing a stereoscopic image display device according to the fourth embodiment. A cross section taken along the horizontal plane indicated by A—A in FIG. 23 is shown in FIG. 22A, and a cross section taken along the horizontal plane indicated by B—B in FIG. 23 is shown in FIG. 22B. (The line B—B in FIG. 23 indicates the scanning line that corresponds to that one scanning line below the scanning line indicated by the line A—A.)

In FIGS. 22A and 22B, reference numerals 40 and 41 denote lenticular sheets each comprising rows of cylindrical lenses. Shown at 42 is a lenticular sheet moving unit having a mechanism (not shown) and drive circuitry (not shown) for mechanically controlling movement of the lenticular sheet 40 in the depth direction of the stereoscopic display. The lenticular sheet moving unit 42 moves the lenticular sheet 40 by an air cylinder or DC motor or pulsed motor, by way of example.

Operation when a three-dimensional display is presented will be described before discussing the changeover to a two-dimensional image display, which is a characterizing feature of the fourth embodiment. As shown in FIG. 22A, illuminating light is emitted by the backlight 3 and the luminous flux that has passed through the mask 207 impinges upon the right eye $E_R$ of the user upon being separated by the mask 207, the centers of whose apertures are situated at positions offset a prescribed distance from the optic axes of the cylindrical lenses of the lenticular sheet 41, and the cylindrical lenses of the lenticular sheet 41. The luminous flux impinging upon the right eye $E_R$ is modulated by an image (here a right parallax image R) displayed on the transmissive-type liquid crystal display device (LCD) 1 provided between the lenticular sheet 41 and the user. As a result, the line-shaped right parallax image R impinges upon the right eye $E_R$. Similarly, with regard also to the luminous flux along the cross section that corresponds to the scanning line that is one scanning line lower in FIG. 22A, a line-shaped left parallax image L impinges upon the left eye $E_L$, as shown in FIG. 22B.

As will be understood from FIG. 23, the mask apertures in the cross section of FIG. 22A and the mask apertures in the cross section of FIG. 22B are formed complimentarily so that the mask pattern 207 defines a checkerboard of apertures and light blocking portions. Horizontal stripe images obtained by combining, in the vertical direction, mutually alternating parallax images R, L corresponding to the respective apertures are displayed on the liquid crystal display device (LCD) 1. Accordingly, the user is capable of observing a stereoscopic image by viewing, by the respective eyes, the parallax images corresponding to the respective eyes every scanning line. Here the summits of the convex surfaces of the cylindrical lenses constructing the lenticular sheet 40 are in intimate contact with the mask pattern 207. More specifically, the principal plane of the lenticular sheet coincides with the display surface of the mask pattern 207. Consequently, the influence of the power thereof is substantially negligible and the directivity produced by the lenticular sheet 40 corresponding to the mask 207 need not be considered.

The horizontal stripe images displayed on the liquid crystal display device 1 will now be described.

Figure 24A:
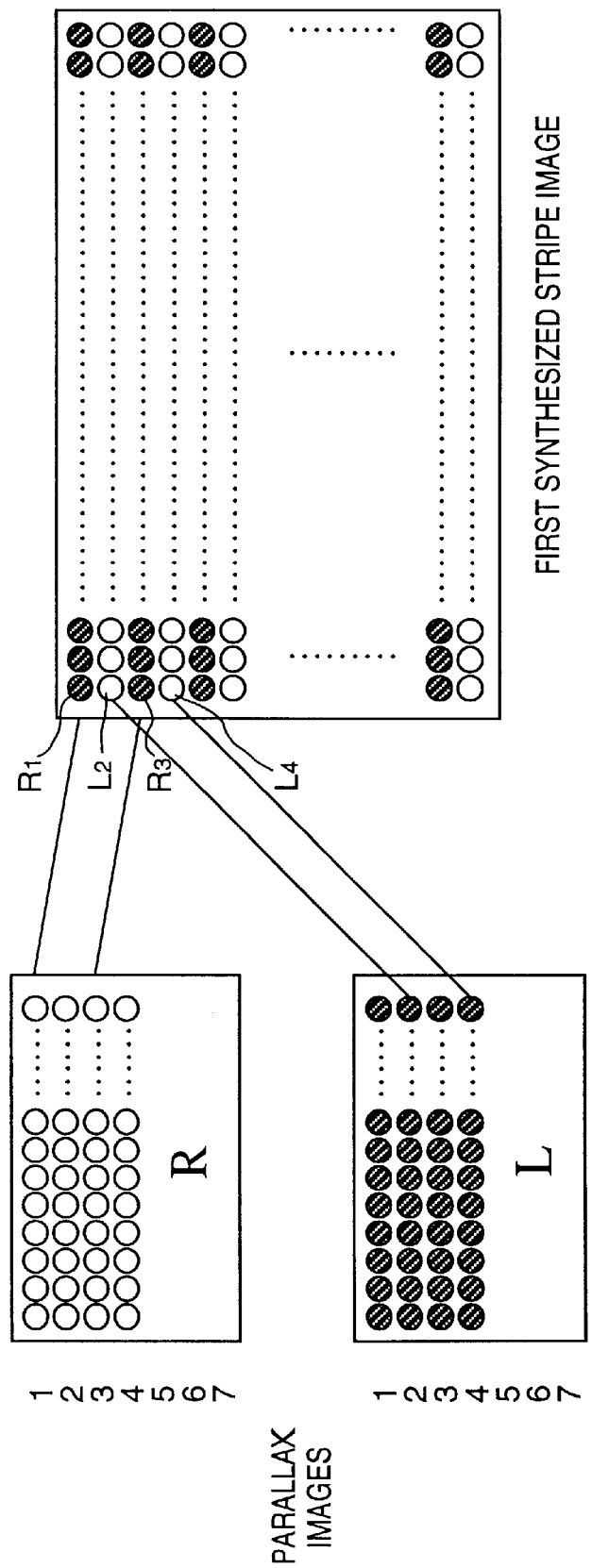
FIG. 24A is a diagram for describing horizontal stripe images displayed on a liquid crystal display device.

As shown in FIG. 24A, at least two parallax images R, L are divided up into horizontal stripes, stripe pixels created from the right parallax image R and stripe pixels created from the left parallax image L are alternately arrayed every other scanning line, for example, and right parallax images R1, left parallax images L2 and right parallax images R3, . . . are combined on the first, second and third scanning lines, . . . , respectively, whereby a single horizontal stripe image is formed. The image data of the horizontal stripe image thus created enters the drive circuit 5 of the LCD 1 and the horizontal stripe image is displayed on the liquid crystal display device 1 so that a stereoscopic image can be seen in accordance with the principle described above. Here a case is illustrated in which parallax images are alternately combined every other scanning line. However, it goes without saying that parallax images can be alternately combined every several scanning lines.

Furthermore, as shown in FIG. 24B, it is also possible to use a horizontal stripe image (a second synthesized stripe image) obtained by combining left parallax images L1, right parallax images R2 and left parallax images L3, . . . on the first, second and third scanning lines, . . . , respectively. In this case, it will suffice to use a mask pattern in which the apertures and light blocking portions formed in the checkerboard of the mask pattern 207 mutually complement those in the case where the horizontal stripe image (a first synthesized stripe image) of FIG. 24 is used.

Operation when a two-dimensional image is displayed will be described next.

Figure 25:
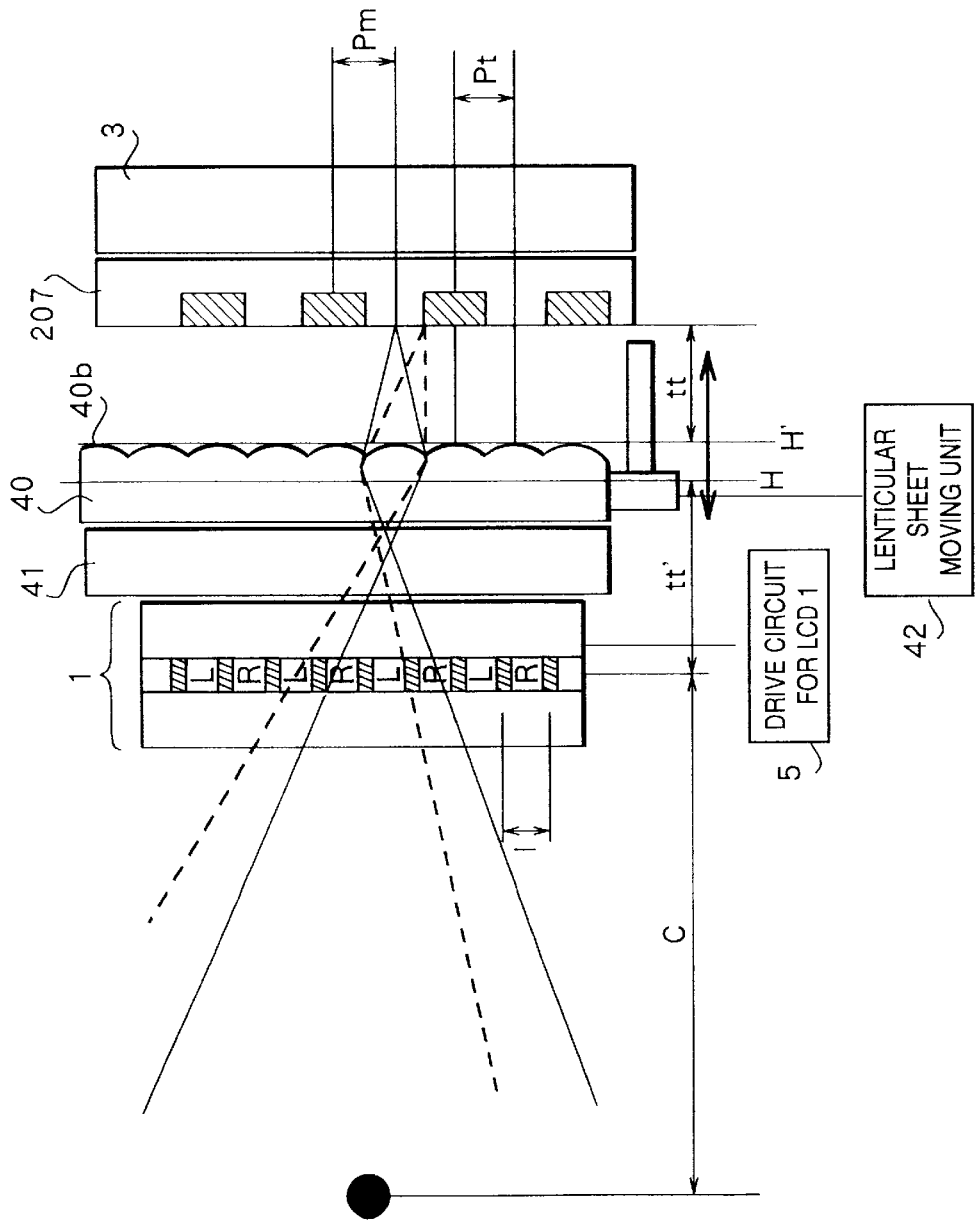
FIG. 25 is a vertical sectional view as seen from the side of the stereoscopic image display device according to the fourth embodiment.

FIG. 25 is a sectional view as seen from the side of the stereoscopic image display device according to the fourth embodiment. A controller (not shown) issues a control signal to the lenticular sheet moving unit 42 as by a signal which effects a changeover to the mode for displaying a two-dimensional image, thereby moving the lenticular sheet 40 from the state in which it is in intimate contact with the mask pattern 207 in FIGS. 22A, 22B to a position spaced a prescribed distance away from the mask pattern. At this time the two- and three-dimensional painting unit 7 paints an ordinary two-dimensional image so that an ordinary two-dimensional image is displayed on the liquid crystal display device 1.

In the fourth embodiment, pitch Pt of cylindrical lenses on surface 40b of the lenticular sheet 40 facing the mask and vertical pitch Pm of the mask pattern 207 are made equal to each other and slightly larger than pixel pitch I of the liquid crystal display device 1. The lenticular sheet 40 is moved to a lens position that satisfies $$tt > 2fb$$

where fb represents the focal length of the cylindrical lenses on the surface 40b of the lenticular sheet 40 facing the mask and tt represents the spacing between the summits of these cylindrical lenses and the mask 207. If distance tt' from the principal plane of the lens (on the user side) faced toward mask to the image display surface of the liquid crystal display device 1 is set beforehand to satisfy the condition $$1/tt' \geq 1/fb - 1/tt$$

then the apertures of the mask will form images of reduced size between the image display surface of the liquid crystal display device 1 and the lenticular sheet 40. Accordingly, with regard to scanning lines that were respectively displaying L, R at the time of the three-dimensional display, both images of apertures that are to give directivity in the directions of the left and right eyes by the lenses of the lenticular sheet 41 are formed on portions where the user expects to see scanning lines. Consequently, light passing through each scanning line on the image display surface advances in both the left and right directions and is introduced to both eyes of the user. This makes possible a two-dimensional display.

Figure 26A:
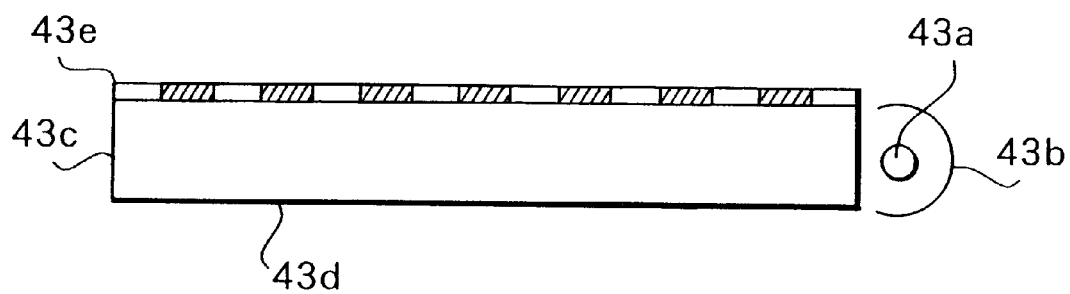
FIG. 26A is a diagram for describing an arrangement in which a checkered mask pattern and a backlight have been integrated.

Further, in this embodiment, a case is illustrated in which the backlight 3 and checkered mask pattern 207 having the prescribed apertures and light blocking portions comprise individual elements. However, these can be integrated in the manner shown in FIG. 26A. Here light from a light source 43a such as a fluorescent lamp is acted upon by a suitable reflecting mirror 43b so as to impinge upon a light guide 43c, which comprises a transparent plastic material such as PMMA, from the end face thereof so that the light is guided through the interior. It is also possible to form a reflector on the underside 43d of the light guide 43c. The guided light emerges upon passing through apertures 43e fabricated by patterning the reflector that has been formed on the underside of the light guide 43c, and the light impinges upon the eyes of the user upon being provided with directivity by the lenticular sheet. Thus, a stereoscopic image display device in which light is utilized highly efficiently can be constructed.

Figure 26B:
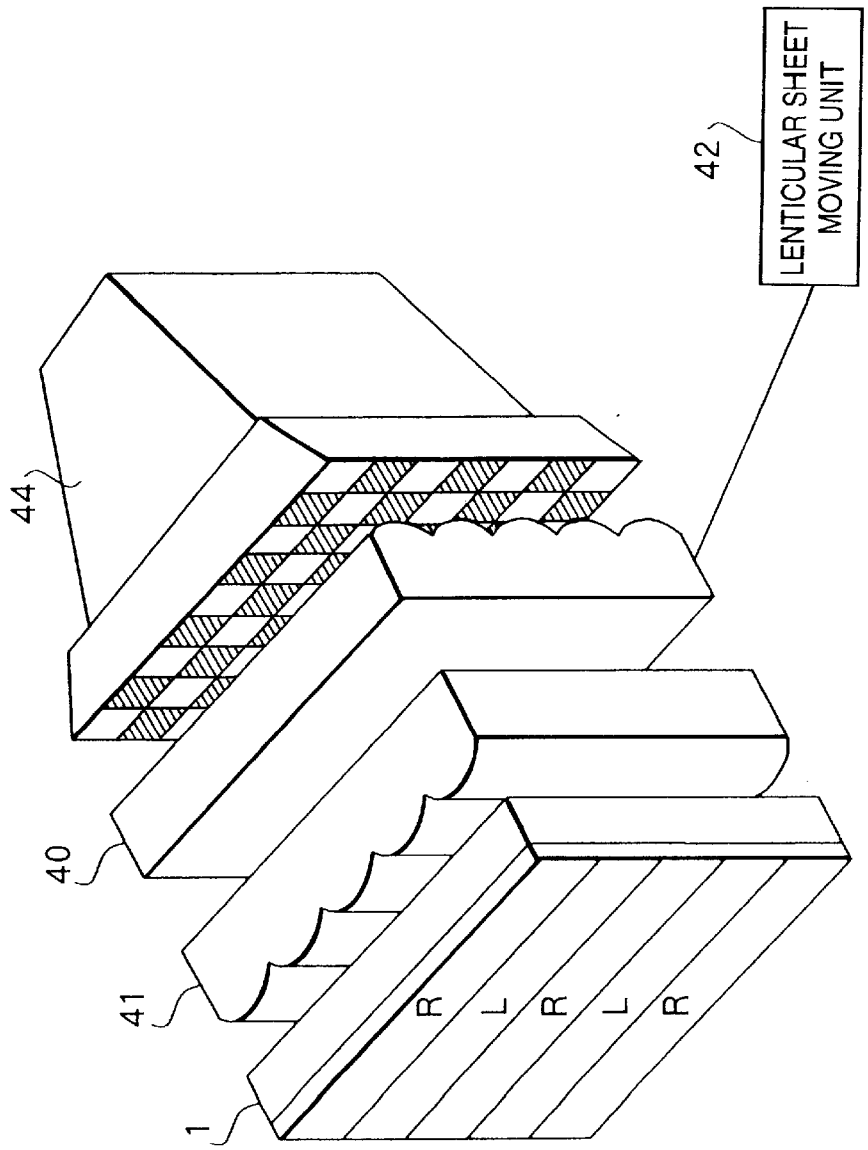
FIG. 26B is a diagram for describing an arrangement in which a mask pattern is formed using a self-light-emitting display element.

Furthermore, as shown in FIG. 26B, it is possible to form a light-emitting pattern equivalent to the above-mentioned mask pattern 207 on the display surface of a self-light-emitting display element 44 such as a CRT and provide the emergent patterned light with directivity using the lenticular sheet. Here it is desirable that the self-light-emitting display element 44 and liquid crystal display device 1 produce displays synchronized pixel by pixel or scanning line by scanning line.

Further, it is possible to adopt an arrangement in which a mechanism for moving the mask substrate is provided instead of a mechanism for moving the lenticular sheet, a space is provided between the mask substrate 207 and the backlight when a three-dimensional display is presented, and the mask substrate 207 is moved so as to satisfy the above-mentioned relation when a two-dimensional display is presented.

(3) Apparatus Configuration According to Fourth Embodiment

Figure 27:
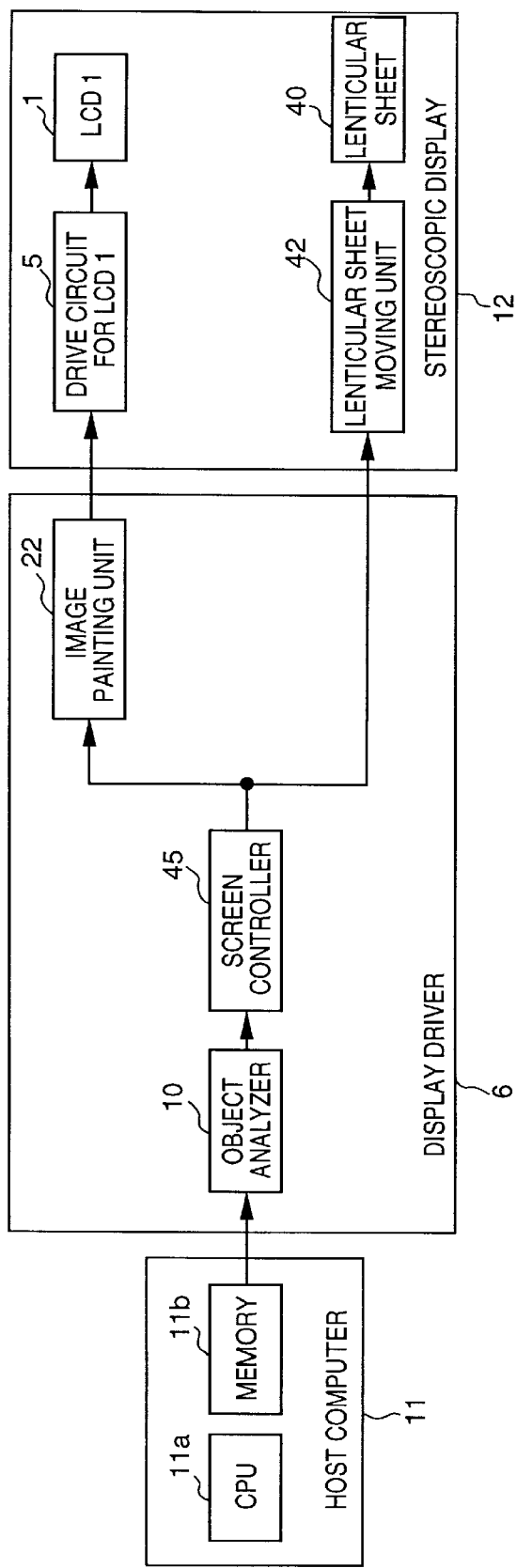
FIG. 27 is a block diagram showing the configuration of a computer system according to the fourth embodiment.

FIG. 27 is a block diagram showing the configuration of a computer system according to the fourth embodiment. In this embodiment, the spacing between the lenticular sheet and the checkered mask is controlled to switch between a two-dimensional display and a three-dimensional display over the entire display surface when an image display is presented, as set forth above. Here the stereoscopic display 12 includes the lenticular sheet 40, which is capable of being moved back and forth by prescribed means, and the lenticular sheet moving unit 42, which moves and controls the movement of the lenticular sheet 40 to control the spacing between the lenticular sheet 40 and the checkered mask 207. In response to a command from the host computer corresponding to a two- or three-dimensional display, the lenticular sheet 40 is moved by the lenticular sheet moving unit 42 to change the spacing between the lenticular sheet 40 and the checkered mask 207 and, hence, switch between the two- and three-dimensional displays.

The display driver 6 controls the overall painting operation of the stereoscopic display 12 according to the fourth embodiment and is similar to that of the second embodiment. A screen controller 45 controls and distributes signals sent to the two- and three-dimensional image painting unit 22 and lenticular sheet moving unit 42 described above.

(4) Two- and Three-Dimensional Display Changeover Operation

The changeover operation of the fourth embodiment differs from that of the second embodiment in that: the signal from the screen controller 45 is sent to the lenticular sheet moving unit 42. The spacing between the lenticular sheet 40 and checkered mask 207 is controlled in the above-described manner by this signal so that a changeover is made between the two- and three-dimensional displays. Other processing such as event processing is similar to that of the second embodiment.

Thus, as described above, effects similar to those of the second embodiment are obtained by controlling the spacing between the lenticular sheet and the checkered mask in response to a command from the host computer. Further, since this is accomplished without the intervention of an LCD mask pattern or a polymer dispersed liquid crystal, there is little attenuation of the illuminating light and a bright image is obtained with little consumption of power.

Fifth Embodiment

An arrangement in which a parallax barrier scheme is employed as the stereoscopic display will now be described as a fifth embodiment of the invention. In this embodiment, there will be described a computer system in which it is possible to present a two-dimensional display and a three-dimensional display by constructing the parallax barrier of liquid crystal.

Figure 28:
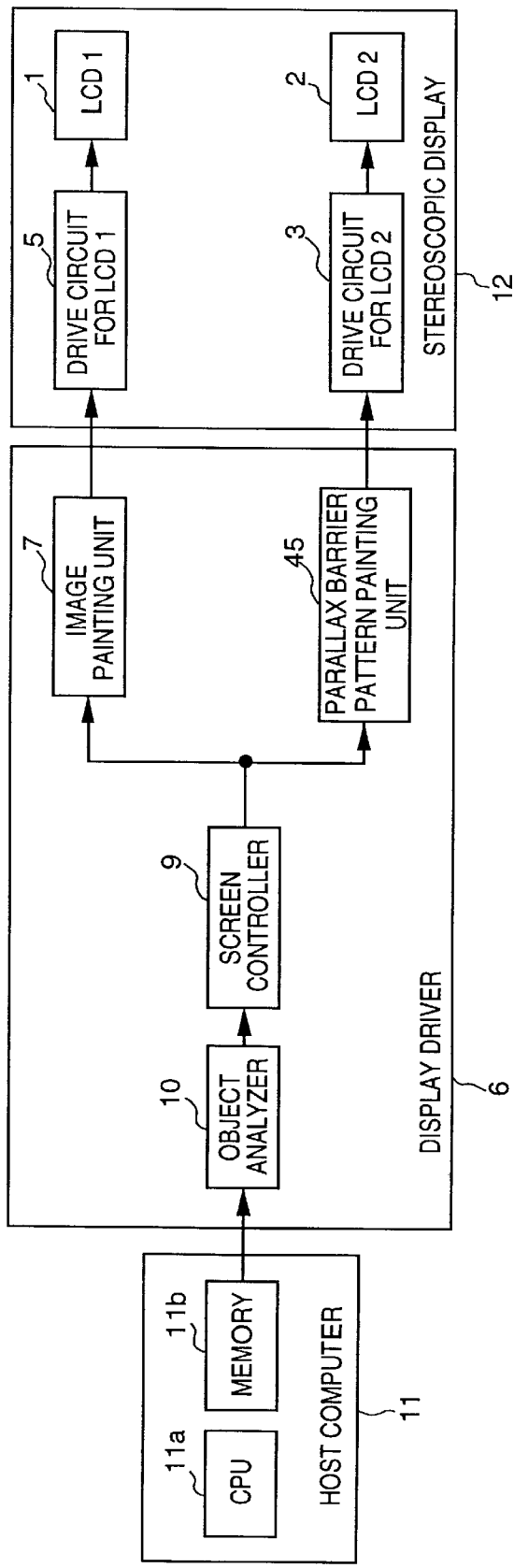
FIG. 28 is a block diagram showing the configuration of a computer system according to a fifth embodiment of the present invention.

(1) Parallax Barrier Scheme and Apparatus Configuration According to This Embodiment FIG. 28 is a block diagram showing the configuration of a computer system according to the fifth embodiment. According to this embodiment, a display is presented by switching between a two-dimensional image (a non-stereoscopic image; single-viewpoint image information) from a single viewpoint and a three-dimensional image (stereoscopic image) from a plurality of viewpoints, or several windows are provided on the display screen and two- and three-dimensional images are displayed in the areas defined by the windows.

A three-dimensional display presented on the screen according to this embodiment will be described first. The three-dimensional image is synthesized from a plurality of parallax images of a plurality of viewpoints. At least two parallax images are required to synthesize the three-dimensional image. Let Rs and Ls represent the parallax images corresponding to the left and right eyes, respectively. Each parallax image is divided up into pixel groups (hereinafter "stripe pixels") Ri, Li (i=1, 2, . . . ) having the shape of elongated vertical stripes. One image constructed by alternately arraying the stripe pixels obtained from each of the parallax images, i.e. by arraying the stripe pixels in the order R1, L2, R3, L4 . . . (or L1, R2, L3, R4 . . . ) is the three-dimensional image. Such a three-dimensional image is referred to also as a "stripe image".

If there are three parallax images A, B and C, the stripe image is an image obtained by arraying stripe pixels in the order A1, B2, C3, A4, B5, C6 . . . or B1, C2, A3, B4, C5, A6 . . . or C1, A2, B3, C4, A5, B6 . . .

In FIG. 28, the LCD 2 displays a parallax barrier pattern in conformity with a stripe-image display designation. Further, in a case where an ordinary two-dimensional image is displayed in the same manner as in the two-dimensional display used generally, it will suffice to make the stripe image the ordinary two-dimensional image and cease the display of the parallax barrier pattern.

The parallax barrier pattern referred to here is a pattern obtained by alternately arraying, in the horizontal direction, stripe-shaped light transmitting and light blocking portions that introduce luminous flux from the stripe pixels of the left and right parallax images, which construct the stripe image displayed on the LCD 1, to respective ones of prescribed observation positions. Here the stereoscopic display 12 includes the LCD 1 and the LCD 2.

Figure 29:
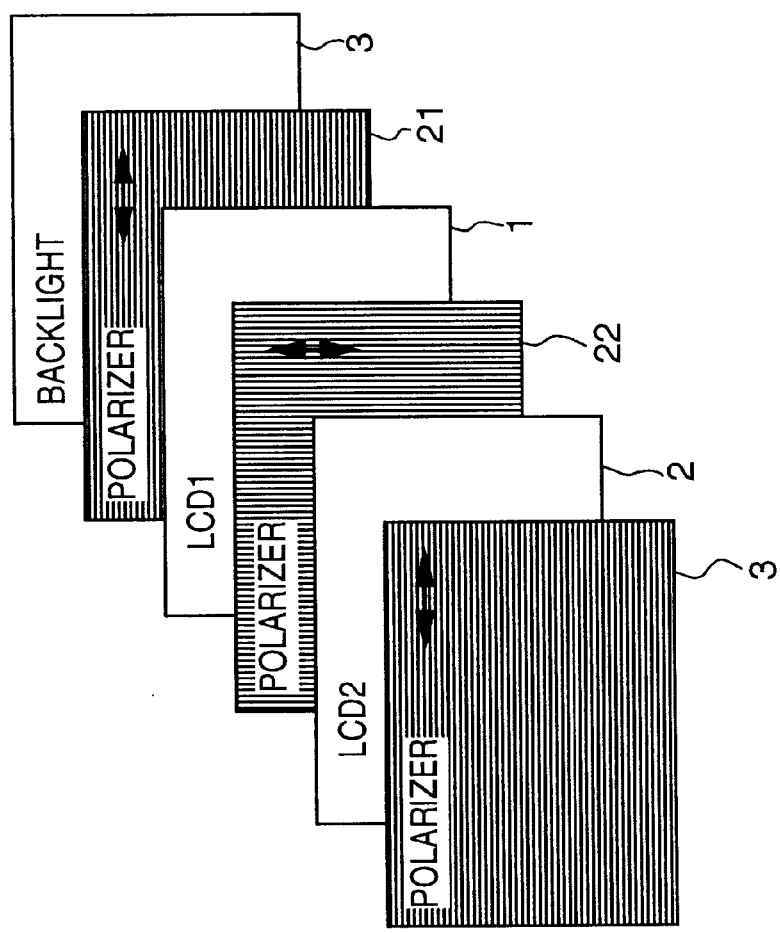
FIG. 29 is a diagram for describing the construction of the display portion of a stereoscopic display according to the fifth embodiment.

FIG. 29 is a diagram for describing the construction of the display portion of the stereoscopic display 12 according to this embodiment. The backlight 3 illuminates the LCDs 1 and 2. Polarizers 21, 22 and 23 have the polarization directions indicated the arrows. As shown in FIG. 29, the display portion according to this embodiment is so constructed that the polarizer 22 is sandwiched between the identically constructed two LCDs 1 and 2, the sandwitched structure is further sandwiched by the two polarizers 21, 23, whose directions of polarization are perpendicular for the polarizer 22, and the backlight 3 is disposed in back of the polarizer 21.

It should be noted that in a case where the user desires operation in a display and computer environment equipped only with a two-dimensional display, this can be realized, in the manner described above, by halting the painting of the parallax barrier pattern. This is accomplished by sending a signal to the parallax barrier pattern painting unit 8 via the screen controller 9 by prescribed transmitting means.

(2) When Use is Made of Modulating Element Having Matrix Structure

As mentioned above, the difference between the fifth embodiment and the first embodiment is that an optical system which presents a stereoscopic display is eliminated and a parallax barrier pattern is painted instead of the checkered mask pattern painted on the liquid crystal display device 2. In FIG. 28, a parallax barrier pattern painting unit 45 paints the parallax barrier of any size at any position. This arrangement makes it possible to provide an easy-to-use user interface in which a three-dimensional display of any size is presented at any position through a procedure similar to that of the first embodiment (the procedure illustrated in FIG. 14).

(3) When Use is Made of Spatial Light Modulating Element Having a Stripe Structure It is also possible to present two- and three-dimensional displays using a spatial light modulating element having a stripe structure in order to attain the object of the second embodiment, namely to simplify the electronic circuit for controlling the spatial light modulating element as well as the spatial light modulating element itself. In this case, it is obvious that effects similar to those of the second embodiment are obtained if the spatial light modulating element having the stripe structure is controlled instead of the optically directive control element of the second embodiment. More specifically, a state in which stripes are displayed is established (step S70 in FIG. 19) instead of the non-scattering state of the second embodiment, and a state in which stripe, are not displayed is established (steps S72, S73 in FIG. 19) instead of the scattering state.

(4) Luminance Correction

Figure 50:
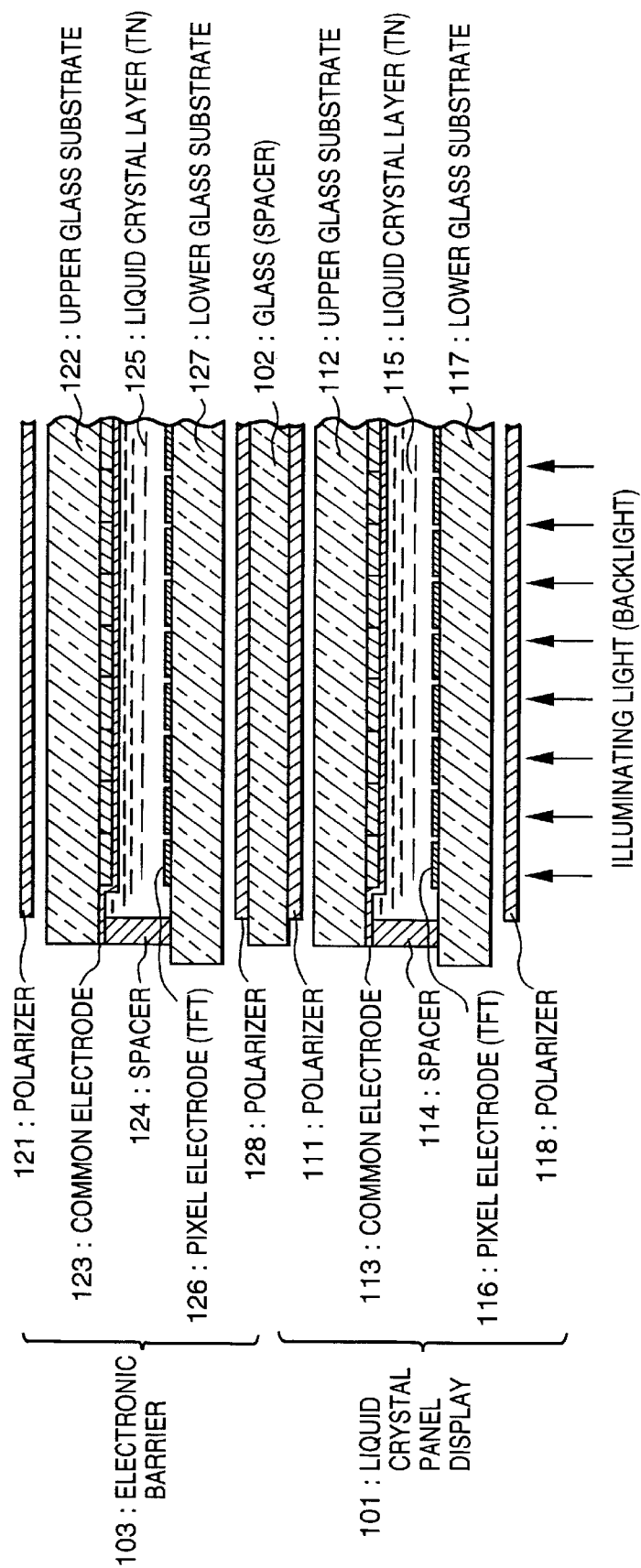
FIG. 50 is a structural view showing the display section of a stereoscopic image display device comprising a liquid crystal panel display and an electronic barrier disclosed in Japanese Patent Application Laid-Open No. 3-119889.
Figure 52A:
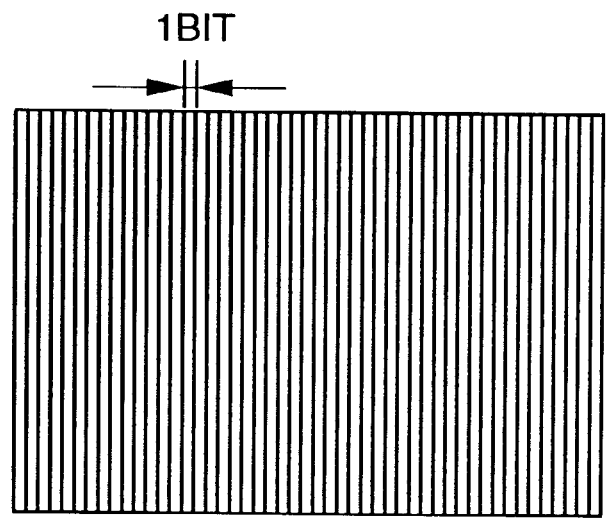
FIGS. 52A, 52B are diagrams illustrating states in which barrier-stripe patterns are partially generate.
Figure 52B:
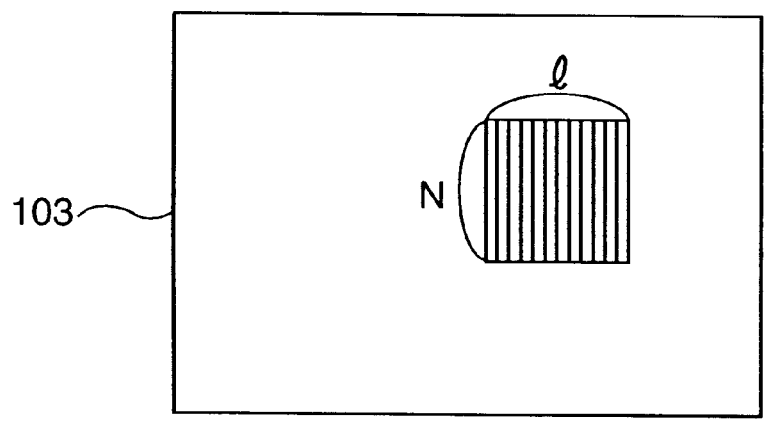
Figure 53:
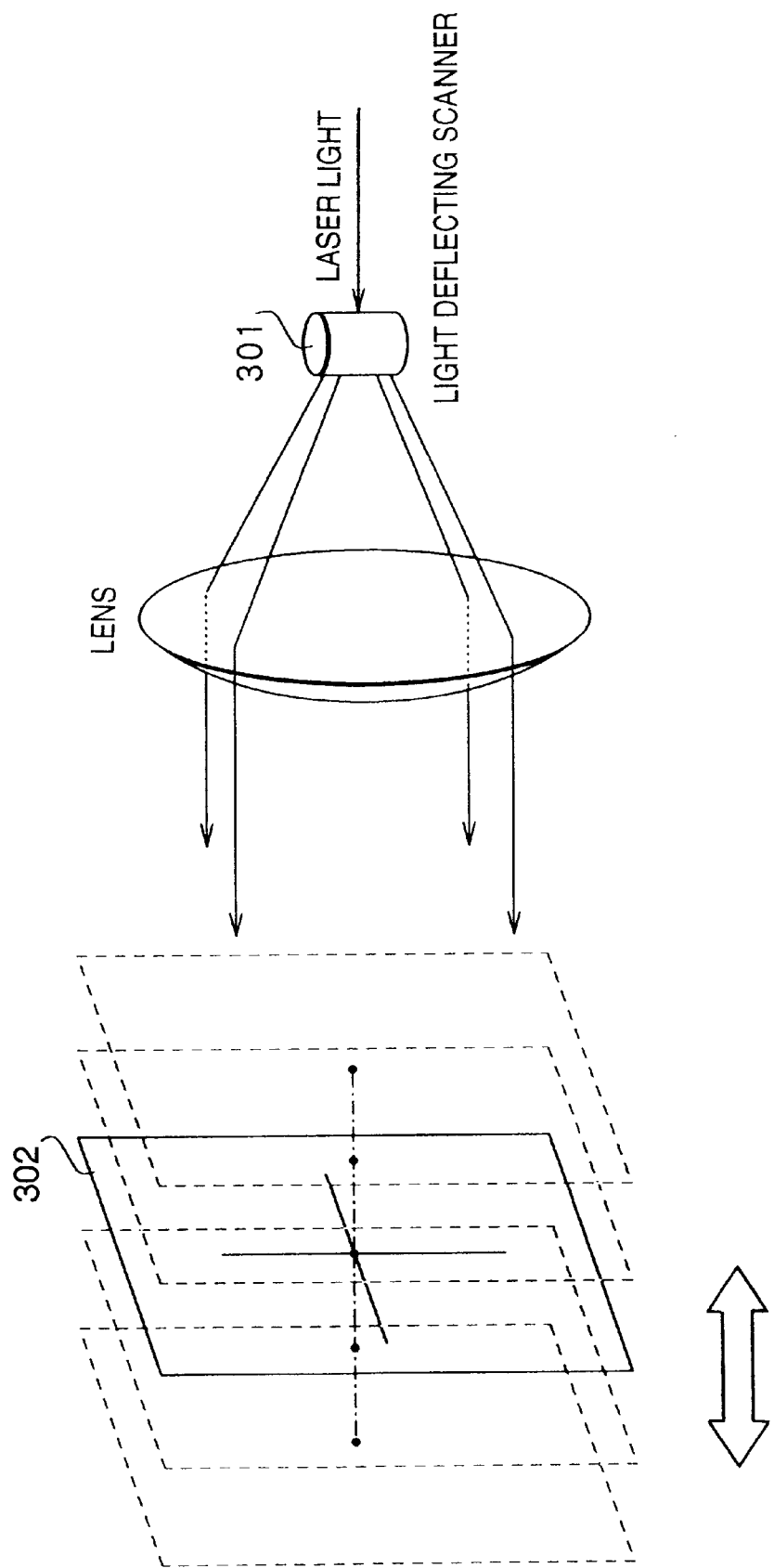
FIG. 53 is a diagram showing an example of a device for presenting a stereoscopic display utilizing volume-scanning.

Brightness may be corrected by the number of parallax images described in the file header of the three-dimensional image data when a three-dimensional display is presented. More specifically, as described earlier in connection with FIGS. 50A~50C, increasing the number of viewpoints (the number of parallax images) reduces the aperture efficiency of the parallax barrier pattern, resulting in a darker observed image. Accordingly, an arrangement should be adopted in which control is performed in such a manner that the voltage applied to the backlight 3 rises with an increase in the number of viewpoints, thereby compensating for the decline in luminance caused by the decrease in aperture efficiency. This may be accomplished by storing a table that indicates the relationship between number of view pints and voltage applied to the backlight and changing the applied voltage in dependence upon the number of viewpoints.

Sixth Embodiment

In each of the foregoing embodiments, the arrangement is such that a forcible changeover between two- and three-dimensional displays in response to the user acting upon each object. With such an arrangement, it is not possible to deal with a case in which the user does not wish to observe a three-dimensional display or a case in which the user desires to observe a three-dimensional display at all times. The sixth embodiment is so adapted that the user can establish the three-dimensional display state at will.

Figure 30:
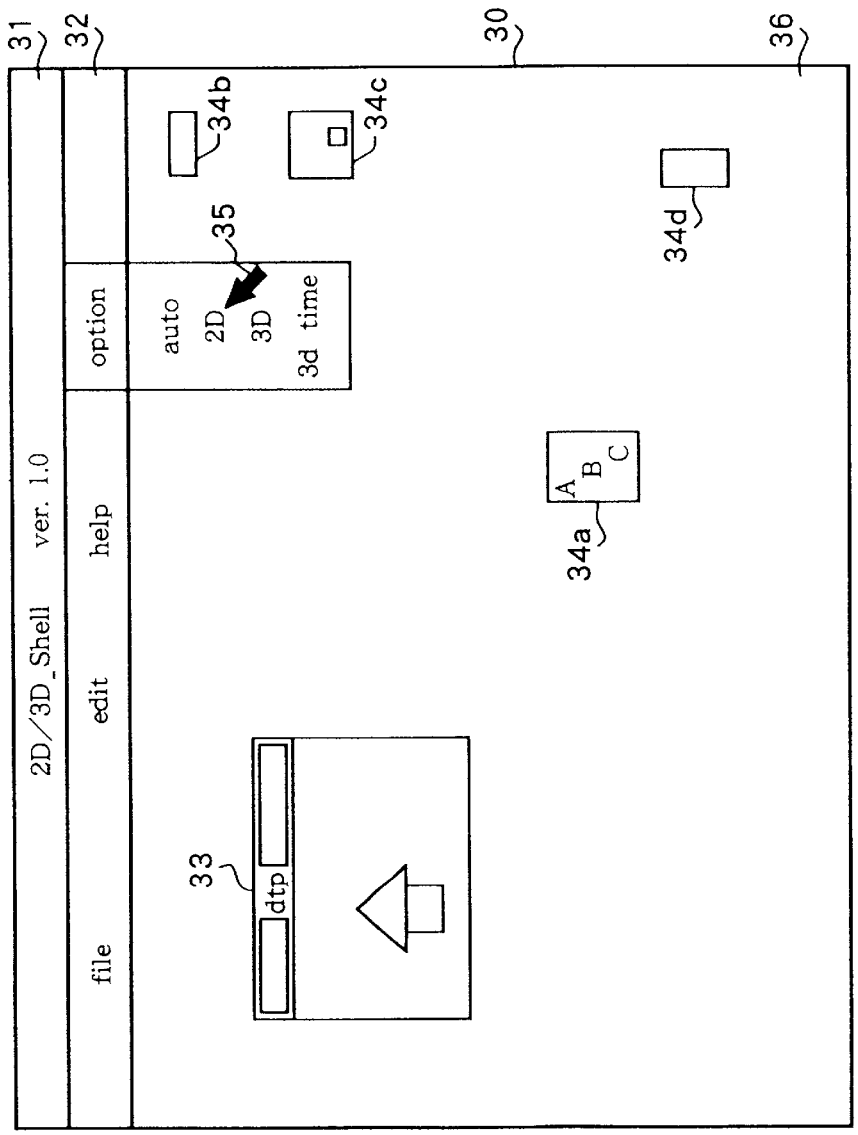
FIG. 30 is a diagram illustrating the display state of a stereoscopic display screen according to a sixth embodiment of the invention.

FIG. 30 is a diagram illustrating the display state of a stereoscopic display screen according to the sixth embodiment. As shown in FIG. 30, it is possible to select "auto", "2D" or "3D" by moving the pointer 35 and pulling down the menu bar 32 (selecting the "option" entry of the menu bar 32) using the mouse. By making these selections, it is possible to select ① the entry "auto" under "option", in which the display is changed automatically by the object selected as described in the first or second embodiment; ② the entry "2D" under "option", in which only the two-dimensional display is presented and not the three-dimensional display; and ③ the entry "3D" under "option", in which the three-dimensional display continues to be presented even if the current of processing shifts to a two-dimensional object. These processing operations are implemented by suitably setting the branching conditions at steps S63 and S64 in the flowchart of FIG. 16. The details would be obvious to one having ordinary skill in the art.

Thus, a display environment that conforms to user preference can be established by adopting the arrangement described in the sixth embodiment. This makes it possible to provide a user-friendly environment.

Seventh Embodiment

With a stereoscopic display in which a stereoscopic image is observed utilizing the parallax between images for the right and left images, some users complain of physiological discomfort when observation is performed over an extended period of time, the reasons being a contraction between the convergence angles of both eyes and the focal lengths of the eyes, and the amount of parallax.

In the seventh embodiment, it is so arranged that the user can freely set the observation time of the three-dimensional image to mitigate or eliminate physiological discomfort.

Figure 31:
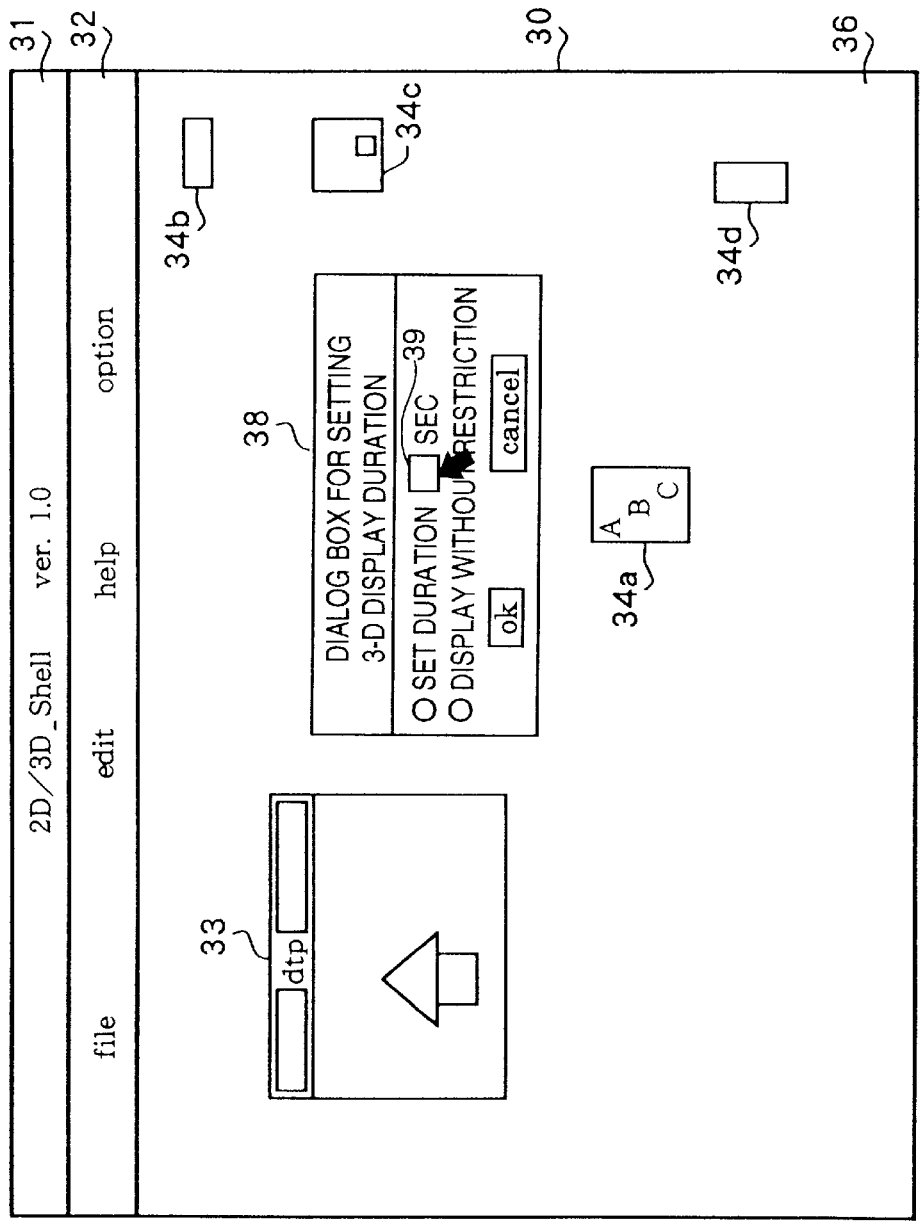
FIG. 31 is a diagram for describing the operating environment of a seventh embodiment of the invention.

FIG. 31 is a diagram for describing the operating environment of the seventh embodiment. When the "option" entry of the menu bar is selected and then the "3D time" entry under "option" is selected by the pull-down operation described in connection with FIG. 30, a dialog box 38 of the kind shown in FIG. 31 is displayed and the system waits for an input from the user. The interaction between the user and the computer is performed in the usual manner. Specifically, when user wishes to make a time setting, the user clicks on "SET DURATION", sets the desired duration in an input field 39 and clicks an "ok" button, thereby setting the duration of the three-dimensional display. If the user wishes to cancel the limitation upon the display duration of the three-dimensional display, then the user need only use the mouse to click on "DISPLAY WITHOUT RESTRICTION". When the user wises to terminate the three-dimensional display, the user makes the set time zero seconds.

Further, it is possible to provide means which, upon elapse of a predetermined period of time, alerts the user to confirm what the user's intentions are, or an arrangement in which the elapsed time of the three-dimensional display is displayed in a window that is presenting a three-dimensional display.

Thus, in accordance with the seventh embodiment, the user is capable of setting the length of time during which the three-dimensional display is presented, thereby making it possible to mitigate or eliminate physiological discomfort produced by long-term observation.

Eighth Embodiment

A computer system having a stereoscopic display capable of switching between and mixing two- and three-dimensional displays has been described above. With the user interface (GUI) adopted in each embodiment, often a pointer manipulated by a pointing device such as a mouse is moved to a desired position by the user, whereby an icon or window is selected so that an object may be acted upon. However, in each of the foregoing embodiments, no mention is made of a case in which the position of the pointer is located in an object (especially a window) in which a three-dimensional display is being presented.

Figure 32:
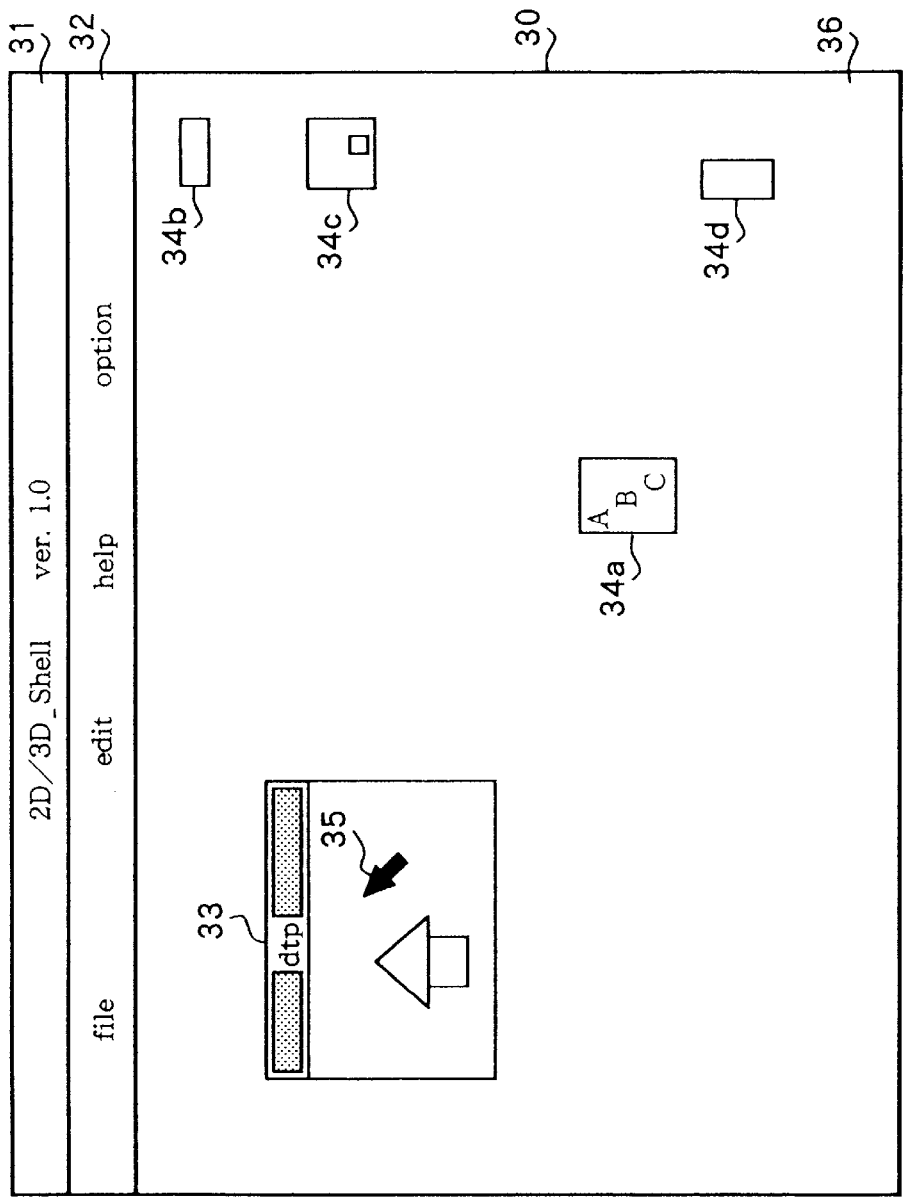
FIG. 32 is a diagram showing an example of a display according to an eighth embodiment of the present invention.

The eighth embodiment will be described with reference to FIGS. 13 and 32 in regard to a case where the pointer is located inside a window in which a three-dimensional display is being presented.

Figure 33:
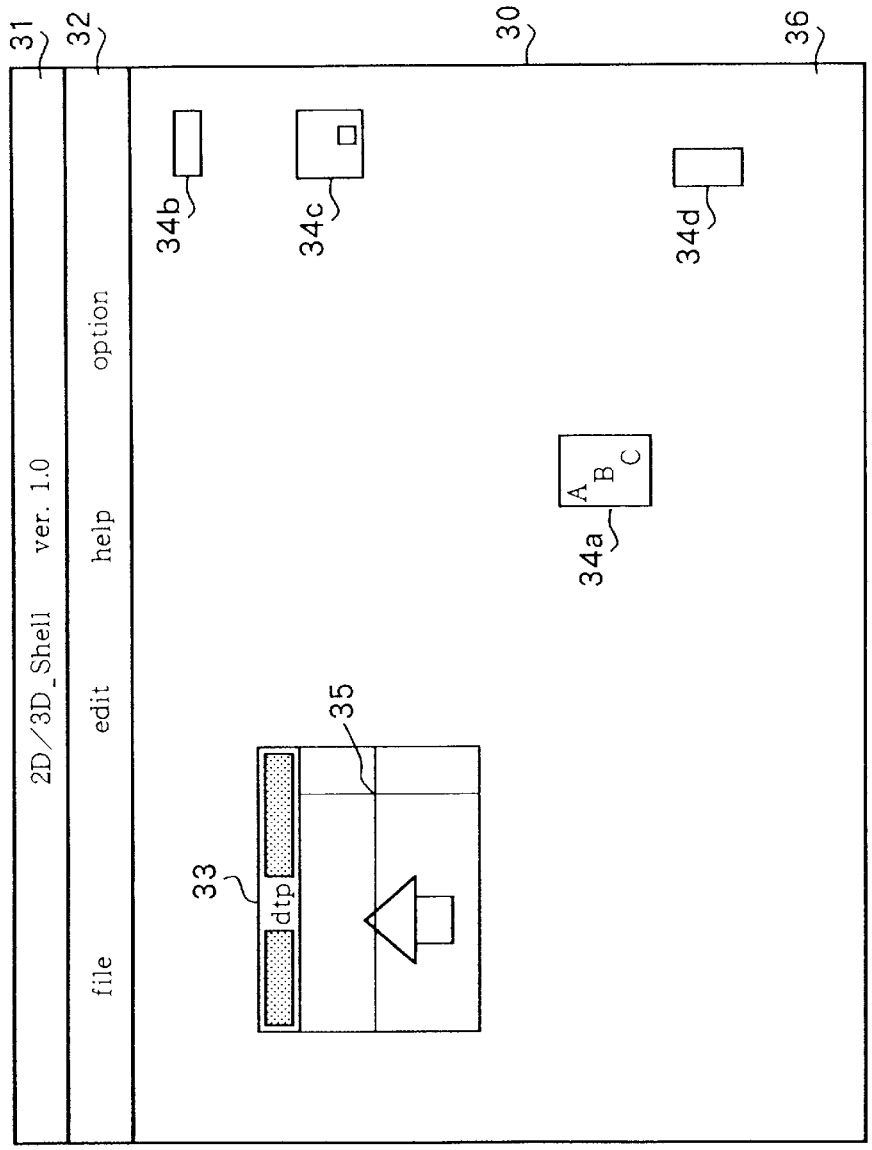
FIG. 33 is a diagram showing another example of a display according to the eighth embodiment.

In a case where the pointer 35 is located somewhere other than a three-dimensional display zone in FIG. 13 and then the pointer is moved to the three-dimensional display zone, the two-dimensionally displayed pointer comes to reside in the three-dimensional display. This appears odd to the user and detracts from operability. In the eighth embodiment, therefore, when the pointer 35 is located in the three-dimensional display zone, a changeover is made from the three-dimensional display to the two-dimensional display by any of the above-described means to avoid giving the user an odd impression. In order to clarify the fact that the pointer is present at this time, the shape of the pointer is changed (to cross hairs in this example), as shown in FIG. 33.

It should be noted that since the coordinates; of a window presenting a three-dimensional display and the coordinates of the pointer are comprehended by the system, it is possible to readily determine whether the pointer has penetrated the three-dimensional display window. By adding the result this determination to the branching conditions of step S63, control according to the eighth embodiment can be achieved.

Thus, by arranging it so that a two-dimensional display is presented in a three-dimensional display zone when the pointer enters the three-dimensional display zone, as described in the eighth embodiment, the user can be provided with an easy-to-use environment. If the user desires that a three-dimensional display be presented even if the pointer is located in the three-dimensional display zone, the system can be customized through a method similar to that of the sixth embodiment.

Ninth Embodiment

In the system in which two- and three-dimensional displays are mixed, there are instances where the user moves a two-dimensionally displayed object to a desired position on the screen for a particular purpose. It is obvious that cases may arise in which the user similarly moves a three-dimensional display object (a window). in the first embodiment, however, it is necessary to control the painting of the checkered mask pattern so as to follow up movement of the three-dimensional display window at the same time that this window is moved. In the third embodiment, control is necessary to make the transmissive portions of the PDLC follow up movement of the three-dimensional display window at the same time that this window is moved. Likewise, in the fifth embodiment, control for painting the parallax barrier pattern is required. When these operations for controlling the three-dimensional display are carried out at the same time that the three-dimensional image is painted, the load upon the computer system becomes excessive.

In the ninth embodiment, therefore, processing is executed to change over the entire screen to the two-dimensional display when a three-dimensional object is being moved (dragged), and then to restore the three-dimensional display at the conclusion of dragging, the purpose of this processing being to alleviate the load upon computer system of this embodiment.

The ninth embodiment will be described with reference to FIGS. 13, 34 and 35.

Figure 34:
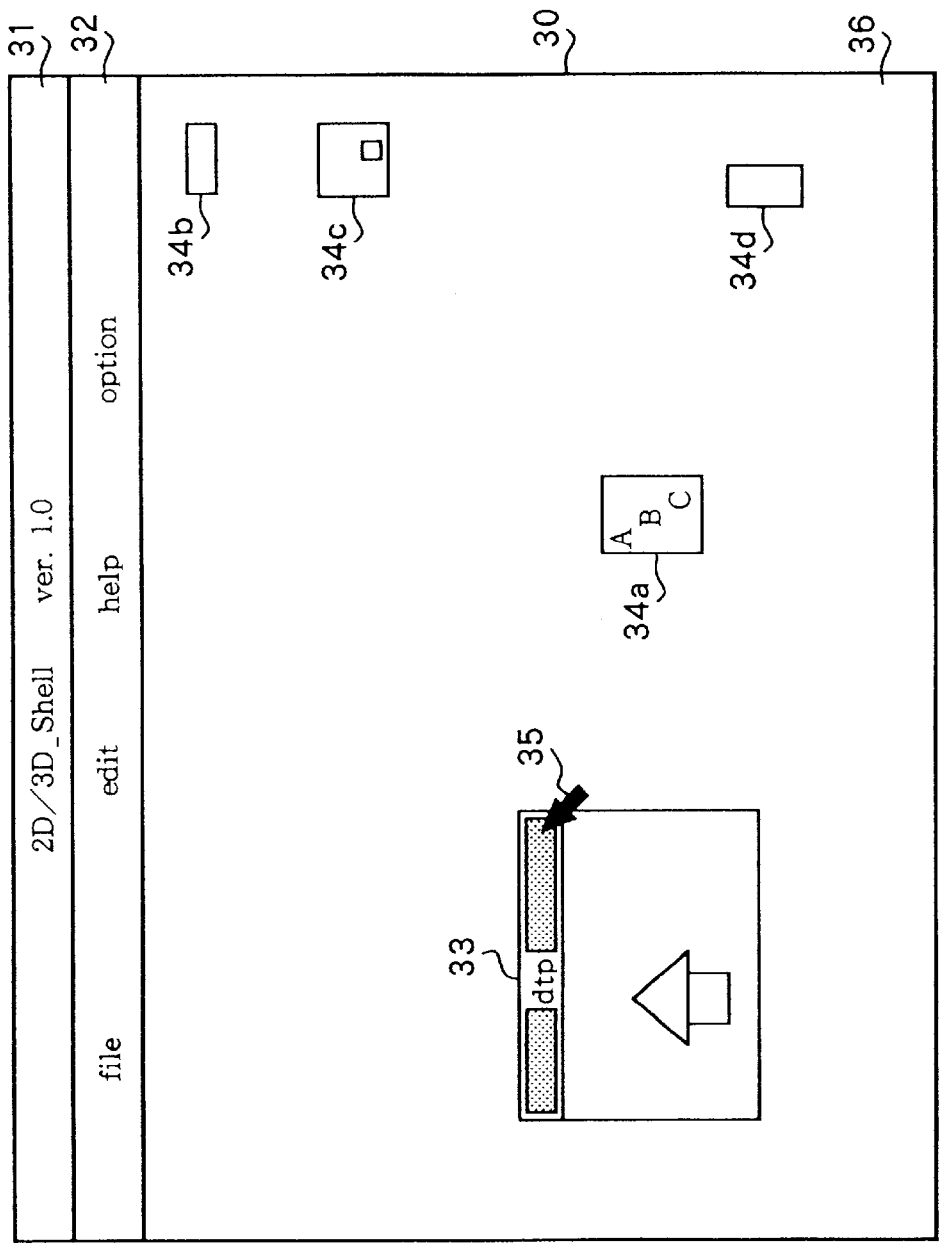
FIG. 34 is a diagram showing a state in which a window is being moved by a dragging operation.
Figure 35:
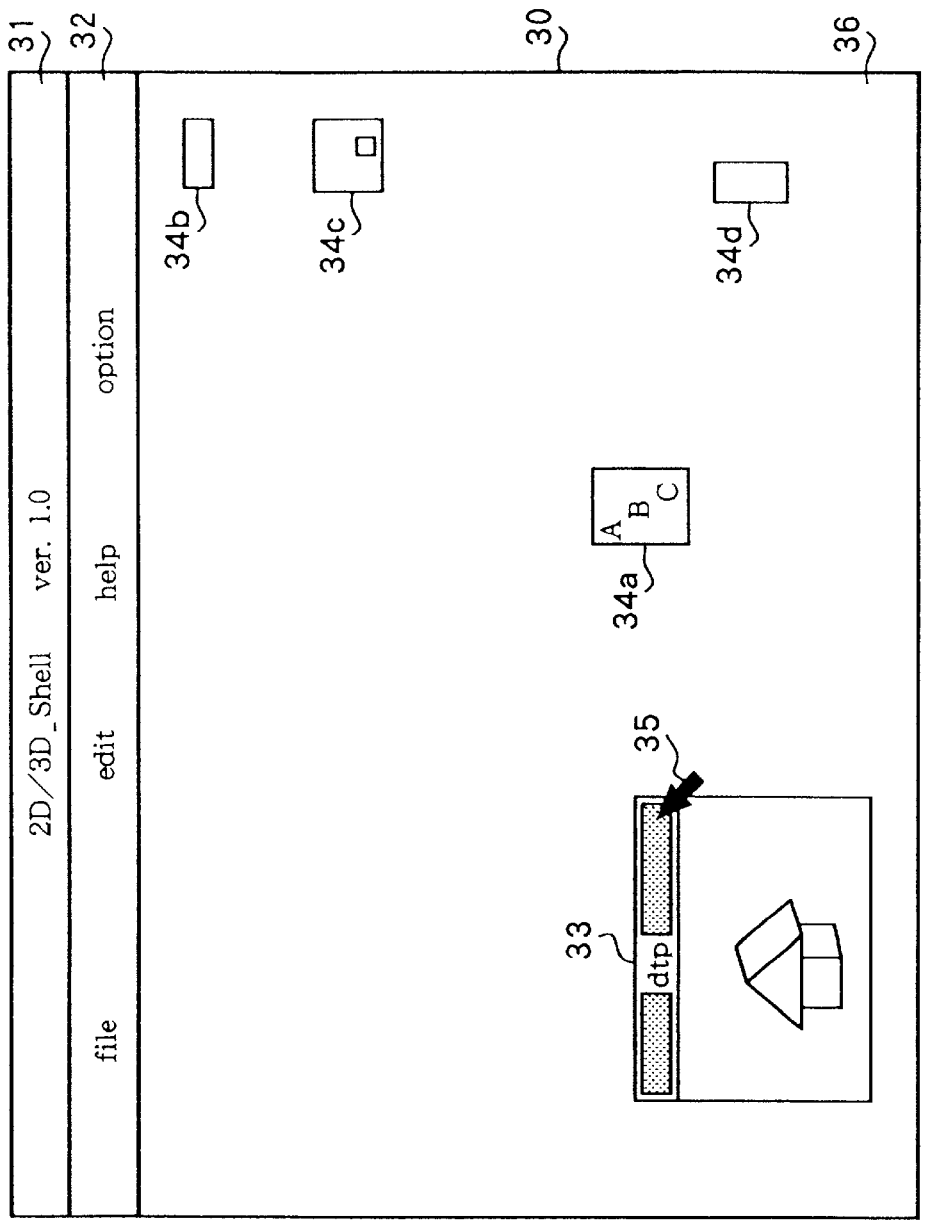
FIG. 35 is a diagram showing a state in which the dragging operation, started in FIG. 34, has ended.

FIG. 34 is a diagram showing a state in which a window is being moved by a dragging operation. The dragging operation usually is performed by holding down the button on a mouse (not shown) and moving the mouse to move the pointer. When it is desired to end the dragging operation, the mouse button is released. In the state depicted in FIG. 34, the portion that was painted in three dimensions in window 33 is displayed two-dimensionally. FIG. 35 is a diagram showing a state in which the dragging operation, started in FIG. 34, has ended. At this time the two-dimensional image painted in the window 33 is returned to the three-dimensional display. This control according to the ninth embodiment may also be added on in such a manner that the entirety of the display screen is changed over to the two-dimensional display if dragging of the window is detected by the event analysis executed at step S62 in the flowchart of FIG. 14. Alternatively, the changeover to the two-dimensional display may be performed with regard to a dragged window by setting the branching conditions of step S63.

By virtue of the foregoing processing, control can be performed in, say, the first embodiment, in such a manner that the checkered mask pattern will not be painted over the entirety of the display screen. Further, in the third embodiment, the voltage applied to the PDLC may be turned off over the entire screen, i.e. the entire screen may be made a light-scattering surface. Alternatively, in the fifth embodiment, the painting of the parallax barrier pattern may be inhibited over the entire screen.

Thus, when the object of a three-dimensional display is being dragged, the entire display screen is changed over to the two-dimensional display to lighten the processing load upon the hardware and software. Further, when the user is dragging a window, the system need only know where the window being dragged in located. This means that no practical problems arise even if the window in the window is displayed two-dimensionally during dragging.

Thus, in accordance with each of the embodiments set forth above, it is determined whether an object is a three-dimensional object and control can be performed to switch between two- and three-dimensional displays based upon the results of the determination. Furthermore, in accordance with the sixth and seventh embodiments, the user is capable of making desired settings in relation to a three-dimensional display. As a result, a computer system that presents agreeable two- and three-dimensional displays is provided.

Further, even if the computer system is one having a stereoscopic display utilizing binocular parallax other than that of the foregoing embodiments, wherein the stereoscopic display is capable mixing or switching between two- and three-dimensional displays, effects similar to those described above may be obtained by adopting the same arrangement. Furthermore, though a window has been described primarily as the object in the description given above, a similar arrangement will hold and similar effects will be obtained even for other objects such as icons.

Tenth Embodiment

A tenth embodiment of the invention relates to a computer system having a three-dimensionally visible image display that operates in a GUI environment manipulated in three-dimensional space, wherein a position in the depth direction of three-dimensional is capable of being designated.

According to the tenth embodiment, a three-dimensionally visible image display scheme is adopted in which luminance points are reproduced sequentially and at high speed in a time series in display space when an image is displayed, and use is made of the observer's persistence of vision to allow the observer to see a three-dimensionally visible image as a collection of the luminance points. An easy-to-use user interface is provided by this three-dimensionally visible image display scheme and a graphical operating environment in three-dimensional display space.

(1) Computer System According to Tenth Embodiment

Figure 36:
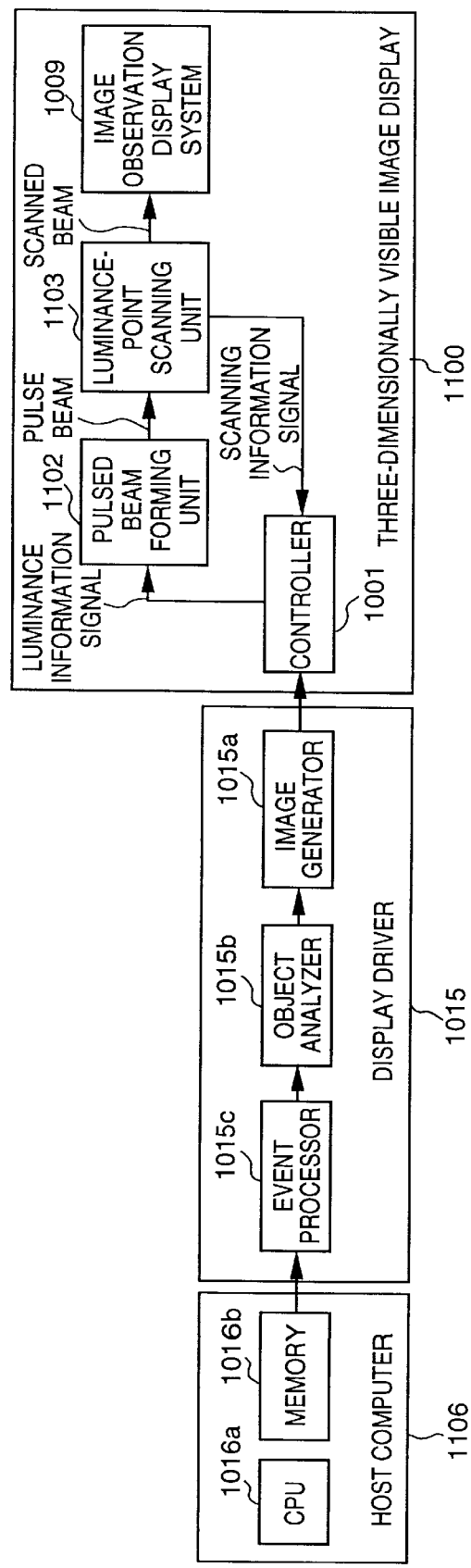
FIG. 36 is a block diagram showing the configuration of a computer system according to a tenth embodiment of the present invention.

FIG. 36 is a block diagram showing the configuration of a computer system according to a tenth embodiment of the present invention. Shown in FIG. 36 is a three-dimensionally visible image display 1100 which reproduces a three-dimensionally visible image according to this embodiment. The details of the display principle and configuration will be described later.

A display driver 1015 controls the painting of the three-dimensionally visible image display according to the tenth embodiment and comprises elements 1015a, 1015b and 1015c. Specifically, an image generator 1015a reproduces a three-dimensional image. That is, the image generator 1015a generates data (data indicating the position and intensity of luminance points) actually painted on the three-dimensionally visible image display. An object analyzer 1015b discriminates and analyzes the type of data to be painted. An event analyzer 1015c executes processing for updating messages from the host computer, primarily the content of a display. A computer 1016, which executes an operating system and application software, updates a signal to the device driver 1015 whenever the data for painting is updated.

It should be noted that the device driver 1015 is an electronic circuit that may be provided externally of the host computer or loaded in a slot. Alternatively, the device driver 1015 may be implemented by one item of software for the host computer or maybe installed as a mixture of software and electronic circuitry. More specifically, the host computer 1016 has a CPU 1016a and a memory 1016b which stores a control program for implementing a processing procedure, which will be described later with reference to the accompanying flowcharts. It may be so arranged that the CPU 1016a of the host computer 1016 implements the functions of the display driver 1015. Here the memory 1016b includes a ROM, RAM or magnetic disk drive. Accordingly, it may be so arranged that the control program for implementing the processing procedure (described later) by way of the CPU 1016a is supplied from a storage medium such as a floppy disk and stored in a RAM in order to be executed by the CPU 1016a.

(2) Principle of Three-Dimensionally Visible Image Display According to Tenth Embodiment The three-dimensionally visible image display 1100 shown in FIG. 36 will now be described. The three-dimensionally visible image display 1100 of this embodiment essentially comprises a controller 1001, a pulsed beam forming unit 1102, a luminance-point scanner 1103 and an image observation optical system 1009. A luminance-point scanning information signal enters the controller 1001 from the luminance-point scanner 1103, and the controller 1001 produces a luminance-point luminance information signal that is output to the pulsed beam forming unit 1102. The latter modulates the intensity of the light from a light source based upon the luminance information signal, forms a high-frequency pulsed light beam and emits a luminance point. The luminance-point scanner 1103 converts this light beam to condensed luminous flux, causes the point of condensed light to scan at high speed in three dimensions inclusive of the direction (Z direction) of the optic axis and projects the scanning beam toward the image observation optical system 1009. By virtue of the scanning beam thus processed, the observation optical system 1009 sequentially forms images of luminance points in three-dimensional space (observation space) and allows the observer to perceive the luminance points.

By making the beam scanning speed and the speed of luminance modulation sufficiently high and synchronizing the two correctly, the user observing from a prescribed direction of the image observation optical system 1009 is capable of observing the three-dimensional image as a collection of luminance points in observation space owing to the effect of persistence of vision.

Figure 37:
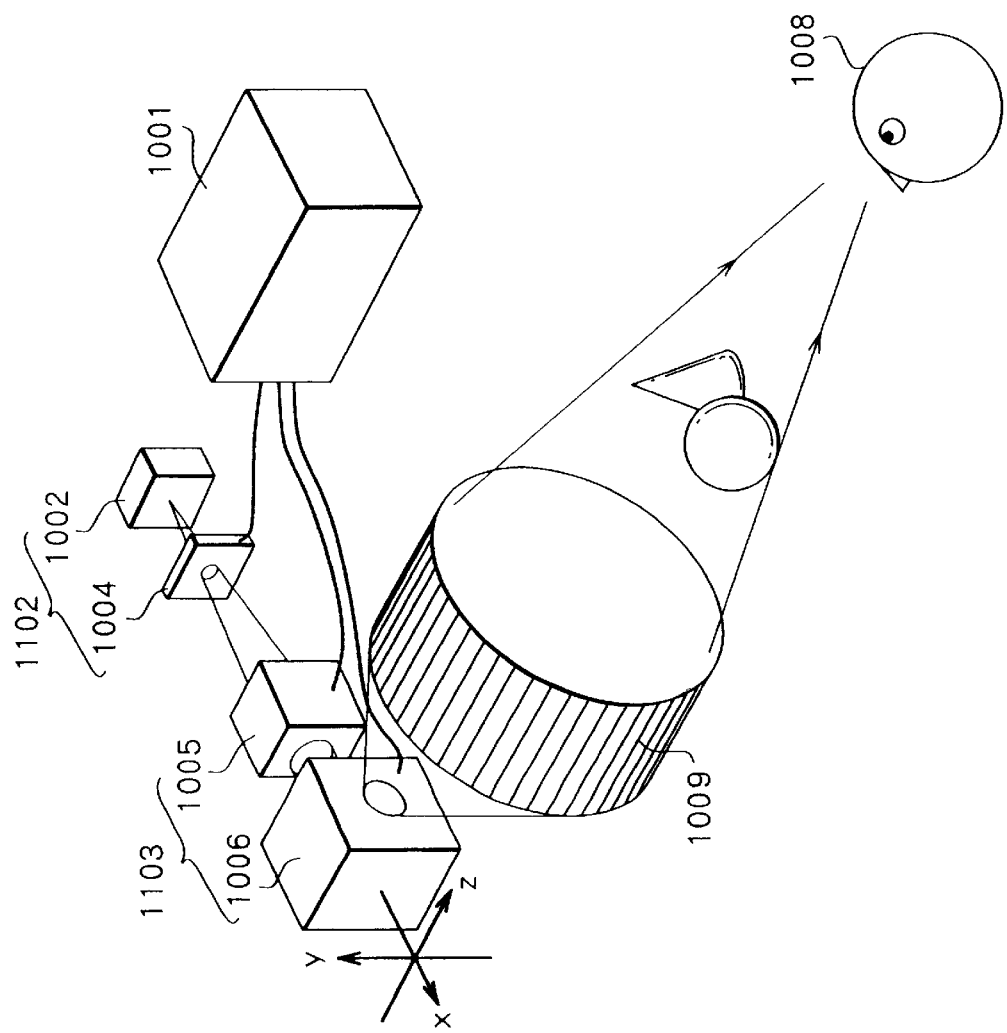
FIG. 37 is a schematic view showing the principal components of a stereoscopic display according to the tenth embodiment.

FIG. 37 is a schematic view showing the principal components of the three-dimensionally visible image display according to this embodiment. Shown in FIG. 37 are the controller 1001, which is constituted by electrical circuitry. The controller 1001 obtains scanning information from the luminance-point scanner 1103, determines the position of the luminance point formed and outputs the corresponding luminance information signal to the pulsed beam forming unit 1102.

A light source 1002 employs a monochromatic LED point light source in the visible region in order to improve the performance of image formation. A device exhibiting excellent coherence, such as an LED semiconductor laser or metal halide lamp, is suitable as the light source 1002. This point light source may be replaced by a point light source obtained by causing parallel beams to impinge upon an image forming optical system.

A transmittance controller 1004 serving as intensity modulating means uses a high-frequency modulating element such as an AOM (acousto-optic modulator) or EO (electro-optical device), etc. The transmittance controller 1004 is placed on the optical path of the light beam and adjusts the transmittance, namely the intensity, of the luminous flux from the light source in dependence upon luminance information signal output by the controller 1001. However, if the emission intensity of the light source 1002 itself is capable of being modulated by a high frequency, the intensity of the light emitted by the light source can be adjusted directly in dependence upon the above-mentioned luminance signal output by the controller 1001 and, hence, the transmittance controller 1004 will be unnecessary. The above-mentioned light source 1002 and transmittance controller 1004 construct part of the pulsed beam forming unit 1102.

A Z scanning unit 1005 is provided as means for scanning the direction of the optic axis. FIG. 3E is a diagram showing the detailed construction of the Z scanning unit 1005, which includes a small-size zoom lens (condensing optical system) 1005-1 having an effective diameter somewhat larger than the beam diameter, a movable lens (scanning element)

1005-4 provided in the zoom lens 1005-1, and a linear motor 1005-2 for moving the movable lens 1005-4 back and forth at high speed along the direction of the optic axis.

Figure 38:
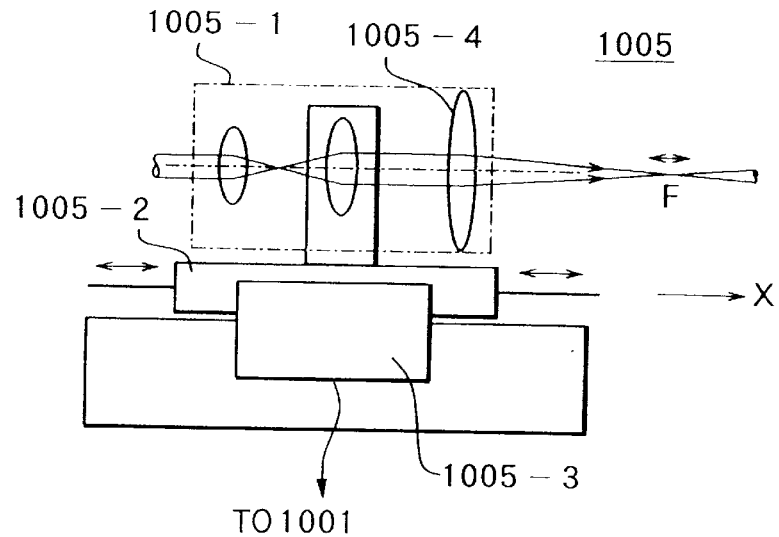
FIG. 38 is a diagram showing the detailed construction of a Z scanning unit.

The zoom lens 1005-1 condenses the light beam from the light source 1002 at a certain distance along the optic axis. Further, the linear motor 1005-2 effects movement along the optic axis (along the x direction in FIG. 38, though this is described as being the z direction because the light beam is deflected in the z direction by the beam scanning unit 1006, described later). By virtue of this arrangement, the focal length of the zoom lens 1005-1 is oscillated so that the convergence point F of the light beam is caused to scan back and forth in the direction of the optical axis at high speed. In other words, the Z scanning unit 1005 causes the convergence point (the luminance point) of the light beam to scan in the Z direction.

An amount ZL of displacement of the movable lens 1005-4 is detected by a displacement detector (displacement detecting means) 1005-3, which transmits the amount of displacement to the controller 1001 as a scanning information signal. In the case of the tenth embodiment, the displacement detector 1005-3 utilizes a position detecting encoder associated with the linear motor. In a situation where the zoom lens has a plurality of movable elements, an arrangement is adopted in which the number of linear motors is increased or in which gears and cams are driven to effect movement in suitable fashion.

Figure 39:
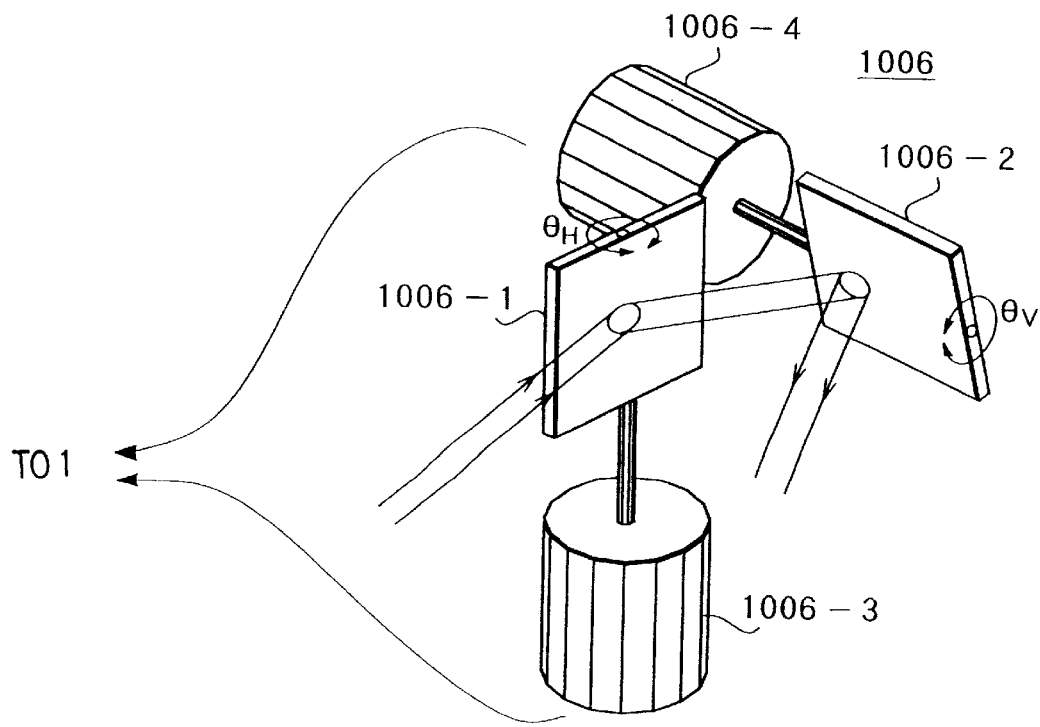
FIG. 39 is a perspective view showing the detailed construction of a beam scanner.

The beam scanning unit 1006 in FIG. 37 has the construction shown in the perspective view of FIG. 39. The beam scanning unit 1006, which functions as two-dimensional scanning means, comprises a set of galvanomirrors 1006-1, 1006-2 whose scanning directions intersect perpendicularly. The motors 1006-3, 1006-4 which drive these galvanomirrors rotate back and forth. As a result, the light beam is deflected in directions conforming to the angles of rotation of the galvanomirrors 1006-1, 1006-2, namely in the x and y directions in observation space, so as to be scanned in two dimensions.

The direction of rotation of the galvanomirror 1006-1 is horizontal and that of the galvanomirror 1006-2 is vertical. Deflection angles $\theta_H$, $\theta_V$ of the respective galvanomirrors 1006-1, 1006-2 are detected by encoders built in the motors 1006-3, 1006-4 and are transmitted to the controller 1001 as scanning information indicating the position of the luminance point.

The Z scanning unit 1005 and beam scanning unit 1006 construct one element of the luminance point scanner 1103. Further, the luminance-point scanner 1103 of this embodiment constructs part of the three-dimensional scanning means.

The image observation optical system 1009 in FIG. 37 uses two large-diameter convex lenses in the case of this embodiment. The image observation optical system 1009 converges the light beam, which emerges from the beam scanning unit 1006, toward a prescribed observation zone, forms an exit pupil of the entire apparatus and forms a three-dimensional image based upon the luminance points in the observation zone.

In the operation of this embodiment, the luminous flux emergent from the light source 1002 has its intensity modulated in the transmittance controller 1004 by a signal from the controller 1001. The modulated beam emerges from the controller 1004 and enters the Z scanning unit 1005, which converts the incident light beam to a condensed luminous flux and causes the point of convergence to scan back and fourth in the z direction at high speed. The beam scanning unit 1006 deflects the condensed light, which impinges on it in a direction parallel to the x axis, in the z direction and causes the beam to scan a prescribed area in the xy plane two-dimensionally.

Figure 40:
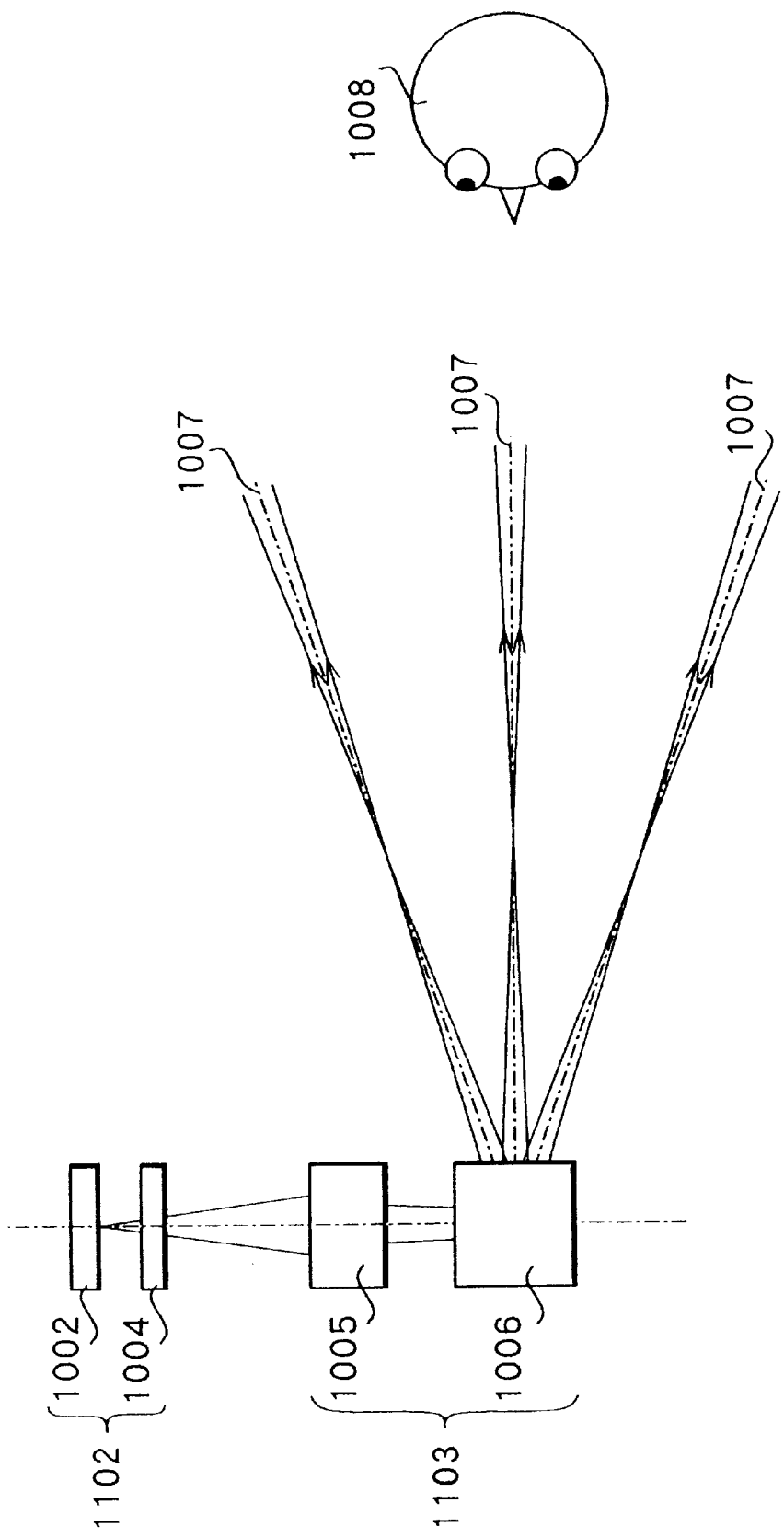
FIG. 40 is a diagram showing optical paths, seen along the vertical from above, up to emergence of light beams from a luminance-point scanning unit in the tenth embodiment.

FIG. 40 is a diagram showing optical paths, seen along the vertical from above, up to emergence of light beams from the luminance-point scanning unit 1103 in the tenth embodiment.

Principal rays 1007 of the light beams from the luminance-point scanning unit 1003 all emerge in directions which diverge from the luminance-point scanning unit 1103. The light beams which impinge upon the eyes of the observer 1008 are extremely few, being limited to those at the center. Accordingly, in this embodiment, the light beams that have emerged from the luminance-point scanning unit 1103 are made to converge in suitable fashion by the image observation optical system 1009.

Figure 41:
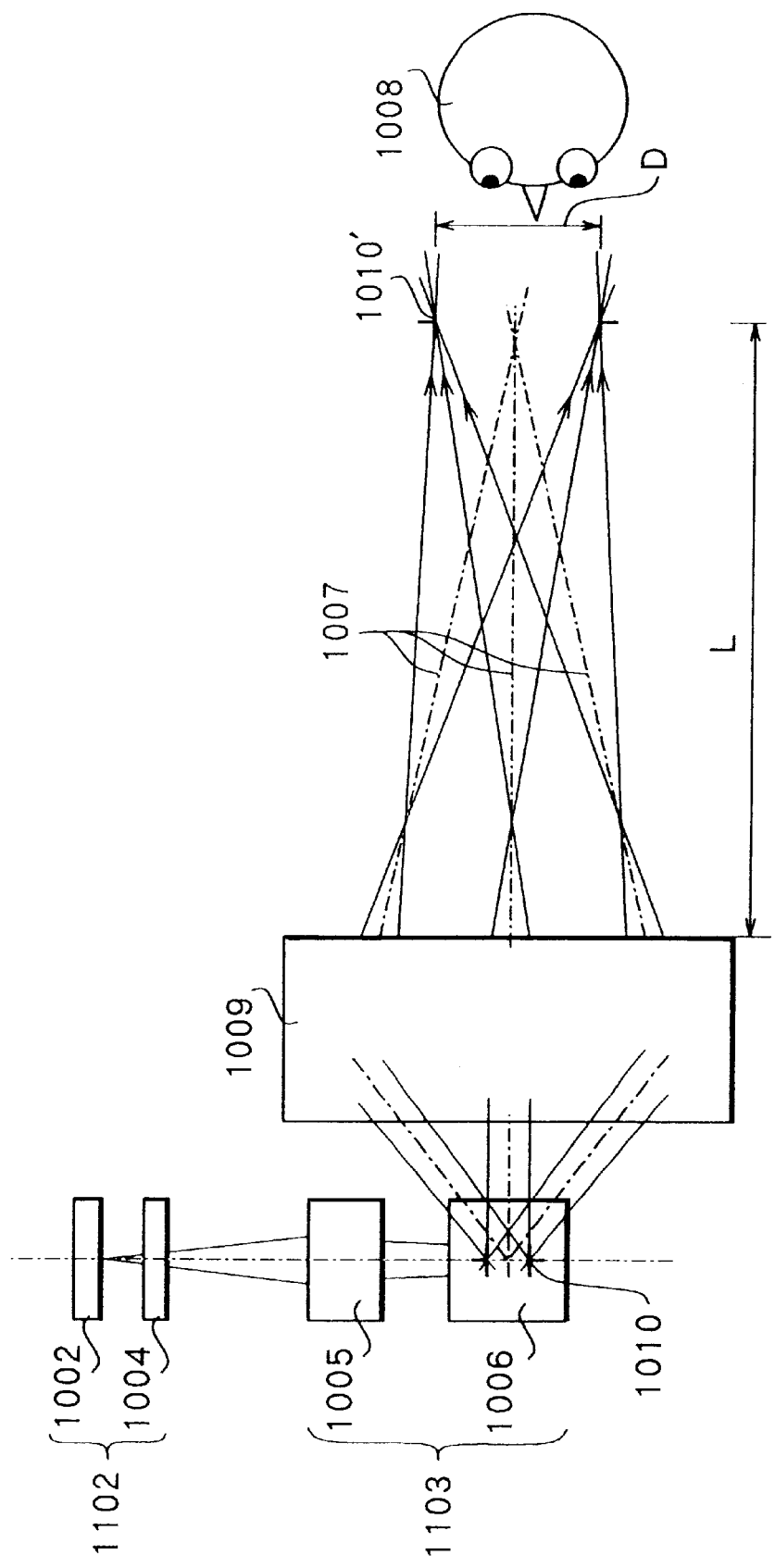
FIG. 41 is a diagram showing optical paths, seen along the vertical from above, up to arrival of light beams at an observer following emergence of the light beams from an image observation optical system.

FIG. 41 is a diagram showing optical paths, seen along the vertical from above, up to arrival of light beams at the observer following emergence of the light beams from the image observation optical system 1009.

If the optical system up to the luminance-point scanning unit 1103 and the image observation optical system 1009 are considered collectively as a single optical system, the position of the pupil 1010 of this optical system is the position at the center of rotation of the galvanomirror (or, more precisely, the center of the pupil on the optical path in the meridional direction is the center of rotation of the galvanomirror in the vertical direction). At such time the pupil 1010 is the entrance pupil for the image observation optical system 1009 and its image is formed at an exit pupil 1010' by the image forming action of the image observation optical system 1009.

Here the exit pupil 1010' is the exit pupil for the entire optical system. Accordingly, light beams that have passed through the entire optical system all pass through the exit pupil 1010'. Therefore, if the eyes of the observer 1008 are placed within the exit pupil 1010', the luminance points of all light beams can be perceived. Further, as shown in FIG. 41, the optimum observation distance which prevails when the three-dimensional image is observed is the distance L (the distance from the surface of the image observation optical system 1009 nearest the observer to the exit pupil 1010'), and the viewing area is the diameter D of the exit pupil 1010'.

The requirements demanded of the image observation optical system 1009 are as follows:

First, the exit pupil 1010' is formed by the image observation optical system 1009 on the side of the observer 1008, with the observation distance being several tens of centimeters to several meters.

Second, in order to arrange it so that principal rays 1007 of the light beams will intersect at the center of the exit pupil 1010' after forming luminance points, the maximum effective diameter of the image observation optical system 1009 is designed to be larger than the three-dimensional image reproduced.

Third, in order to make the viewing area D as large as possible, the lens should have a small F number (the value obtained by dividing the focal length by the diameter of the (i.e., the lens should be such that the effective diameter of the image observation optical system 1009 is as large as possible and the focal length as short as possible)

As the result of such scanning performed by the luminance-point scanning unit 1103, the light beams form group of luminance points (Xi,Yi,Zi) within the limits of three-dimensional space.

The relationship among the control of the pulsed beam forming unit 1102 and a luminance-point scanner 1103, the data processing executed by the controller 1001 and the information of the three-dimensional image reproduced will now be described.

In this embodiment, first the states of the scanning devices which constitute the luminance-point scanning unit 1103, namely the three parameters which are the rotational angle $\theta_H$ of the horizontal scanning galvanomirror, the rotational angle $\theta_V$ of the vertical scanning galvanomirror and the displacement $Z_L$ of the linear motor along the z axis (the displacement of the scanning element), are detected, then the resulting signals are entered into the controller 1001 as the states of the various scanning means, namely scanning information signals.

On the basis of the three-dimensionally visible image that is to be displayed, the controller 1001 calculates the intensity $L(\theta_H, \theta_V, Z_L)$ of the light beam conforming to the scanning position and sends the luminance signal to the pulsed beam forming unit 1102. The light beam thus formed is subjected to an optical conversion by the image observation optical system 1009 upon passing through the luminance-point scanning unit 1103, the image is formed at the final convergence point (the position of the luminance point) and a luminance point of luminance L' (x,y, z) is formed at position (x,y,z).

Figure 42:
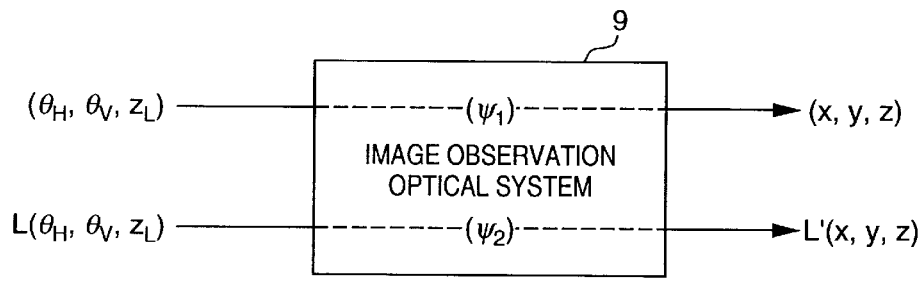
FIG. 42 is a diagram for describing an optical conversion performed by an image observation optical system according to the tenth embodiment.
Figure 43:
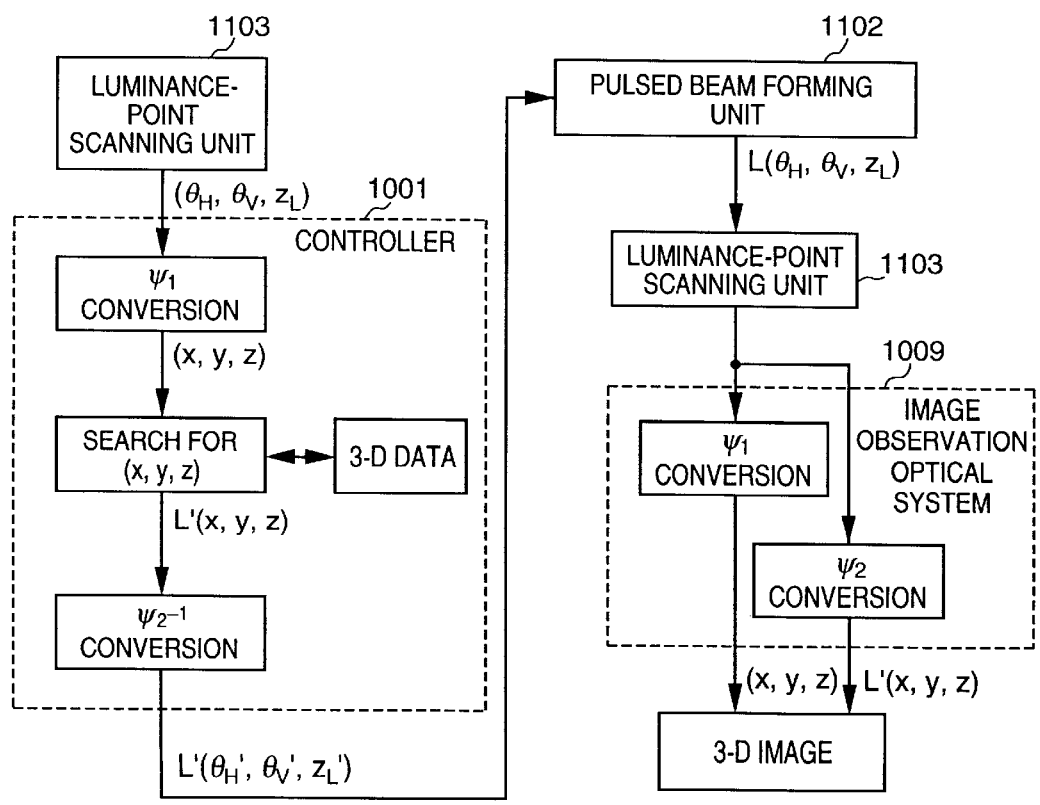
FIG. 43 is a diagram showing the flow of data in the tenth embodiment.

If we let the optical conversions of the luminance-point position (x,y,z) and luminance L' (x,y,z) by the image observation optical system 1009 be $\psi_1$ and $\psi_2$, respectively, as shown in FIG. 42, the flow of the above-mentioned data can expressed by the diagram shown in FIG. 43.

The scanning device information $(\theta_H, \theta_V, Z_L)$ sent to the controller 1001 from the luminance-point scanning unit 1103 undergoes the conversion $\psi_1$ within the controller 1001 and is converted to image-point position information (x,y,z). The controller 1001 refers to three-dimensional image data, which has already been generated, to search for a three-dimensional image point that coincides with the position (x,y,z). If the image point exists, then the controller 1001 obtains the luminance information L' (x,y, z) of this point.

Next, the controller 1001 subjects the luminance information L'(x,y,z) to a conversion $(\psi_2^{-1})$ that is the inverse of $\psi_2$ and obtains the pulse-beam luminance information $L(\theta_H, \theta_V, Z_L)$ It should be noted that if the characteristics (aberration, transmittance, etc.) of the image observation optical system 1009 are ascertained beforehand by simulation or actual measurement, the conversion $\psi_1$ and inverse conversion $\psi_{22}^{-1}$ can be executed artificially.

The luminance information $L'(\theta_H', \theta_V', Z_L')$ is sent to the pulsed beam forming unit 1102, which proceeds to control the light beam intensity based upon this luminance information. The light beam thus formed emerges and enters the luminance-point scanning unit 1103. Next, the light beam is subjected to the conversions $\psi_1$, $\psi_2$ by the image observation optical system 1009 so that a luminance point L'(x,y,z) of luminance L' is formed at the position (x,y,z).

Some or all of the signal processing described in connection with FIG. 43 may be executed in the device driver 1015 or host computer 1016.

A luminance point has a luminance that conforms to the position of the point. By moving a luminance point at such a high speed that the eye of a human being cannot perceive the point, a collection of the luminance points can be observed as a single whole at one time. [The reason for this is that if three-dimensional scanning of the light beam is performed at such a high speed that one cycle of scanning (reproduction of one three-dimensionally visible image) is made 1/30 of a second or less, the effect of persistence of vision appears.] According to this embodiment, a three-dimensional image is constructed by luminance points produced by luminous flux from a high-luminance light source, and the part of the luminous flux impinges directly upon the eyes of the observer, as a result of which a bright three-dimensional image can be reproduced. Furthermore, by suitably selecting the image observation optical system 1009, a wider viewer field and a larger three-dimensional image can be obtained in comparison with the conventional three-dimensionally visible image display. Further, as opposed to a system in which a two-dimensional liquid crystal display device is moved at high speed and a three-dimensionally visible image is rendered observable by persistence of vision, a large moving object is not used. This assures safety during observation.

Thus, it is possible to realize a three-dimensionally visible image display which gives a natural three-dimensionally visible image impression by reproducing luminance points, which correspond to three-dimensional coordinates of an object in three-dimensional space, at high speed and in sequential fashion in actual space.

(3) Operating Environment, or GUI, of Tenth Embodiment

Figure 44:
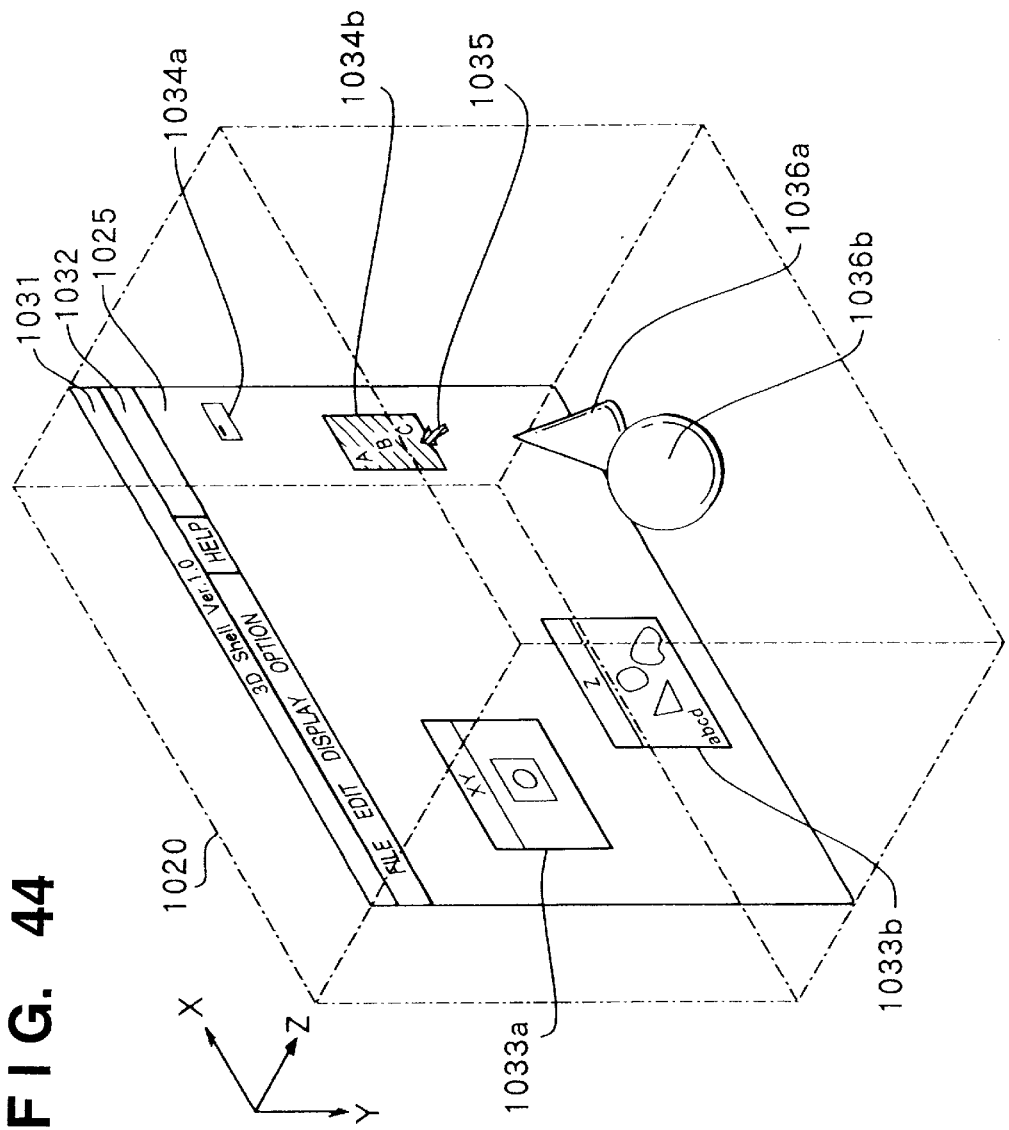
FIG. 44 is a diagram showing an example of a display on a user interface operating according to the tenth embodiment.

FIG. 44 is a diagram showing an example of a display on a user interface operating according to the tenth embodiment. Specifically, FIG. 44 shows the state of the display on the screen of the three-dimensionally visible image display 1100 connected to the host computer 1016. Shown at 1020 is a working space zone indicating a zone actually used in this system within an area capable of reproducing the three-dimensionally visible image of the three-dimensionally visible image display 1100. The working space zone may be displayed clearly in conformity with user preference. Shown at 1025 is the plane of a desktop capable of being moved to any position. The plane is provided with a pull-down menu, etc., relating to operation of the computer. The pull-down menu desirably is disposed in a two-dimensional plane for reasons of operation.

Also shown in FIG. 44 are title bar 1031 in the plane of the desktop, a menu bar 1032 used in pull-down menus, windows 1033a, 1033b for displaying images, icons 1034a, 1034b, which are objects for displaying disk files and input devices for the user to see, and a pointer 1035 capable of being moved by a mouse (not shown) three-dimensionally in the working space coordinates for selecting objects and entering three-dimensional coordinates and local two-dimensional coordinates. Objects 1036a, 1036b are not images painted by the coordinate system of a window but are painted in the working space zone directly by a global coordinate system, which is the coordinate system of the overall screen. Thus, with the user interface using the icons, windows and menus, etc., objects such as icons, windows and menus related to file system directories and applications may be moved in order to move, copy and delete files and make inputs and outputs with regard to peripherals, and for the purpose of opening locations for performing such operations in display space.

(4) Operation of Applications, Especially Event Processing

The overview of application operation processing is as set forth in the first embodiment (FIG. 11) and need not be described again.

(5) Local Coordinate System and Global Coordinate System Used in This Embodiment Two types of coordinate systems are used in this embodiment, namely a global coordinate system and a local coordinate system. The global coordinate system comprises three coordinate axes that perpendicularly intersect one another at a prescribed point serving as the reference of a display position. The values along the three axes, namely X, Y and Z, represent the absolute position of a display object. The local coordinate system, on the other hand, comprises three coordinate axes that perpendicularly intersect one another at the reference position of an object. The values along the three axes, namely u, v and w, represent a position. An object such as a window or icon has global coordinate values for a display location within the display limits, as well as local coordinate value for the content of the display.

(6) Three-dimensional File Structure Used in This Embodiment

The data structure of an image file painted in a window, which is an object used in this embodiment, capable of displaying a three-dimensional image is similar to that described in the first embodiment (FIG. 12). It should be noted, however, that three-dimensional image data 52 (FIG. 12) is three-dimensional data represented by (x,y,z) coordinates, for example. Two-dimensional image data 53 (FIG. 12) is data for a two-dimensional image that represents the characteristic two-dimensional state in a three-dimensional image.

(7) Handling of User Interface in This Embodiment

The user interface according to this embodiment has been described with reference to FIG. 44. Next, the handling of a three-dimensional image file, which is a characterizing feature of this embodiment, will be described with reference to FIGS. 45 and 46, in which FIG. 45 is a diagram showing a state in which a three-dimensional display is presented in part of the user interface of the tenth embodiment.

Figure 45:
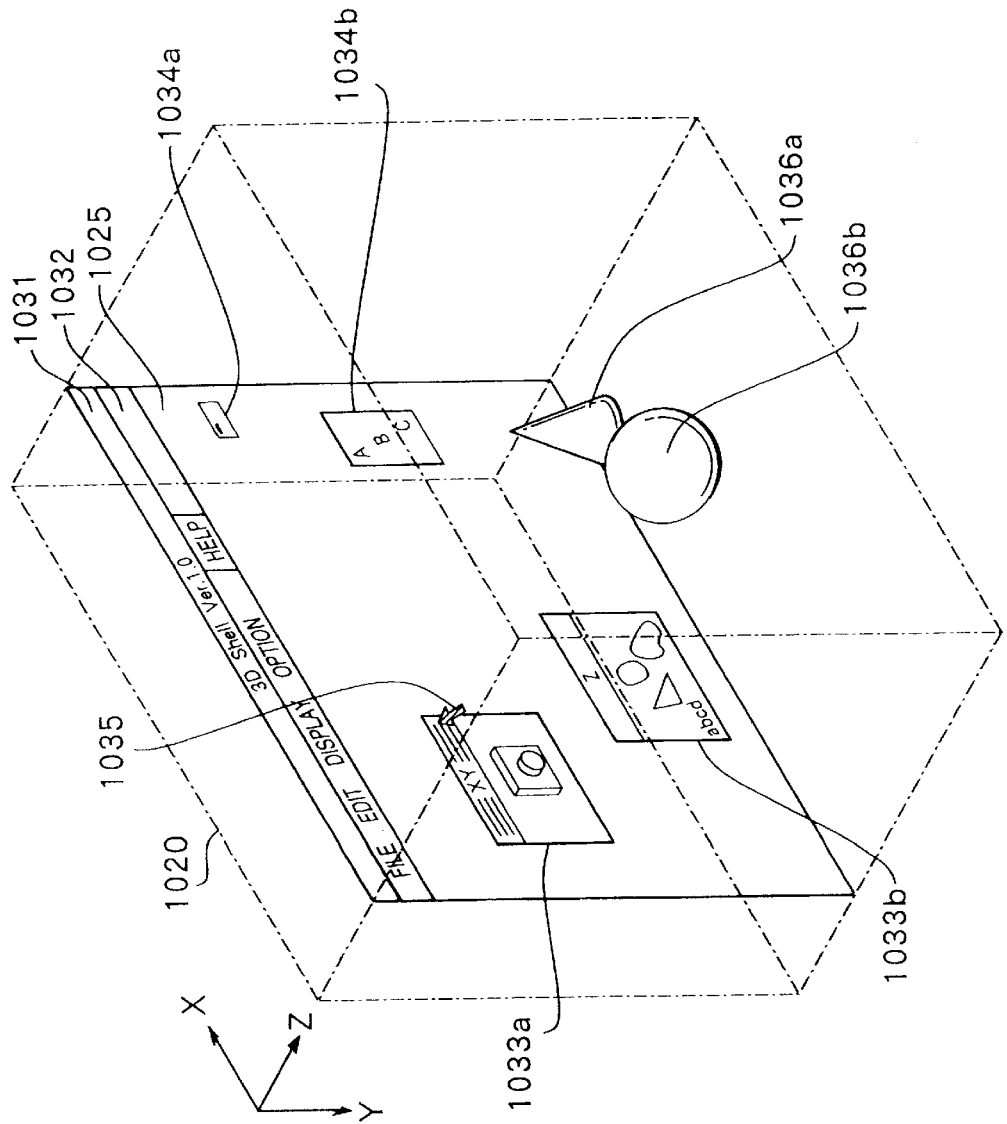
FIG. 45 is a diagram showing a state in which a three-dimensional display presented in part of the user interface of the tenth embodiment.

The window 1033a serving as an object in FIGS. 44 and 45 is a three-dimensional image file described above. In the state shown in FIG. 44, the pointer 1035 is pointed at the icon 1034b, at which time the color or brightness of the icon changes to indicate that it has been activated. In other words, this indicates that the current of processing has shifted to this icon. The icon 1034b can now be dragged by the mouse to move it to another location or the file corresponding to the icon 1034b can be opened by double clicking on it using the mouse.

Next, assume that, starting from the state shown in FIG. 44, the user employs the mouse to move the pointer 1035 to the window 1033a, which is the three-dimensional image file, and to select the window 1033a. When this is done, the current of processing shifts to the window 1033a and this window is activated, as shown in FIG. 45. Since the window 1033 corresponds to the three-dimensional image file, a three-dimensional image is painted within the window 1033a. (Owing to the limitations of a planar drawing, the three-dimensional image display is expressed by a perspective view instead.)

The mouse used here has means (not shown) for designating depth in display space and allows the user to designate any desired position in three-dimensional space. Further, the displayed objects such as the windows and icons and the desktop plane necessary for operating the computer can be moved in three dimensions using the mouse.

Processing in this case will be described with reference to FIG. 46, which is a flowchart for describing the procedure of image display processing according to the tenth embodiment.

A mousing event is acquired at step S61 by sensing whether or not the mouse has been moved and whether or not the mouse button has been pressed. This is followed by step S62, at which the content of the mousing event acquired at step S61 is analyzed. Next, at step S63, it is determined, based upon the result of even analysis performed at step S62, whether the mousing event is an event related to painting of a window. An event related to painting of a window refers to a case in which a given window is activated. If it is judged that the event is related to painting of a window, then the program proceeds to step S64. Here it is determined, based upon the information in the file header 51, whether this window has three-dimensional image data.

If it is determined at step S64 that this window has a three-dimensional image file, then the program proceeds to step S165. Here the display driver 1015 is controlled to present the three-dimensional display. More specifically, on the basis of the three-dimensional image data obtained from the three-dimensional image data 52, the image generator 1015a obtains the reproduction position and intensity of the luminance point and sends the signals to the controller 1001 of the three-dimensionally visible image display 1100 and so that the three-dimensional image is painted by the arrangement described above.

On the other hand, if it is determined at step S64 that the image file of this window does not possess three-dimensional image data, then the program proceeds to step S166, at which a two-dimensional (planar) image i, displayed at the prescribed position.

If it is determined at step S63 that the generated mousing event is not related to painting of a window, then the program proceeds to step S167. Here a two-dimensional display is presented, using the two-dimensional data of the three-dimensional image, in relating to the window presenting the three-dimensional display.

In connection with steps S165 and S166, it may be so arranged that in a case where a window placed in the deactivated state was presenting a three-dimensional display, the display in this window is changed over to a two-dimensional display.

In accordance with the processing described above, it is determined whether a selected object possesses three-dimensional data. If this is found to be the case, a changeover is made to the three-dimensional display automatically to display the three-dimensional image. This improves the operability of two- and three-dimensional images in a device which presents a three dimensional display.

When a three-dimensional image is painted at step S165, naturally the result of the analysis performed at step S62 is reflected. For example, if, when a window is opened anew, the display of the two-dimensional image is smaller than the window image, the blank space is filled by suited background.

11th Embodiment

According to the tenth embodiment, the arrangement is such that control of two- and three-dimensional displays is performed semi-forcibly in response to the user acting upon each object. This arrangement cannot deal with a case where the user does not wish to observe a three-dimensional display or a case where the user wishes to observe a three-dimensional at all times. In the eleventh embodiment, an arrangement will be described in which a user is capable of freely setting the state of a three-dimensional display in the same manner as in the sixth of seventh embodiments discussed above.

Figure 47:
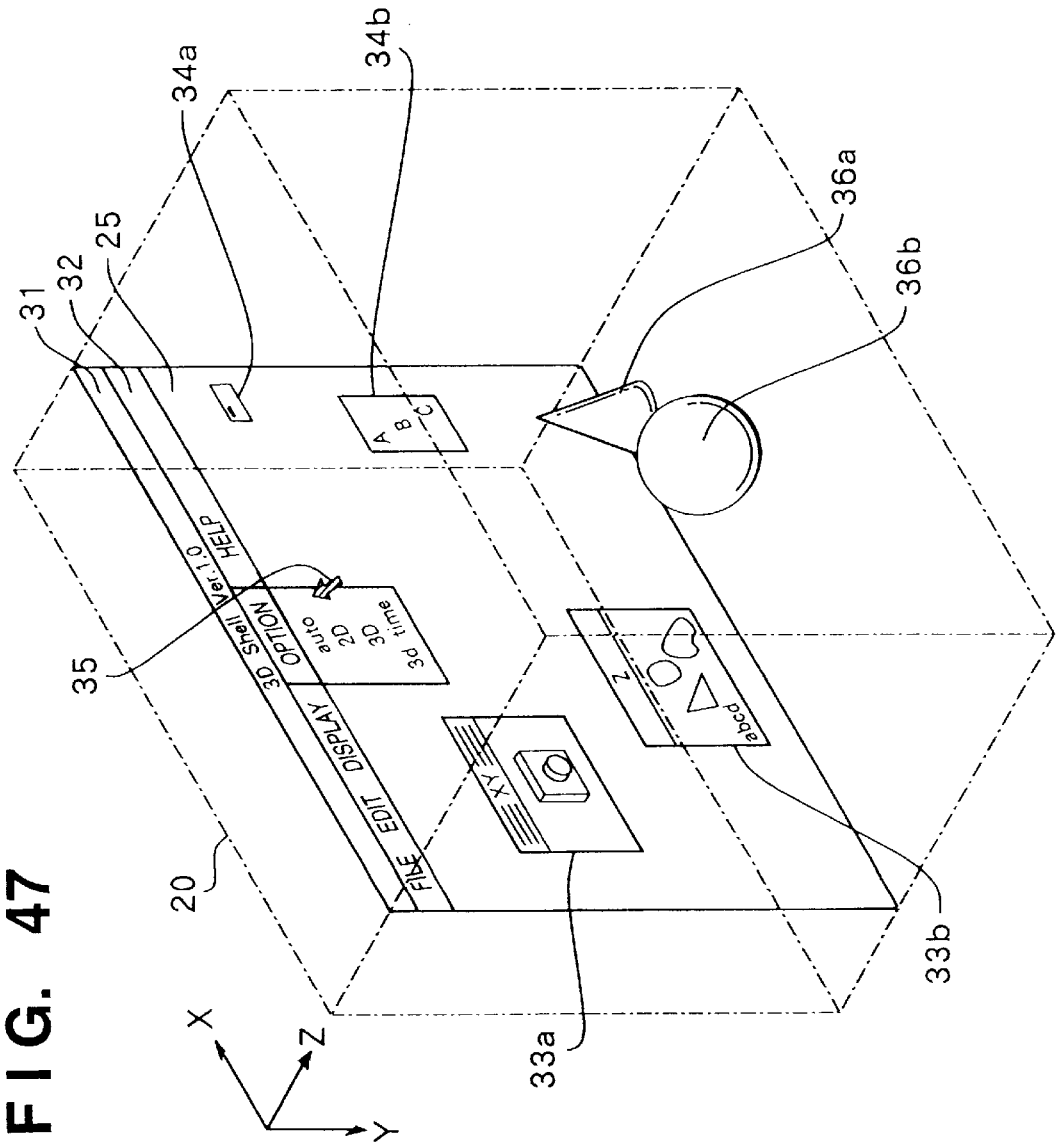
FIG. 47 is a diagram showing the display state on a stereoscopic display screen useful in describing the operating method of an 11th embodiment.
Figure 48:
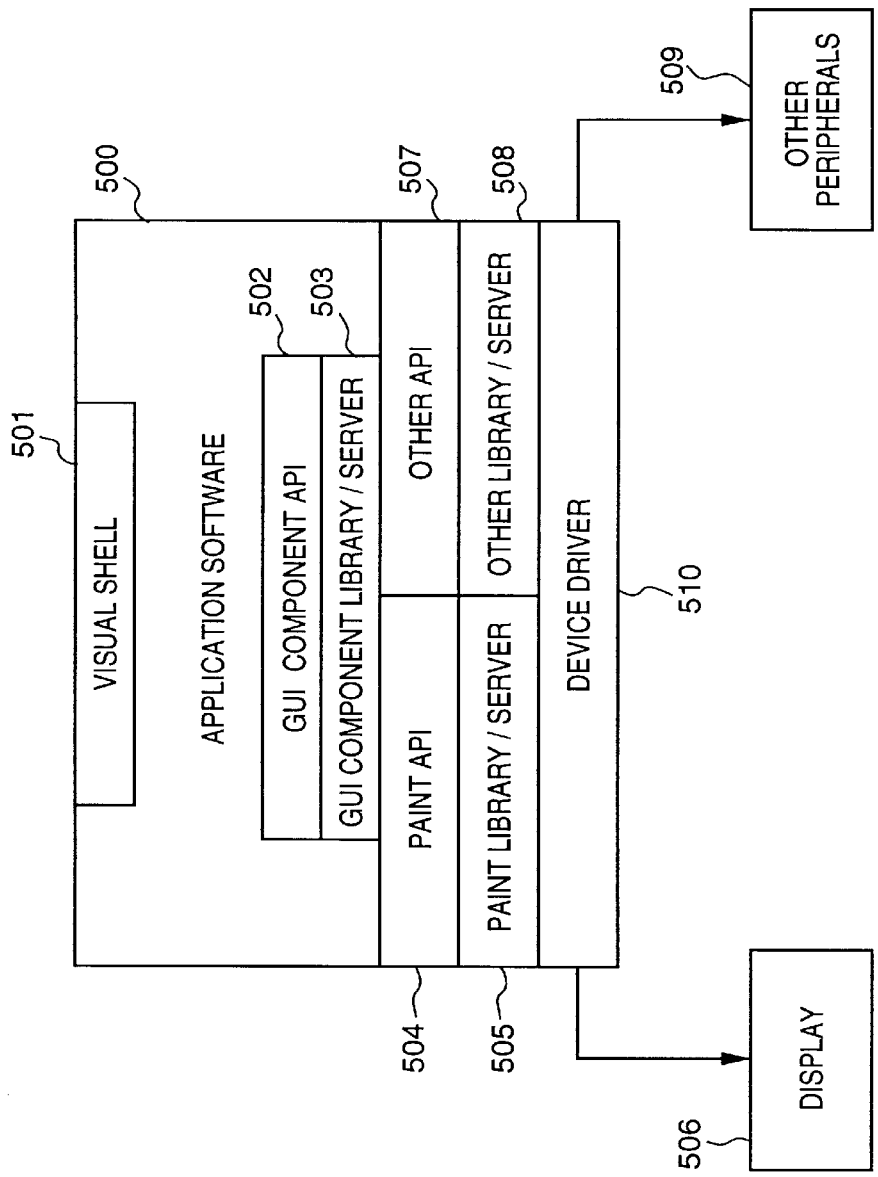
FIG. 48 is a hierarchical diagram of a typical computer system in which a GUI is used in the operating system.
Figure 49:
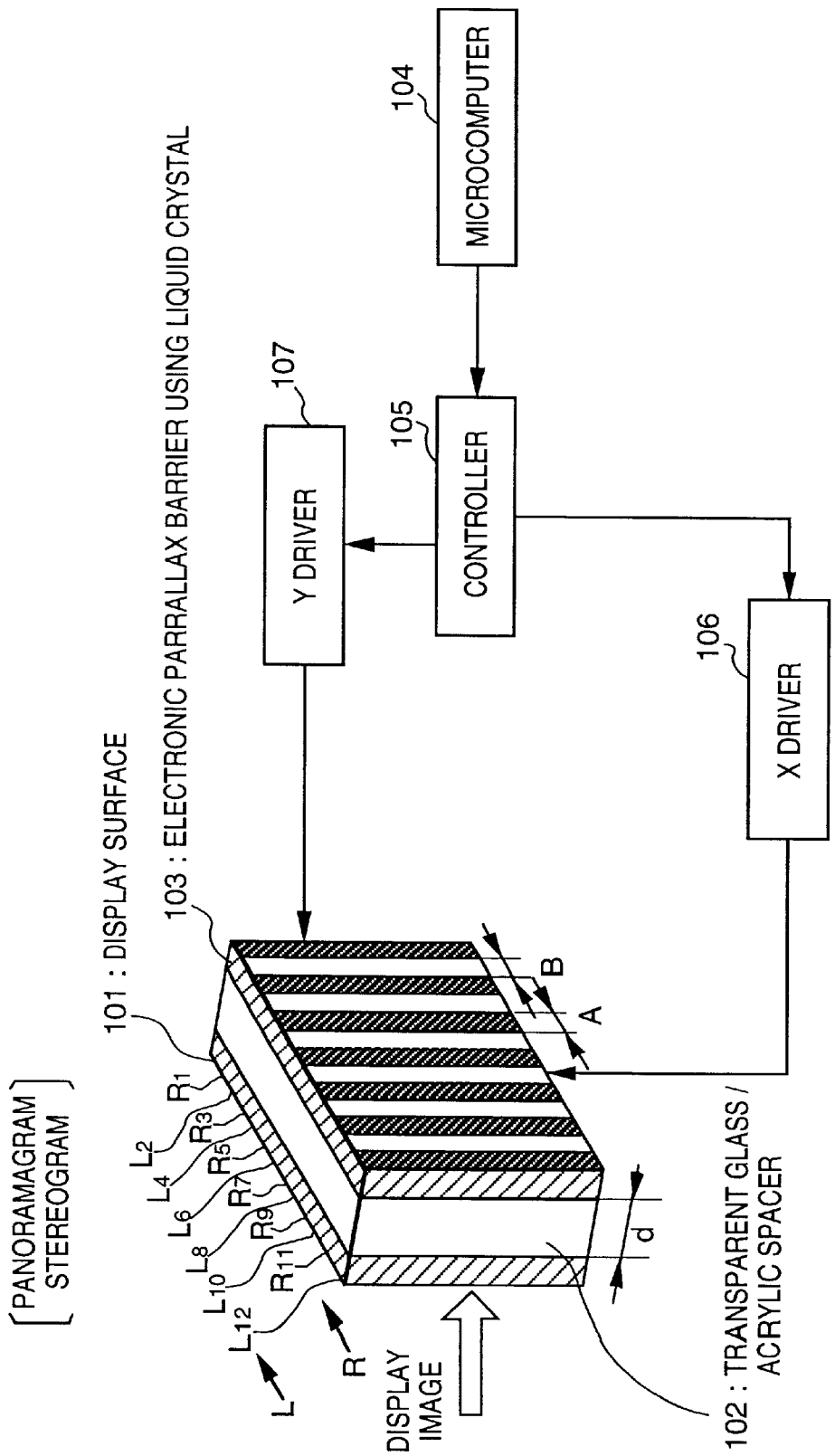
FIG. 49 is a basic structural view of a stereoscopic image display device disclosed in Japanese Patent Application Laid-Open No. 3-119889.

FIG. 47 is a diagram showing the display state on a three-dimensionally visible image display screen useful in describing the operating method of the 11th embodiment. The pointer 1035 is moved by the mouse and the three-dimensional display is set by pulling down a menu from the menu bar (by selecting the entry "option" in the memory bar 1032 in FIG. 47), thereby making it possible to execute prescribed processing. In FIG. 47, it is possible to select ①  the entry "auto" under "option", in which the display is changed automatically by the object selected as described in the first embodiment; ② the entry "2D" under "option", in which only the two-dimensional display is presented and not the three-dimensional display; ③ the entry "3D" under "option", in which the three-dimensional display continues to be presented even if the current of processing shifts to a two-dimensional object; and ④ the entry "3d time" under "option", in which the duration of the three-dimensional display is set.

It should be noted that the operations corresponding to the settings ①–④ are implemented by changing over the branching conditions at steps S63 and S64 in the flowchart of FIG. 16 in conformity with each of the settings. This would be obvious to one having ordinary skill in the art.

Thus, a display environment that conforms to user preference can be established by adopting the arrangement described in the 11th embodiment. This makes it: possible to provide a user-friendly environment.

12th Embodiment

In a system for presenting a three-dimensional display, there are occasions where the user moves an object to a desired position in the display zone for a certain reason. Objects that can undergo such movement naturally include windows presenting three-dimensional displays. However, with the display for presenting a three-dimensionally visible image display of the kind described in the tenth embodiment, the processing load upon the computer for the purpose of controlling the display is increased. That is, in the three-dimensionally visible image display described in the tenth embodiment, the processing for the optical conversions $\psi_1$, $\psi_2$ and the like is required at the same time that a three-dimensional window is moved. This increases the processing load. As described also in connection with the ninth embodiment, the fact that movement of the object in the three-dimensionally visible image display device is performed at the same time that the three-dimensional image is painted places great processing burden upon the computer and is undesirable.

In the 12th embodiment, therefore, when an object being displayed three-dimensionally is being moved (dragged), the object of interest is displayed two-dimensionally to alleviate the load upon the computer system. When the dragging operation is finished, processing is executed to restore the object to the three-dimensional display state. Such processing is implemented by suitably setting the branching conditions at step S63 in the flowchart of FIG. 46.

Thus, when the object of a three-dimensional display is being dragged, the two-dimensional display is presented to lighten the processing load upon the hardware and software. Further, when the user is dragging a window, the system need only know where the window being dragged in located. This means that no practical problems arise even if the window in the window is displayed two-dimensionally during dragging.

According to the tenth embodiment set forth above, a three-dimensionally visible image display capable of mixing two- and three-dimensional display, which realizes three-dimensionally visible image by reproducing luminance points at high speed in a time series and utilizing observer's persistence of vision, is explained. According to each of the above embodiments, it is determined whether an object is a three-dimensional object and control can be performed to switch between two- and three- dimensional displays based upon the results of the determination.

In particular, in accordance with the 11th embodiment, the user is capable of making a desired setting in relation to the three-dimensional display. This makes it possible to provide a computer system which presents a comfortable three-dimensional display.

Further, in accordance with the three-dimensionally visible image display method illustrated in the tenth embodiment, the focusing lens system is driven and an oscillating screen is not used. This makes it possible to reduce the size of the apparatus and improve the safety thereof.

Further, in embodiments other than those described above, similar effects are obtained by adopting a similar arrangement even in computer systems having a three-dimensionally visible image display which reproduces luminance points sequentially at high speed and allows a user to observe a three-dimensionally visible image by the effect of persistence of vision. Furthermore, though a window has been described primarily as the object in the description given above, a similar arrangement will hold and similar effects will be obtained even for other objects such as icons.

Thus, in accordance with the present invention as described above, it is possible to recognize, on a per-object basis, whether a three-dimensional display is capable or not. This makes it possible to display objects in the most appropriate fashion.

As many apparently widely different embodiments of the present invention can be made without departing from the spirit and scope thereof, it is to be understood that the invention is not limited to the specific embodiments thereof except as defined in the appended claims.

What is claimed is:

1. A display control apparatus comprising:

display means capable of presenting a mixed display of two- and three-dimensional displays on a display screen;

determination means for determining whether an object to be presented as a three-dimensional display possesses three-dimensional image data; and control means for causing a three-dimensional display of the object to be presented by said display means if said determination means has determined that the object possesses three-dimensional image data.

2. The apparatus according to claim 1, wherein said control means causes an entire screen of said display means to present a two-dimensional display if no objects to be presented as a three-dimensional display possess three-dimensional image data.

3. The apparatus according to claim 1, further comprising:

window display means for displaying a plurality of windows on the display screen; and execution means for causing said determination means and said control means to execute their operations on an object corresponding to a window from among the plurality of windows that is to present a three-dimensional display.

4. The apparatus according to claim 3, wherein the window that is to present the three-dimensional display is a window designated among the plurality of windows by a user.

5. The apparatus according to claim 1, further comprising:

window display means for displaying a plurality of windows on the display screen; and setting means for allowing a user to freely set, irrespective of states specified for each of a plurality of windows, a first mode in which an object capable of being displayed three-dimensionally is always displayed three-dimensionally, or a second mode in which all objects to be displayed are always displayed two-dimensionally;

wherein in a case where the first mode has been selected using said setting means, said execution means applies said determination means and said control means to all objects corresponding to the plurality of windows.

6. The apparatus according to claim 1, wherein attribute information indicating whether a file of an object includes three-dimensional image data for presenting a three-dimensional display is contained in a header of the file, and said determination means determines whether the object possesses three-dimensional image data based upon the attribute information.

7. The apparatus according to claim 1, wherein said determination means determines, on the basis of an extension added on as a file name of an object to be displayed, whether the object to be displayed possesses three-dimensional image data.

8. The apparatus according to claim 1, further comprising duration setting means for setting duration of a three-dimensional display to a desired duration in said control means;

said control means continuing three-dimensional display of an object for a duration set by said duration setting means, and changing over display of said object to a two-dimensional display upon elapse of the set duration.

9. The apparatus according to claim 1, wherein said control means causes a three-dimensional display zone to be displayed two-dimensionally while a pointer designating an object on the screen of said display means resides in the three-dimensional display zone.

10. The apparatus according to claim 9, further comprising altering means for altering shape of the pointer while the pointer resides in the three-dimensional display zone.

11. The apparatus according to claim 1, wherein in a case where a window presenting a three-dimensional display is dragged, the relevant object is displayed two-dimensionally during dragging of the window.

12. The apparatus according to claim 1, wherein said display means includes:

painting means for painting a synthesized image, obtained by alternately arraying at least two parallax images in the form of stripes, in the three-dimensional display zone, and for painting a two-dimensional image in other zones;

illumination means for supplying illuminating light having a prescribed directivity to illuminate the synthesized image so that it is observable three-dimensionally; and illumination control means for causing said illumination means to supply the illuminating light having directivity to a portion corresponding to the three-dimensional display zone;

whereby a mixed display of two- and three-dimensional displays is carried out.

13. The apparatus according to claim 12, wherein said illumination means supplies the illuminating light via a mask panel on which a checkered mask pattern has been formed, and two lenticular sheets having generating-line directions that intersect each other perpendicularly, to illuminate the synthesized image so that it is observable three-dimensionally; and said illumination control means forms the checkered mask pattern on a portion of said mask panel that corresponds to the three-dimensional display zone.

14. The apparatus according to claim 13, wherein said illumination means supplies the illuminating light via a mask panel on which a checkered mask pattern has been formed, and two lenticular sheets having generating-line directions that intersect each other perpendicularly, to illuminate the synthesized image so that it is observable three-dimensionally; and said illumination control means eliminates the directivity of the illuminating light at portions other than the three-dimensional display zone;

whereby a mixed display of two- and three-dimensional displays is carried out.

15. The apparatus according to claim 14, wherein said display means displays a frame, which has a width of at least one pixel, around the three-dimensional display zone.

16. The apparatus according to claim 12, wherein said illumination means supplies the illuminating light via a mask panel, on which a striped aperture pattern has been formed, to illuminate the synthesized image so that it is observable three-dimensionally; and said illumination control means forms the striped aperture pattern on a portion of said mask panel that corresponds to the three-dimensional display zone.

17. The apparatus according to claim 12, further comprising means for altering luminance of the illuminating light based upon the parallax images.

18. The apparatus according to claim 1, wherein said display means includes:

three-dimensional image painting means for painting a synthesized image, which is obtained by alternately arraying left and right stripe parallax images, on a three-dimensional display zone;

illuminating means for supplying illuminating light, which has a prescribed directivity, using a mask panel on which a prescribed mask pattern has been formed, to illuminate the synthesized image so that it is observable three-dimensionally; and two-dimensional image painting means for making two-dimensional observation possible by painting a synthesized image, obtained by arranging identical images in two continuous stripes, at portions other than the three-dimensional display zone.

19. The apparatus according to claim 18, further comprising eliminating means for eliminating directivity of the illuminating light whenever necessary;

wherein in a case where a three-dimensional display area is non-existent, said display means paints an ordinary two-dimensional image over the entire screen and activates said eliminating means to eliminate the directivity of the illuminating light.

20. The apparatus according to claim 19, wherein said eliminating means when active causes the illuminating light to scatter and when inactive causes the illuminating light to pass therethrough substantially intact.

21. The apparatus according to claim 19, wherein said eliminating means when active places the mask pattern on the mask panel in a non-displayed state and when inactive places the mask pattern on the mask panel in a displayed state.

22. A display control apparatus comprising:

display means capable of presenting a mixed display of two- and three-dimensional displays, said display means having a display device for sequentially presenting displays, by luminance points of an image based upon a three-dimensional image, on each of a plurality of planes arrayed depthwise of display space, and allowing a user to perform stereoscopic viewing by visual persistence of a collection of the luminance points, a mixed display of two- and three-dimensional displays being presented in a prescribed plane of the display space;

determination means for determining whether an object to be presented as a three-dimensional display possesses three-dimensional image data; and control means for causing a three-dimensional display of the object to be presented by said display means if said determination means has determined that the object possesses three-dimensional image data.

23. The apparatus according to claim 22, wherein an object displayed in the prescribed plane includes a pull-down menu, a window and/or an icon.

24. A method of controlling a display device having display means capable of presenting a mixed display of two- and three-dimensional displays on a display screen, comprising:

a determination step of determining whether an object to be presented as a three-dimensional display possesses three-dimensional image data; and a control step of causing a three-dimensional display of the object to be presented at said display step if said determination step has determined that the object possesses three-dimensional image data.

25. The method according to claim 24, wherein said control step causes the entire screen of said display means to present a two-dimensional display if no objects to be presented as a three-dimensional display possess three-dimensional image data.

26. The method according to claim 24, further comprising:

a window display step of displaying a plurality of windows on the display screen; and an execution step of causing said determination step and said control step to execute their operations on an object corresponding to a window from among the plurality of windows that is to present a three-dimensional display.

27. The method according to claim 26, wherein the window that is to present the three-dimensional display is a window designated among the plurality of windows by a user.

28. The method according to claim 24, further comprising:

a window display step of displaying a plurality of windows on the display screen; and a setting step of allowing a user to freely set, irrespective of states specified for each of a plurality of windows, a first mode in which an object capable of being displayed three-dimensionally is always displayed three-dimensionally, or a second mode in which all objects to be displayed are always displayed two-dimensionally;

wherein in a case where the first mode has been selected at said setting step, said execution step applies said determination step and said control step to all objects corresponding to the plurality of windows.

29. The method according to claim 24, wherein attribute information indicating whether a file of an object includes three-dimensional image data for presenting a three-dimensional display is contained in a header of the file, and said determination step determines whether the object possesses three-dimensional image data based upon the attribute information.

30. The method according to claim 24, wherein said determination step determines, on the basis of an extension added on as a file name of an object to be displayed, whether the object to be displayed possesses three-dimensional image data.

31. The method according to claim 24, further comprising a duration setting step of setting duration of a three-dimensional display to a desired duration at said control step;

said control step continuing three-dimensional display of an object for a duration set at said duration setting step, and changing over display of said object to a two-dimensional display upon elapse of the set duration.

32. The method according to claim 24, wherein said control step causes a three-dimensional display zone to be displayed two-dimensionally while a pointer designating an object on the screen of said display means resides in the three-dimensional display zone.

33. The method according to claim 32, further comprising an altering step of altering shape of the pointer while the pointer resides in the three-dimensional display zone.

34. The method according to claim 24, wherein in a case where a window presenting a three-dimensional display is dragged, the relevant object is displayed two-dimensionally during dragging of the window.

35. The method according to claim 24, wherein said display means sequentially presents displays, by luminance points of an image based upon a three-dimensional image, on each of a plurality of planes arrayed depthwise of stereoscopic display space, and allows a user to perform stereoscopic viewing by visual persistence of a collection of the luminance points, said method further comprising:

a mixed display step of presenting a mixed display of two- and three-dimensional displays on a prescribed plane in the stereoscopic display space;

said control step controlling execution of a three-dimensional display at said mixed display step based upon results of determination made as said determination step.

36. A computer readable memory storing a control program for controlling a display device capable of presenting a mixed display of two- and three-dimensional displays on a display screen, comprising:

a code of a determination step of determining whether an object to be presented as a three-dimensional display possesses three-dimensional image data; and a code of a control step of causing a three-dimensional display of the object to be presented at said display step if said determination step has determined that the object possesses three-dimensional image data.

37. A display device comprising:

setting means for setting focal length of a beam to a focal length that has been specified;

painting means for painting by the laser beam, on a plane corresponding to a position at the focal length set by said setting means, an image corresponding to a three-dimensional image on said plane; and control means for successively changing over focal lengths specified by said setting means and causing painting of the image by said painting means to be performed on a plane at each focal length.

38. The device according to claim 37, further comprising converging means for converging, at a position located at the eye of an observer, a beam obtained by painting the image on each plane by said control means.

39. A display control apparatus comprising:

display means capable of presenting a three-dimensional display on a screen;

designating means for designating an object being displayed three-dimensionally by said display means;

moving means for moving the object that has been designated by said designating means; and display control means for causing the designated object to be displayed two-dimensionally instead of three-dimensionally while the object is being moved by said moving means.

40. The apparatus according to claim 39, wherein the object is returned to be being displayed three-dimensionally after movement of the object by said moving means ends.

41. The apparatus according to claim 39, wherein said display control means causes the objected to be displayed two-dimensionally while a pointer resides in the object.

42. The apparatus according to claim 39, further comprising altering means for altering shape of a pointer designating an object while the pointer resides in the object being displayed three-dimensionally by said display means.

43. A display control method comprising:

a display step of presenting a three-dimensional display on a screen;

a designating step of designating an object being displayed three-dimensionally at said display step;

a moving step of moving the object that has been designated at said designating step; and a display control step of causing the object to be displayed two-dimensionally instead of three-dimensionally while the object is being moved at said moving step.

44. The method according to claim 41, wherein the object is returned to be being displayed three-dimensionally after movement of the object at said moving step ends.

45. The method according to claim 43, wherein, in said display control step, the object is displayed two-dimensionally while a pointer resides in the object.

46. The method according to claim 43, further comprising an altering set of altering shape of a pointer designating an object while the pointer resides in the object being displayed three-dimensionally in said display step.

* * * * *

UNITED STATES PATENT AND TRADEMARK OFFICE
CERTIFICATE OF CORRECTION

PATENT NO. : 6,023,277

DATED : February 8, 2000

INVENTOR(S): TSUTOMU OSAKA, ET AL.   Page 1 of 3

Figure 46:
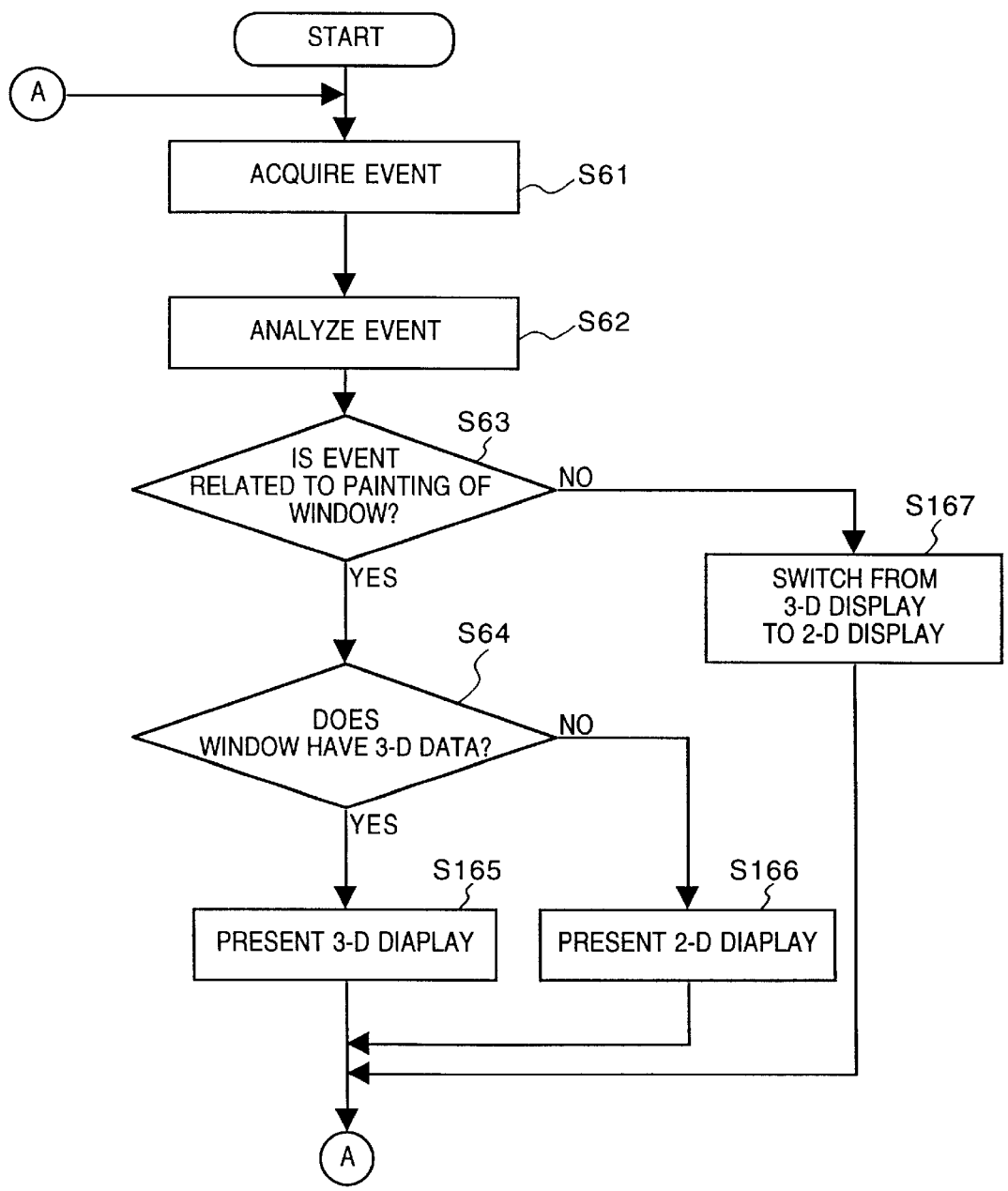
FIG. 46 is a flowchart for describing the procedure of image display processing according to the tenth embodiment.

It is certified that error appears in the above-identified patent and that said Letters Patent is hereby corrected as shown below:

SHEET 46:

FIG. 46, "DIAPLAY" (both occurrences) should read --DISPLAY--.

COLUMN 11:

Line 43, "an" should read --can--.
    Line 63, "by" should read --by a--.

COLUMN 13:

Line 2, "land" should read --1 and--.

COLUMN 16:

Line 24, "of" should read --or--.
    Line 55, "if" should read --in--.

COLUMN 24:

Line 55, "faced" should read --faces--.
    Line 65, "Rat" should read --R at--.

UNITED STATES PATENT AND TRADEMARK OFFICE
CERTIFICATE OF CORRECTION

PATENT NO. : 6,023,277

DATED : February 8, 2000

INVENTOR(S): TSUTOMU OSAKA, ET AL.

It is certified that error appears in the above-identified patent and that said Letters Patent is hereby corrected as shown below:

COLUMN 26:

Line 4, "that:" should read --that--.

COLUMN 27:

Line 11, "the arrows" should read --by the arrows--.

COLUMN 28:

Line 4, "pints" should read --points--.

COLUMN 29:

Line 39, "coordinates;" should read --coordinates--.

COLUMN 34:

Line 58, "the" should read --the pupil)--.

COLUMN 39:

Line 18, "it:" should read --it--.

UNITED STATES PATENT AND TRADEMARK OFFICE
CERTIFICATE OF CORRECTION

PATENT NO. : 6,023,277

DATED : February 8, 2000

INVENTOR(S): TSUTOMU OSAKA, ET AL.

It is certified that error appears in the above-identified patent and that said Letters Patent is hereby corrected as shown below:

COLUMN 45:

Line 8, "be" should be deleted.
    Line 11, "objected" should read --object--.

COLUMN 46:

Line 9, "be" should be deleted.

Signed and Sealed this

Tenth Day of April, 2001

Attest:

NICHOLAS P. GODICI

Attesting Officer     Acting Director of the United States Patent and Trademark Office